(12) United States Patent
Aykroyd et al.

(10) Patent No.: US 11,172,557 B2
(45) Date of Patent: Nov. 9, 2021

(54) CONTROLLABLE POWER AND LIGHTING SYSTEM

(71) Applicant: INTELLIGENT GROWTH SOLUTIONS LIMITED, Dundee (GB)

(72) Inventors: Henry Aykroyd, Dundee (GB); David Scott, Dundee (GB)

(73) Assignee: INTELLIGENT GROWTH SOLUTIONS LIMITED, Dundee (GB)

( * ) Notice: Subject to any disclaimer, the term of this patent is extended or adjusted under 35 U.S.C. 154(b) by 0 days.

(21) Appl. No.: 16/850,305

(22) Filed: Apr. 16, 2020

(65) Prior Publication Data

US 2020/0323072 A1 Oct. 8, 2020

Related U.S. Application Data

(63) Continuation of application No. 16/082,274, filed as application No. PCT/GB2017/050562 on Mar. 2, 2017, now Pat. No. 10,067,370.

(30) Foreign Application Priority Data

| Mar. 7, 2016 | (GB) | 1603904 |
| May 16, 2016 | (GB) | 1608529 |
| Jan. 19, 2017 | (GB) | 1700932 |

(51) Int. Cl.
H05B 47/185 (2020.01)
H05B 45/24 (2020.01)
(Continued)

(52) U.S. Cl.
CPC ............ *H05B 45/3725* (2020.01); *F21S 4/28* (2016.01); *H01R 25/147* (2013.01); *H05B 45/24* (2020.01); *H05B 47/185* (2020.01); *H05B 47/19* (2020.01)

(58) Field of Classification Search
CPC ...... H05B 47/185; H05B 47/19; H05B 45/37; H05B 45/24; H01R 25/147; F21S 4/28
(Continued)

(56) References Cited

U.S. PATENT DOCUMENTS

| 8,404,089 B2 | 3/2013 | Horishita et al. |
| 9,137,855 B2 | 9/2015 | Umeda |

(Continued)

FOREIGN PATENT DOCUMENTS

| CN | 202285317 U | 6/2012 |
| CN | 202434900 U | 9/2012 |

(Continued)

OTHER PUBLICATIONS

International Search Report for Application No. PCT/GB2017/050562 dated Jun. 9, 2017.

*Primary Examiner* — Don P Le

(74) *Attorney, Agent, or Firm* — Moser Taboada

(57) ABSTRACT

There is provided herein controllable power and lighting system. There is particularly provided a method for the arrangement and automatic control of one or more power consuming devices, including one or more light emitting diode (LED)-containing lighting devices, and optionally one or more non-LED based devices, wherein the devices are adapted to be powered by 3-phase AC power within the present systems.

20 Claims, 16 Drawing Sheets

(51) Int. Cl.
  *H05B 45/37*   (2020.01)
  *H05B 47/19*   (2020.01)
  *F21S 4/28*    (2016.01)
  *H01R 25/14*   (2006.01)
  *H05B 45/3725* (2020.01)

(58) Field of Classification Search
  USPC .................................................. 315/137
  See application file for complete search history.

(56) References Cited

U.S. PATENT DOCUMENTS

| | | | |
|---|---|---|---|
| 2003/0236016 A1 | 12/2003 | Murakami et al. | |
| 2005/0156541 A1* | 7/2005 | Henze | H05B 41/282 315/312 |
| 2006/0061924 A1* | 3/2006 | Zhang | H01R 13/652 361/42 |
| 2007/0090767 A1* | 4/2007 | Roberts | H05B 41/26 315/139 |
| 2008/0143260 A1* | 6/2008 | Tuymer | H02M 7/10 315/111.21 |
| 2009/0026972 A1* | 1/2009 | Shakuda | H05B 45/37 315/191 |
| 2011/0234106 A1* | 9/2011 | Wang | H05B 45/37 315/137 |
| 2012/0019148 A1* | 1/2012 | Yang | H02M 3/335 315/141 |
| 2012/0199390 A1 | 8/2012 | Oka et al. | |
| 2013/0119884 A1 | 5/2013 | Hung et al. | |
| 2014/0035469 A1* | 2/2014 | Yang | H05B 45/48 315/161 |
| 2015/0054408 A1* | 2/2015 | Wlodarczyk | H05B 45/37 315/137 |
| 2015/0084516 A1 | 3/2015 | Chu et al. | |
| 2016/0057836 A1 | 2/2016 | Akroyd et al. | |
| 2016/0066388 A1* | 3/2016 | Seki | H02M 3/33546 315/200 R |

FOREIGN PATENT DOCUMENTS

| | | |
|---|---|---|
| CN | 202856467 U | 4/2013 |
| CN | 203632914 U | 6/2014 |
| CN | 204361634 U | 5/2015 |
| CN | 204465938 U | 7/2015 |
| CN | 205029917 U | 2/2016 |
| EP | 2568773 A2 | 3/2013 |
| EP | 2840693 A2 | 2/2015 |
| GB | 2527955 A | 1/2016 |
| JP | S63190510 A | 8/1988 |
| JP | 2011077009 A | 4/2011 |
| JP | 2011142026 | 7/2011 |
| WO | WO-2010041169 A1 | 4/2010 |
| WO | WO-2015049415 A1 | 4/2015 |
| WO | WO-2016027095 A2 | 2/2016 |
| WO | WO-2016118175 A1 | 7/2016 |

* cited by examiner

CONTROLLABLE POWER AND LIGHTING SYSTEM

CROSS-REFERENCE TO RELATED APPLICATIONS

This application is a continuation application of U.S. patent application Ser. No. 16/082,274, filed on Sep. 5, 2018, which is a National Stage Entry of PCT/GB2017/050562, filed on Mar. 2, 2017, which claims priority to and the benefit of U.K. Patent Application Serial Nos. 1603904.2, 1700932.5, and 1608529.2, filed on Mar. 7, 2016, Jan. 19, 2017, and May 16, 2016, respectively, the entire contents of each of these applications is incorporated herein by reference.

FIELD OF THE INVENTION

The present disclosure relates to a novel controllable power and lighting system. The disclosure particularly relates to a method for the arrangement and automatic control of one or more power consuming devices, wherein at least one of the power consuming devices is a light emitting diode (LED)-containing lighting device, within the present system, wherein the LED-containing lighting device is adapted to be powered by 3-phase and wherein the 3-phase AC power supplied to the system is converted to DC power via 3-phase AC/DC rectification, and particularly to such arrangements where the 3-phase AC power is distributed on conductive bus bars. The disclosure also relates to a method for the arrangement and automatic control of lighting devices within the present system, particularly light emitting diode (LED) lights, and optionally non-LED based devices, adapted to be powered by 3-phase AC power where the 3-phase AC power is distributed via conventional wiring in combination with 3-phase switch mode power supplies (SMPS). In addition, the novel power and lighting system is suitable for use in a uniform and safe manner in close proximity to living organisms, particularly organisms capable of growth, such as plants, in a domestic or commercial growth system.

The disclosure also concerns a controllable power and lighting system for one or more power consuming devices including at least one light emitting diode (LED) lighting device, and optionally one or more non-lighting power consuming devices, which distributes power and light in a uniform and safe manner.

The disclosure also concerns a method that allows individual lighting devices, groups of lighting devices or arrays of lighting devices, as well as non-lighting devices to be individually controlled over large surface areas 1 m$^2$ to over 10,000 m$^2$ in accordance with the needs of the particular.

The disclosure also concerns a method for the control of wavelength, intensity and photoperiod of individual LED lights (LEDs) in a wide variety of applications, including in commercial and domestic applications.

The disclosure also concerns the provision of automated control, digital collection and reporting of power consuming LED lighting devices, and, where present, non-LED-based power consuming devices within systems, as well as for the monitoring and management of device-specific features in real-time and the use of feedback loops and evolutionary algorithms linked to pre-set conditions within the systems.

The disclosure also concerns means for providing LED lighting at flexible voltage levels whilst providing added safety and efficiencies versus conventional systems. The disclosure also concerns means for providing LED lighting at extra-low voltage levels such as for example 12-50 v AC for use in a wide variety of applications, including in commercial or domestic applications, and in particular for use in commercial or domestic growth systems, whilst assuring user safety and complying with health and safety electrical standards but not requiring an IP rating.

The disclosure also concerns the optimisation of system power factor (PF) values and the minimisation of system total harmonic distortion (THD) via use of the systems as described herein.

BACKGROUND TO THE INVENTION

Light-emitting diode (LED) lighting technology is known for delivery of increased power efficiency with associated reductions in cost particularly in commercial applications, such as for example in street lighting where previously inefficient/high cost HID sodium lamps were utilised.

From a commercial perspective, and particularly from the viewpoint of potential implementation of LED arrays in large-scale commercial applications, such as for example in industrial applications or in large retail applications, it would clearly be of considerable benefit if such LED array(s) could be operated on a more energy efficient basis, and in a cost-efficient manner whilst providing the capacity for remote control of their wavelength, radiant intensities and photoperiods.

Commercially available LED lights are powered with DC current that means that they are typically placed in close proximity to an AC/DC inverter, typically 230 v AC-24 v DC. At low voltage DC there is a significant voltage drop over short distances which mean that for system efficiency the AC/DC inverter must be placed at a distance from the LED lights of less than 5 m, and typically about 2 m.

A particular disadvantage of using LED-based lighting for the provision of lighting for large-scale commercial or industrial applications, or high intensity lighting systems which require high numbers of LED lights, is that the necessary spacing between either the individual LED lights or between groups of the LED lights means that the distance between the AC/DC inverters needs to increase because such arrangements typically mean that the risk of DC voltage drop is increased. The Applicant has recognised that such risk of DC voltage drop is applicable to any DC-powered lighting device.

To date efforts to resolve this voltage drop issue for commercial applications have provided modified lighting systems which utilise LED lights, and particularly strips of LED lights, also known as strip lighting in association with an increased number of AC/DC inverters which are smaller in size. In addition to the LED costs indicated hereinbefore, and the additional inverter costs, such modified systems require far higher quantities of high voltage AC wiring, to connect to multiple inverters, than would be required if using a single large AC/DC inverter. This is particularly expensive in large-scale commercial systems, such as systems for use in large-scale industrial applications or complex commercial applications where all wiring and inverters must be IP rated. In addition, the complexity of such systems means that the measures required for controlling the LED lighting within such modified systems, as well as the measurement of wavelength, intensity and photoperiod generated becomes impractical as well as potentially hazardous should any fault occur.

At present, the industry standard AC/DC inverters for use with LED lights have power factors (PF) typically in the range 0.7 to 0.9. There would be however a considerable financial benefit to increasing the power factor to close to 1.0.

Total harmonic distortions (THDs) of 20% or less, are considered acceptable in the provision of LED lighting. It would be of considerable benefit to provide a system that could reduce or eliminate THD because any THD is both potentially damaging to animal and human health and interferes with other electronic systems.

Thus, there is a need to provide a system for the provision of power and lighting to lighting devices which are adapted to be powered by DC, and especially to LED-based lighting systems containing one or more LED-lighting devices, such as LED arrays which overcomes the voltage-drop restrictions of current systems and is capable of delivering radiant power distribution in a uniform manner, with improved power conversion versus the presently available conventional compact or strip-style LED lighting arrays and which is provided improved (increased) PF and/or reduced or no THD.

One of the desirable features of LED fixtures is the ability to control each wavelength independently and to vary the intensities and the photoperiods according to the specific needs of the customised commercial or domestic system.

It is technically possible using LEDs to adjust the photoperiods from milliseconds to hours. LED lighting manufacturers have designed compact LED lighting arrays using conventional printed circuit boards (PCBs) often incorporating 100's of high-powered LEDs. These are IP rated and supplied by high voltage, typically 240 v AC.

As over 50% of the power supplied to such LED arrays is typically converted to heat rather than radiant power, these compact LED lighting arrays are often air cooled with fans. Given the ever-increasing awareness of both domestic and commercial consumers of the environmental cost associated with wasted energy consumption, the relative inefficiency of the power conversion provided by commercially available LED arrays can be a deterrent to their use in some circumstances.

Thus, there is a need to provide a power system for such LED lighting arrays which converting more than 50% of the power supplied to radiant power rather than heat energy.

SUMMARY OF THE INVENTION

The present disclosure comprises a novel and improved power and lighting system suitable for use in applications having one or more DC powered LED-containing lighting devices. The disclosure particularly relates to a controllable system for the provision of power and lighting for applications, wherein the system comprises one or more power consuming devices, wherein at least one of the power consuming devices is an LED-containing lighting device wherein the LED-containing lighting device is adapted to be powered by a 3-phase AC power supply and wherein the 3-phase AC power supplied to the system is converted to DC power via 3-phase AC/DC rectification.

The present disclosure provides a controllable system for the provision of power and lighting for applications, wherein the system comprises one or more power consuming devices, wherein at least one of the power consuming devices is an LED-containing lighting device wherein the LED-containing lighting device is adapted to be powered by a 3-phase AC power supply, wherein the 3-phase AC power supplied to the system is converted to DC power via 3-phase AC/DC rectification and wherein the 3-phase AC power supplied to each LED-containing lighting device is reduced by a step-down device.

The present disclosure provides a controllable system for the provision of power and lighting for applications, wherein the system comprises one or more power consuming devices, wherein at least one of the power consuming devices is an LED-containing lighting device wherein the LED-containing lighting device is adapted to be powered by a 3-phase AC power supply, wherein the 3-phase AC power supplied to the system is converted to DC power via 3-phase AC/DC rectification and wherein the 3-phase AC power supplied to each LED-containing lighting device is reduced by a main AC step-down transformer.

The present disclosure additionally relates to a controllable system for the provision of power and lighting for applications, wherein the system comprises one or more power consuming devices, wherein at least one of the power consuming devices is an LED-containing lighting device wherein the LED-containing lighting device is adapted to be powered by a 3-phase AC power supply, wherein the 3-phase AC power supplied to the system is converted to DC power via 3-phase AC/DC rectification and wherein the 3-phase AC power supplied to the system is less than or equal to 50V AC RMS.

The present disclosure also relates to a controllable system for the provision of power and lighting for applications, wherein the system comprises one or more power consuming devices, wherein at least one of the power consuming devices is an LED-containing lighting device wherein the LED-containing lighting device is adapted to be powered by a 3-phase AC power supply, wherein the 3-phase AC power supplied to the system is converted to DC power via 3-phase AC/DC rectification and wherein the 3-phase AC power supplied to the system is distributed by conductive bus bars.

The present disclosure also relates to a controllable system for the provision of power and lighting for applications, wherein the system comprises one or more power consuming devices, wherein at least one of the power consuming devices is an LED-containing lighting device wherein the LED-containing lighting device is adapted to be powered by a 3-phase AC power supply, wherein the 3-phase AC power supplied to the system is converted to DC power via 3-phase AC/DC rectification and wherein the system includes means for automatic control of each device.

For the avoidance of doubt each of the above aspects relating to power step-down, <=50V AC RMS, bus bars and/or automatic control may be combined within the present system. These and additional aspects are detailed hereinafter.

According to a particular aspect there are disclosed controllable power and lighting systems wherein the 3-phase AC voltage power is low voltage 3-phase AC power, and especially 3-phase AC extra-low voltage power of less than or equal to 50V AC RMS is distributed on bus bars.

The present disclosure additionally provides a controllable power and lighting system as defined hereinbefore wherein the at least one LED-containing lighting devices is any suitable LED-containing lighting device, including an LED, a light fitting including at least one LED, a luminaire containing at least one LED, a group of LEDs, a group of light fittings each containing at least one LED, a group of luminaires each containing at least one LED, or one or more arrays of LEDs.

The present disclosure additionally provides a controllable power and lighting system as detailed hereinbefore wherein the one or more LED-containing lighting devices, or group of one or more LED-containing lighting devices, or one or more arrays of LEDs are linked to an AC main transformer.

The present disclosure provides a controllable power and lighting system as detailed hereinbefore wherein the 3-phase AC power is distributed by conductive bus bars. In addition, the present disclosure additionally provides a controllable power and lighting system as detailed hereinbefore wherein the 3-phase AC power is distributed by conductive bus bars, particularly wherein the bus bars are conductive hollow bus bars, or conductive tubular or substantially tubular bus bars.

There is also provided a controllable power and lighting system for use in applications comprising one or more LED-containing lighting devices wherein the one or more lighting devices is adapted to be powered by a 3-phase AC power supply wherein the 3-phase AC power supplied to each lighting device, or group of lighting devices is converted to DC power via 3-phase AC/DC rectification and wherein means for communications are located on the AC-side i.e. communications are extracted from the AC waveform at each lighting device or group of lighting devices i.e. at each load connected to the system via power line technology in combination with communications and registration means within the devices, and wherein the system can be monitored and controlled remotely.

According to an aspect there is provided a controllable power and lighting system wherein the LED-lighting comprises one or more LED-containing lighting devices, or group of one or more LED-lighting devices, or an LED array comprising LED lights wherein the devices or lights are adapted to be powered by a 3-phase AC power supply wherein (i) the 3-phase AC power distributed to the LED-lighting is linked to an AC main transformer that may be positioned externally or internally;

(ii) the 3-phase AC power is distributed by conductive bus bars;

(iii) the 3-phase AC power supplied to each lighting device, or group of lighting devices is converted to low voltage or extra-low voltage DC via 3-phase AC/DC rectification of the power supplied to each connected load, and particularly via an AC/DC rectifier associated with each lighting LED-containing lighting device, or group of LED-containing lighting devices; and (iv) the system includes means for automatic control of the output of the lighting as a whole, or individual LED-containing lighting devices, or groups of LED-containing lighting devices within the system.

According to a further aspect in the above controllable power and lighting system where the 3-phase AC power supplied to each LED-containing lighting device, or group of LED-containing lighting devices is converted to low voltage or extra-low voltage DC via 3-phase AC/DC rectification of the power supplied to each connected load the rectification is via an AC/DC rectifier associated with each LED-containing lighting device, or group of LED-containing lighting devices.

According to a yet further aspect, in either of the systems directly about the bus bars tubular or substantially tubular and are adapted to power one or more optional non-lighting based devices where present within the system, and wherein the system additionally comprises power line technology in combination with communications, and registration means within the array, and the non-LED based devices and wherein the system can be monitored and controlled remotely.

According to another aspect the present disclosure provides a novel power and lighting system as defined herein wherein power line technology provided via the bus bars provides a control system for the lighting system, wherein the control system communicates with each individual lighting device, or groups of one or more lighting devices, or one or more arrays of lighting devices via use of one or more lighting device-specific registration chips to provide a remote controlled and monitored system, and wherein automatic correction of voltage drop within the system is managed by local inverters associated with each lighting device, or group of lighting devices, or individual lighting devices or groups of lighting devices, including strips of lighting devices within each array, and particularly wherein the lighting devices are LEDs.

A further aspect provides a novel power and lighting system as defined hereinbefore having web-based remote-control features and means for the provision of power source blending between peak and off peak main power supplies, and between a main power supply and alternative, renewable power supplies such as for example solar power.

According to yet further aspects the present disclosure provides a novel power and lighting system as defined hereinbefore wherein the system additionally comprises one or more of the following independent features, and any combination thereof: the lighting devices comprises LED strips; the lighting devices comprises LED spot lights; the lighting devices comprises LED floodlights; the lighting devices comprises a combination of LED spot lights, LED floodlights and/or LED strips; the combined power line and array registration enables wireless remote control and monitoring of the system; the system includes a feedback loop in the control system to enable real-time LED adjustment within buildings.

According to a still further aspect the present disclosure provides a novel power and lighting system as defined hereinbefore wherein each individual power consuming device within the system, including individual lighting devices, and/or non-lighting devices, or group of lighting devices and/or group of non-lighting devices, or array of lighting devices within the power and lighting system can be individually registered for control ultimately via the internet with all data collected via cloud internet with such control enabled by a power line communications chip.

According to another aspect the present disclosure provides an improved LED array for use as the lighting device with the present power and lighting systems for use in growth systems wherein the LED array comprises a series of aluminium strips arranged in parallel wherein individual LED lights can be spaced at any distance along the length of each individual strip, wherein each individual strip is spaced at a similar distance from each individual adjacent strip and wherein the overall LED pattern provided by the LED array approximates to a uniform grid and wherein the LED strips are adapted to be powered by an AC low voltage 3-phase power supply.

There is also disclosed a controllable power and lighting system for commercial and/or domestic use comprising one or more lighting devices wherein the one or more lighting devices is powered by a 3 phase AC power supply wherein the 3 phase AC power supplied to each lighting device, or group of lighting devices is converted to DC power via AC/DC rectification, and in particular a system (i) wherein the 3 phase AC power distributed to the array is linked to a main transformer which may be positioned externally or internally;

(ii) wherein the 3 phase AC power is distributed by conductive bus bars;

(iii) wherein the 3 phase AC power supplied to each lighting device, or group of lighting devices is converted to DC power via AC/DC rectification of the power supplied to each connected load; and (iv) wherein the system includes means for automatic control of the output of the lighting as a whole, or individual lighting devices, or groups of lighting devices; and optionally (v) wherein the bus bars are optionally adapted to power one or more non-lighting devices within the system.

The present disclosure additionally provides a controllable system for the provision of power and lighting, also referred to herein as a controllable power and lighting system, as detailed hereinbefore wherein each power consuming device is a connected load, and wherein the 3-phase AC power supplied to each LED-containing lighting device, or group of LED-containing lighting devices, or array of LEDs as defined herein, is converted to DC power via 3-phase AC/DC rectification of the power supplied to each connected load.

The present disclosure additionally provides a controllable power and lighting system wherein the system includes means for automatic control of the output of the LED-lighting as a whole, or individual LED-containing lighting devices, or groups of LED-containing lighting devices.

Additionally there is provided a controllable power and lighting system use in applications comprising one or more LED-containing lighting devices wherein the one or more lighting devices is adapted to be powered by a 3-phase AC power supply wherein the 3-phase AC power supplied to each lighting device, or group of lighting devices is converted to DC power via 3-phase AC/DC rectification and wherein the 3-phase AC power is distributed by tubular bus bars.

There is also provided a controllable power and lighting system for use in applications comprising one or more LED-containing lighting devices wherein the one or more lighting devices is adapted to be powered by a 3-phase AC power supply and wherein (i) the 3-phase AC power distributed to the lighting as a whole is linked to a main transformer;

(ii) the 3-phase AC power is distributed by bus bars;

(iii) the 3-phase AC power supplied to each lighting device, or group of lighting devices is converted to DC power via 3-phase AC/DC rectification of the power supplied to each connected load; and (iv) the system includes means for automatic control of the output of the lighting as a whole, or individual lighting devices, or groups of lighting devices; and optionally (v) the bus bars are optionally adapted to power one or more non-lighting devices within the system.

According to a further aspect the present disclosure provides a controllable power and lighting system wherein the lighting comprises one or more LED arrays, wherein each LED array comprises one or more strips wherein one or more individual LED lights are spaced at any distance along the length of each individual strip, wherein the LED-containing strips are adapted to be powered by a 3-phase AC low voltage power supply wherein (i) the low voltage, 3-phase, AC power distributed to the array is linked to a main transformer;

(ii) the low voltage, 3-phase, AC power is distributed by tubular bus bars;

(iii) the low voltage, 3-phase, AC supplied to each LED light, or group of LED lights is converted to low voltage DC via 3-phase AC/DC rectification of the power supplied to each connected LED light, or group of LED lights;

(iv) the system includes means for automatic control of the output of the LED array as a whole, or individual LED lights, or groups of LED lights within the array; and optionally (v) the bus bars are adapted to power one or more non-LED devices within the system.

According to another aspect the present disclosure provides a novel power and lighting system for use in growth systems wherein the lighting comprises one or more LED arrays, wherein each LED array comprises one or more strips wherein one or more individual LED lights are spaced at any distance along the length of each individual strip, wherein the LED containing strips are powered by a 3 phase AC low voltage power supply and (i) wherein the low voltage 3 phase, AC power distributed to the array is linked to an external transformer;

(ii) wherein the low voltage 3-phase AC power is distributed by tubular bus bars;

(iii) wherein the low voltage or 3 phase AC supplied to each strip is converted to low voltage DC via AC/DC rectification of the power supplied to each connected load; and (iv) wherein the system includes means for automatic control of the output of the LED array as a whole or individual LED lights, or groups of LED lights within the array.

The above aspects and yet further aspects of the invention are described hereinafter.

DESCRIPTION

Advantages of the Invention

Traditionally lighting systems are powered by single phase voltage. It is well-known in the lighting industry that low power loading lighting systems, such as low voltage DC-powered LED lights are not considered suitable for powering via 3-phase power.

To date it has not been possible to provide a lighting system employing lights that require DC power, such as LEDs, using a 3-phase power supply. Surprisingly, not only has the Applicant provided the first 3-phase power supply based controllable power and lighting system suitable for use with LED-containing lights which are adapted to be powered by 3-phase DC, the Applicant has also found that use of a 3-phase voltage power supply, and particularly a 3-phase low voltage AC power supply, in the controllable power and lighting systems described herein the rectification of this 3-phase voltage into DC is much more efficient than traditional single phase rectification.

The Applicant has additionally found that use of a 3-phase AC supply in the present controllable power and lighting systems not only delivers desirable efficiency benefits versus traditional lighting systems but also enables the use of far smaller capacitors for smoothing the DC voltage, than those required by an equivalent single phase system. These efficiency and capacitor-related benefits have been demonstrated across voltage levels i.e. at high and low levels of 3-phase AC power supply. In particular the Applicant has found that these advantages are especially useful where a low or extra low voltage 3-phase power supply is utilised in the present power and lighting systems. The ability to use far smaller capacitors has great advantages to cost, size, efficiency and reliability of the rectification and associated hardware components. The Applicant has found that capacitors suitable for use in the present power and lighting systems having 3-phase rectification are up to and including 90% smaller than the corresponding capacitors needed for systems employing low voltage AC with single phase rectification. Furthermore, the Applicant has demonstrated that in the controllable power and lighting systems as detailed herein the capacitor can be eliminated completely provided the output voltage from the transformer is tuned to the exact application.

Without wishing to be bound to any particular theory, it is thought that one of the reasons that the present system employing a 3-phase supply is more efficient than a corresponding system having a single phase supply is due to the voltage ripple effect, whereby the voltage ripple frequency of a 3-phase AC supply is 3-fold greater than that for a single phase AC supply. For example, a 3-phase 50 Hz becomes AC becomes 300 Hz DC ripple and 3-phase 60 Hz becomes 360 Hz DC ripple.

The Applicant has additionally demonstrated that use of the present system provides increased power factor (PF) values versus the current industry standards of 0.7-0.9. In particular PV values of 0.95 or above, more particularly 0.97 or above, and especially 0.99 or above have been demonstrated via use of the present system.

The Applicant has also demonstrated that use of the present system provides significant reductions in the level of total harmonic distortions (THDs) versus the presently accepted levels of 20% or less. In particular, THD values of 10%, less, more particularly 5%, or less, especially 1% or less and more especially 0.5% of less have been demonstrated via use of the present system.

Accordingly there is also provided use of a controllable power and lighting system suitable for use in applications comprising one or more LED-containing lighting devices as defined herein wherein the one or more lighting devices is adapted to be powered by a 3-phase AC power supply, and wherein the 3-phase AC power supplied to each lighting device, or group of lighting devices is converted to DC power via 3-phase AC/DC rectification for the provision of increased PF and/or reduced THD.

For the avoidance of doubt the term adapted to be powered by a 3-phase AC power supply as used herein in relation to one or more lighting devices means that the devices are suitable for use in the present system where the power to the one or more lighting devices is rectified to DC prior to supply to said devices.

The systems herein are suitable for commercial and/or domestic use, where such uses are as defined hereinafter. As such reference to uses of the present systems herein are understood to be suitable for commercial and/or domestic uses.

Without wishing to be bound to any particular theory it is thought that one of the reasons that use of the present system employing a 3-phase supply as defined herein provides improved PF values and significantly reduced THDs versus the currently accepted levels within the industry is that both the numbers of capacitors and also the size of the capacitor for use in the present systems can be reduced. In addition, via use of the present system the numbers of inductive components and the size of the inductive components can be reduced.

The Applicant has demonstrated that combination of use of the present controllable power and lighting system comprising one or more LED-containing lighting devices, or group of lighting devices, adapted to be powered by a 3-phase AC power supply wherein the 3-phase AC power supplied to each lighting device, or group of lighting devices is converted to DC power via 3-phase AC/DC rectification with capacitor and/or inductive component modifications (reductions in size and/or number) provides improved PF values and significantly reduced THDs versus the levels presently accepted within the industry.

For large-scale installations, safety of the power and lighting supplies are of paramount importance, both from a viewpoint of regulatory compliance and duty of care to employees and/or customers.

An additional and important safety advantage from use of a 3-phase AC supply, to DC-powered LED-containing lighting devices, particularly LED lights, and optionally one or more non-LED/non-lighting devices, is for the first time the provision of a large-scale lighting system having in-built means to address the issues of 'hot neutrals' and tripping single fuses of the incoming supply.

Traditionally, when LEDs have been used in large-scale operations, they are single phase units, balanced over the 3-phases by the installer. In large-scale operations, and in particular large-scale commercial installations, including industrial operations one of the dangers associated unbalanced loads are 'hot neutrals' or tripping single fuses of the incoming supply. For the avoidance of doubt the danger from single fuse tripping, in a large scale installation, is that the fuses tend to be cartridge fuses which means they must be mechanically (manually) replaced. In this scenario, the connected 3-phase equipment within the installation will appear to be "dead" to the user, or an installation engineer, in fact 2 phases remain "live", with the resulting risk to the safety of anyone attempting to diagnose the equipment without appropriate precautions.

The Applicant has found that in the present power and lighting system employing a 3-phase supply to the one or more LED-containing lighting devices, and particularly to LED lights, and optionally one or more non-LED/non-lighting devices or appliances, ensures that the phases of the power supply are balanced all the time and the dangers associated with 'hot neutrals' or single fuse tripping are substantially avoided, or significantly reduced.

Without wishing to be bound to any particular theory, it is proposed that use of a 3-phase supply in the present power and lighting systems provides a more balanced power supply, than is possible using a conventional single phase power supply. It is further proposed herein that in the present systems use of a 3-phase supply ensures that each of the single phase loads across the 3-phases of the power supply are automatically balanced all the time that means that the likelihood of this dangerous scenario is greatly reduced. In addition, because the present power and lighting systems employ means for automatic adjustment of the 3-phase supply, a balanced supply is ensured which means that the balance of the individual single phase loads across the 3-phase supply does not need to be periodically reviewed.

Whilst the present system is suitable for use with any AC voltage, and any suitable lighting device as defined herein, the Applicant has particularly found, as detailed hereinafter, that the use of a low voltage AC supply, distributed by bus bars to an LED based lighting system, and especially one or more LED arrays (as defined herein), provides user safety and complies with health and safety electrical standards whilst not requiring an IP rating. IP rating as defined herein means an IP (or "Ingress Protection") ratings are defined in international standard EN 60529 (British BS EN 60529: 1992, European IEC 60509:1989). IP ratings are used to define levels of sealing effectiveness of electrical enclosures against intrusion from foreign bodies (tools, dirt, etc.) and moisture.

The Applicant has also found that unprecedented efficiencies in terms of lighting and/or power costs are additionally provided via use of the present power and lighting system comprising the use of conductive bus bars and a 3-phase AC supply, and particularly where an extra-low voltage AC supply, less than or equal to 50 v AC (<=50 v AC), for power distribution to one or more LED-containing lighting devices, particularly LED lights independently selected from: one or more LED devices; one or more groups of LEDs; or one or more LED arrays, and optionally one or more non-LED/non-lighting devices.

In particular, the Applicant has found that the present bus bar/3-phase AC power system, and particularly a 3-phase low voltage AC power-based system, can be advantageously used to power LED-containing lighting devices, individually or in groups, within one or more lighting arrays, and optionally one or more non-lighting based devices in a wide range of applications. The Applicant has found that this 3-phase low voltage AC based system is especially useful for powering LED lights, individually or in groups, within one or more LED arrays, and optionally one or more non-LED/non-lighting devices.

In addition, the Applicant has found that the voltage drops observed using tubular bus bars for distribution of AC power across a range of voltage levels (high, low, extra-low) are consistently far less aggressive than corresponding voltage drops observed when compared to DC power at the same current and voltage levels. Furthermore the Applicant has also found that the voltage drops observed using tubular bus bars, and particularly aluminium tubular bus bars for distribution of AC power, across a range of voltage levels (high, low, extra-low) are less per unit of cross sectional area than can be achieved using systems having conventional wiring for distribution across the same range of voltage levels.

Where the AC power provided by the external source is high voltage AC, such as for example from the power grid, and the desired AC power levels to be used in any particular LED lighting arrangement for control via the present system are lower than those provided by said external source, then one or more AC step-down devices, and especially one or more AC step-down transformers may be used to reduce the voltage level prior to supply to the present control system for LED lighting. This is described hereinafter. High voltage AC as defined herein is a voltage of greater than 1000 V AC, low voltage as defined herein is a voltage of from 50 to 1000V AC, and extra-low voltage as defined herein is a voltage of less than or equal to 50 v AC (<=50 v AC), more particularly a voltage in the range of from 12 to 50 vV AC, and especially a voltage in the range of from 12 to 24 v AC. For the avoidance of doubt references to the advantages and benefits of using the present bus bar/3-phase AC power system with low voltage AC power as described throughout this application are especially applicable where the system utilises extra-low voltage AC power. All statements relating to further or additional aspects or particular embodiments or benefits or advantages relating to use of low voltage AC in the present systems are especially applicable to such systems where extra-low voltage is used.

The Applicant has also found that 'power line' technology also referred to herein as power line technology, provided via the bus bars provides a desirable control system for the lighting system, wherein the control system communicates with each individual lighting device/LED light, or groups of one or more lighting devices/LED lights or one or more arrays of lighting devices/LED lights via use of one or more lighting device/LED-specific registration chips for identification and control of individual lights or groups of lights to provide a remote controlled and monitored system, and wherein automatic correction of voltage drop within the system is managed by local inverters associated with each individual lighting device/LED light, or groups of one or more lighting devices/LED lights or one or more arrays of lighting devices/LED lights in accordance with the requirements of any particular system.

Advantageously, use of the present improved power and lighting system removes the need for any high voltage AC supplies near the environment in which the present power and lighting system is to be employed, i.e. the particular application to which the system is being applied, and ideally removes any high voltage AC to a remote or external location.

In addition, to the electrical efficiency and strength benefits from the use of bus bars the Applicant has found that the use of hollow conductive bus bars, and most particularly hollow conductive tubular or substantially tubular bus bars, provides additional benefits in relation to the overall system costs. Comparing the system to system costs for the power distribution means for similar current carrying capacities for power distribution via bus bars versus power distribution versus Copper wire, the Applicant has found that to provide a power and lighting system for LEDs based upon 3-phase AC power distributed by hollow conductive bus bars, and particularly by tubular or substantially tubular Aluminium bus bars versus, the system costs versus a comparable system where the 3-phase AC power is distributed by trirated Copper cabling, are significantly cheaper, with materials cost savings ranging from about 60% to about 93% by switching from Copper cabling to Aluminium tubes. The differences in the costs are dependent upon the power range within which the desired system is to be deployed, with the highest cost-savings being identified for systems operating in the 15 Kw to 20 Kw range. For example, using a 1 m length of Aluminium tubing of 25 mm (diameter)×1.2 mm (wall thickness) with a current carrying capacity of 350 A versus a 1 m length of Copper wire of 120 mm$^2$ having a current carrying capacity of 374 A the relative costs, based on current UK supplier costs, in £/A/m are £0.003 versus £0.043 i.e. the cost of using Copper wires is >14 more expensive.

The combination of the desirable flexibility of lighting provided by the power and lighting system herein in conjunction with the unprecedented efficiencies in terms of lighting and/or power costs deliverable via the use of bus bars and flexibility in the choice of AC voltage supply, high, low or extra-low voltage (<=50 v AC), for power distribution, and the attractive control system means that the present power and lighting system has manifold applications in a wide range of applications, and in both commercial and non-commercial/domestic applications. For the avoidance of doubt the term "wide range of applications" to which the present systems may be employed are commercial and/or domestic applications as defined herein and include: commercial applications including industrial applications; domestic applications which can also be called non-commercial applications; as well as applications having a combination of one or more of such applications for example, a building hosting both commercial and domestic spaces. Suitable examples of commercial or industrial and domestic applications for the present systems are detailed hereinafter. Where the term "applications" for the present power and lighting system is utilised herein this is intended to include commercial applications; domestic applications; or non-commercial applications; as well as applications having a combination of one or more of such applications unless specified otherwise.

Thus, the present improved power and lighting systems are suitable for use in a wide variety of applications independently selected from: commercial applications including industrial applications; domestic applications; or non-commercial applications; as well as applications having a combination of one or more of such applications.

In particular the Applicant has found that conductive bus bars, and particularly conductive tubular or substantially tubular bus bars, and more particularly conductive tubular or substantially tubular aluminium bus bars, and low voltage, and especially extra-low voltage 3-phase, AC can be used to power LED lights, individually or in groups, within one or more LED arrays within buildings where 'power line' technology, provided via the bus bars, provides a control system for the lighting system, and wherein the control system communicates with each individual LED light/group or array via use of one or more registration chips for identification.

The Applicant has also recognised that the use of bus bars, particularly tubular bus bars using 3-phase AC as detailed herein is useful for not only for providing power to non-lighting specific devices, but also for providing such power in a safe, efficient and cost effective manner.

Advantageously power line technology, combined with registration chips on each array, gives total remote control and monitoring of either the lighting or the combined power and lighting systems herein. Such remote control not only has advantages in relation to the maintenance of power usage, it also enables the set-up of controllable systems, which can be tailored/pre-programmed to change during specified time-periods (minutes, hours, days, weeks, months) according to the particular needs of the user.

Further advantage of the web-based remote-control features of the power and lighting system herein is the ability to efficiently carry out power source blending between peak and off peak main power supplies, and also between a main power supply and alternative, renewable power supplies such as for example solar power.

Whilst the total number of LED-containing lighting devices, and particularly LED lights, within the system, and their arrangement within it will be dependent upon the needs of the particular application, advantageously the combination of the present system and power line technology provides the ability to manage and control systems having 100,000 or more individual lighting devices or LEDs. The present system provides freedom in relation to the spacing of any of the LED-containing lighting devices, particularly LED lights as defined herein from one another as well as the relative positioning of groups of one or more lighting devices, or in particular LEDs from each other within the array.

An advantage of a lighting feedback loop is the ability of the system to react to external (non-lighting/non-LED array-associated) light levels such as for example light sensors and lighting needs such as for example motion sensors to provide optimal efficiency on an on-going basis.

Advantages of the non-lighting/non-LED device feedback loop is the ability of the system to react to local environmental factors such as for example motion sensors to provide power to non-lighting devices such as for example PCs, screens, and such like in low-activity areas effectively on demand.

The lighting devices as defined herein, particularly LED lights, and the non-lighting devices for use within the present system can be controlled independently using powerline technology, or using a wireless link to a local PC or via the internet remotely, or by using a combination of powerline and wireless technologies according the needs of the particular system to be controlled. To affect such control, each lighting device or LED light, lighting or LED light fitting, or non-lighting/non-LED device for use in the system is fitted with a registration chip that can be identified and controlled separately.

Advantageously, the present system provides for the first time an effective "plug and play" system for complex power and lighting systems which can be designed and changed by the user in accordance with the desired system to be accommodated and then the individual LED-containing lighting devices, particularly LEDs, or groups or lighting devices, particularly LEDs, and one or more non-lighting devices can be registered and routinely calibrated as detailed hereinafter.

Exemplary lighting arrangements for use of the present system for the provision of power and lighting in both commercial and domestic applications are discussed hereinafter and illustrated by the Figures. For the avoidance of doubt, whilst these Figures illustrate how the present power and lighting system may be employed in specific applications, these figures are not to be regarded as being limiting, and alternative commercial or domestic applications are possible and remain within the scope of the present disclosure.

Definitions

The term one or more power consuming device as defined herein means, one or more LED-containing lighting devices and optionally one or more non-lighting/non-LED device. Where the term one or more lighting devices and optionally one or more non-lighting/non-LED device is used herein this means one or more power consuming device. For the avoidance of doubt the LED-containing lighting devices and non-lighting devices which are controlled via the present power and lighting system include: non-LED based lights which are powered via DC power; LED lights as defined hereinafter, wherein said LEDs may be controlled independently, individually, in one or more groups, or as one or more independently controllable arrays; and non-lighting/non-LED devices as defined herein wherein said non-lighting/non-LED devices may be controlled independently, individually or in one or more groups. Especially preferred lighting devices for use herein are LED lights. The term LED-containing lighting device includes commercially available LEDs, as well as lighting fixtures including one or more LEDs. As detailed herein any suitable LED-containing lighting device may be utilised in the present system including LEDs, light fittings including at least one LED, luminaires containing at least one LED, one or more groups of LEDs, one or more groups of light fittings each containing at least one LED, one or more groups of luminaires each containing at least one LED, or one or more arrays of LEDs.

Exemplary lighting devices ~~fixtures~~ including one or more LEDs suitable for use herein as the one or more LED-containing power consuming devices include luminaires and other commercially available LED-containing light devices. A luminaire is another term for an LED-containing lighting fitting. An LED-containing lighting fitting comprises one or more LEDs and the means by which the one or more LEDs are held within the lighting fitting. As LED fixture is another term for an LED itself, as such where the term LED-fixture is used herein this means an LED. Examples of LED-containing light fittings suitable for use herein include LED spotlights, LED floodlights, LED strip lights, or arrays or strips containing LEDs.

According to an aspect the one or more LED-containing lighting devices for use in the present systems are independently selected from: LED lights; LED spotlights, LED floodlights; LED array comprising one or more LED lights; groups of LED lights, LED spotlights, or LED floodlights; light fittings including at least one LED; luminaires containing at least one LED; LED strip lights; strips containing LED lights; or any combination thereof.

According to another aspect the lighting within the system comprises an LED array comprising one or more LED lights, or groups of LED lights including: one or more LED spotlights; one or more LED floodlights; one or more LED strip lights; or one or strips containing LED lights; or any combination of LED spotlights, LED floodlights, LED strip lights, or arrays or strips containing LEDs.

According to a further aspect the one or more LED-containing lighting devices for use in the present systems are modular 3-phase LED fixtures comprising LED-containing lighting elements, which can be connected together with a suitable connector, in order to assemble a usable 3-phase LED fixture. As such where the term modular 3-phase LED-fixture is used herein this means a fixture comprising LED-containing lighting elements, which can be connected together with a suitable connector, in order to assemble a usable 3-phase LED fixture. As will be readily appreciated the total number of lighting elements within any given 3-phase LED fixture can be increased by use of additional lighting elements and connectors as desired. An illustration of an exemplary modular 3-phase LED fixture suitable for use in the present systems is provided in FIG. 8.

An LED strip as defined herein is a linear strip that includes one or more LEDs arranged at equal spacing from one another and connected to one another by suitable wiring. For use in specified applications hereinafter, such as for example growth systems such LED strips are co-located with and adjoined to a suitable T-shaped host to enable ease-of-use within such systems. A strip-style LED array based on LED strips as defined herein means one or more connected strip style LED arrays that are subject to common control means. For the avoidance of doubt, a strip style LED array as defined herein includes one or more individual LED strips, or groups of individual LED strips.

Non-lighting devices, also referred herein to as non-LED/non-lighting devices, which may be controlled via the present power and lighting system are any non-lighting specific devices suitable for use in either domestic or commercial applications. For the avoidance of doubt, any low-voltage compatible device may be powered via the presently proposed system via connection into the system via a device-specific registration chip and a local device-specific inverter/controller incorporated into the device lead with a suitable plug. For example, in exemplary domestic or commercial systems one or more devices such as laptops, personal computers (PCs), printers, scanners, dictation machines, telephone answering machines, chargers including mobilephone chargers, tablet chargers, mobile gaming device chargers, camera and video chargers, TVs, monitors, shavers, hair trimmers, radios, smoke alarms/detectors, $CO_2$ alarms/detectors, security alarms and sensors and the like can be powered using the present system. Sound systems including either domestic surround sound or whole house systems, as well as large scale commercial or industrial sound systems are also suitable arrangements for power distribution to and remote control management thereof via the present bus bar arrangements and either power line or local/repeater wireless technology. For the avoidance of doubt, the term non-lighting device includes machinery suitable for powering via low voltage 3-phase AC, and in particular includes low power motor-driven machinery wherein the motors are suitable for use with low voltage or extra-low voltage AC power. Exemplary machinery suitable for use are generally referred to as small machines, and includes water pumps, automated seeding and harvesting machines, packaging machines and the like.

For the avoidance of doubt a particularly useful application of the present power and lighting system is for the provision of power for a multiplicity of small devices over a large area, with associated provision of the relevant lighting, including particularly LED lighting therefor. Exemplary applications where a multiplicity of small devices are utilised over a large area includes servers within one or more computer server rooms.

According to a yet further aspect the present power and lighting system provides for the first time a system suitable for use to power a multiplicity of lighting devices and/or non-lighting devices wherein the lighting is an LED array comprising LED one or more LED lights, or groups of LED lights, wherein the array is adapted to be powered by a 3-phase AC low voltage power supply and (i) wherein the low voltage, 3-phase, AC power distributed to the array is linked to a main transformer which may be positioned externally or internally;

(ii) wherein the low voltage, 3-phase, AC power is distributed by conductive hollow bus bars, and preferably wherein the low voltage, 3-phase, AC power is distributed by conductive hollow tubular or substantially tubular bus bars;

(iii) wherein the low voltage, 3-phase, AC supplied to each LED light, or group of LED lights within the array is converted to low voltage DC at a 3-phase AC/DC rectifier associated with each LED light, or group of LED lights;

(iv) wherein the system includes means for automatic control of the output of the LED array as a whole, or individual LED lights, or groups of LED lights within the array; and optionally (v) wherein the bus bars are adapted to power one or more non-LED/non-lighting devices within the system.

According to a yet further aspect the present power and lighting system provides a system as defined directly hereinbefore wherein the array is adapted to be powered by a 3-phase AC extra-low voltage power supply.

Domestic applications as defined herein are domestic buildings including: houses and outbuildings associated with houses, such as and including sheds, garages, outhouses, garden rooms, and domestic greenhouses and the like.

Commercial applications as defined herein include use of the system for the provision of power and lighting in: industrial buildings; commercial buildings including single retail outlets and multiple retail outlets within a mall or mall-like environment; manufacturing facilities, factories, warehouses, storage facilities and the like; premises adapted for or suitable for promotion of growth of living organisms including greenhouses and the like as detailed hereinafter; buildings including primarily offices/spaces for desk-based-work; buildings and/or warehouses suitable for material handling, and/or storage; factory or manufacturing buildings suitable for the preparation of goods; research facilities; hospitals; airport terminal buildings; and the like. As will be appreciated by the skilled person, any building where efficiencies in power and/or lighting are desirable can be adapted for use with the present system either in whole, or in part depending upon the requirements of the particular building. For the avoidance of doubt, where the term commercial is used herein in relation to applications of the present power and lighting systems this is inclusive of industrial applications.

Industrial applications as defined herein are applications that have scale. Scale as defined herein in relation to any particular electrical application is an application that requires an input level of electrical energy of more than 100 Amps.

Further commercial/industrial applications include: street lighting; floodlighting; lighting in parks and public spaces; car park lighting.

A remote location as defined herein means either a location which, although internal to the building, is at a remote location in relation to the lighting system, such as for example to a plant room, or the like.

Exemplary applications of the systems disclosed herein are applications relating to growth including horticulture, agriculture, and aquaculture, as applications relating to the provision of power and lighting in settings where animals are held including in animal husbandry, applications relating to the deployment of power and lighting systems in large-scale settings having a demand for dynamic, responsive LED lighting, and applications where LED-lighting and power are in close proximity to humans.

Thus, in accordance with a further aspect there is provided a method for the provision of controllable power and lighting, or use of the present controllable power and lighting system in applications independently selected from:

(i) applications relating to growth including horticulture, agriculture, and aquaculture;

(ii) as applications relating to the provision of power and lighting in settings where animals are held including in animal husbandry;

(ii) applications relating to the deployment of power and lighting systems in large-scale settings having a demand for dynamic, responsive LED lighting; and (iv) applications where LED-lighting and power are in close proximity to humans wherein the method, or use, comprises a power and lighting system comprising one or more power consuming devices, wherein at least one of the power consuming devices is an LED-containing lighting device, wherein the LED-containing lighting device is adapted to be powered by a 3-phase AC power supply and wherein the 3-phase AC power supplied to the system is converted to DC power via 3-phase AC/DC rectification.

According additional aspects, in the above method, or use, for provision of controllable power and lighting the 3-phase AC power supplied to each LED-containing lighting device is reduced by a step-down device or by a main AC step-down transformer, and/or the 3-phase AC power supplied to the system is less than or equal to 50V AC RMS, and/or the 3-phase AC power supplied to the system is distributed by conductive bus bars, and/or the system includes means for automatic control of each device, and/or wherein powerline communications are used to command each device.

The present systems are particularly advantageous for use in applications relating to growth, including for horticultural, agricultural, and aqua-cultural growth settings, and applications relating to settings where animals are held is because they can be used in close-proximity to the growing material, plant, culture, nutrient or the like, as well as in close-proximity to humans, and also in close-proximity to animals. The features of the systems which mean they can be located in close-proximity to growing materials, humans or animals are that the systems can utilise, low voltage 3-phase AC power, and especially extra-low (<=50V AC RMS) AC power, but also that the present systems enable the LED lighting to be spaced to be achieve optimum uniformity in close, suitable, proximity to a growing material, or to a setting where animals are held, as well as to provide for the first time a very low level of distorted light (unwanted distortion via electrical harmonics or other) at close proximity to the growth material, animals or humans.

The present systems are particularly advantageous for use in applications relating to the deployment of power and lighting systems in large-scale settings having a demand for dynamic, responsive LED lighting, and including retail applications such as shopping centres, supermarkets, large-scale facilities including hospitals and the like, is because of the balanced 3-phase power supply under all conditions and combinations of lighting adjustments. The features of the present systems which mean they can be advantageously deployed in such large-scale settings are their power factors of close to 1.0 and minimal harmonics generation.

The present systems are particularly advantageous for use in applications where LED-lighting and power are in close proximity to humans because they assure user safety and comply with health and safety electrical standards but not require an IP rating. The features of the system which mean they can be advantageously deployed in close proximity to humans is because the systems can utilise, low voltage 3-phase AC power, and especially extra-low (<=50V AC RMS) AC power.

For the avoidance of doubt where the term local is used hereinafter it has its ordinary meaning of being near, near-to, nearby, beside, in close-proximity to, co-located with unless specified otherwise herein. Where the term local is used herein in relation to the relative location of a local PC, one or more local sensors, local/repeater wireless technology, local SMPS, local individual controller, local Wi-Fi® generation, and local microcontrollers then this ordinary meaning is applicable.

In some circumstances, where the term local is used herein, such as in relation to means for local rectification, also referred to herein as local conversion then as would be appreciated by the skilled individual, the rectifying components are typically housed within the enclosure of the LED-containing lighting device, and are thereby local-to the device.

Where the term local is used herein, in relation to means for local rectification and voltage correction, also referred to herein as local conversion and final correction of the voltage, or local rectification and local voltage control means, then as would be appreciated by the skilled individual, the rectifying and voltage correction/control device components are typically housed within the enclosure of the LED-containing lighting device, and are thereby local-to the device.

In relation to rectification or rectification and correction means herein, where the components for rectification, or rectification and correction, are not housed-within the device then the term local has its ordinary meaning of being near, near-to, nearby, beside, in close-proximity to, co-located with this can be further qualified in terms of being no more than 1 m distant from the power consuming device.

As described hereinafter a local LED-registration chip is typically associated with one, or more generally a group of LEDs and is thereby co-located with and local-to one or more LEDs.

In other instances, where the term local is used herein, such as in relation to means for inversion, then the inverter components may be housed with the enclosure of an LED-containing lighting device or may be co-located with the device and thereby local-to one or more LEDs. Typically, local means for inversion are located no more than 1 m from the lighting device.

The term extra low voltage, in respect of the power distributed, from the step-down device, such as a step-down transformer via the bus bars to the one or more power consuming devices, such as for example an LED-containing lighting array, and optionally one or more non-LED/non-lighting devices, as defined herein means an AC voltage of less than or equal to 50 volts (v) AC (<=50 v AC), and particularly a voltage in the range of from 0 to 50 v, or from 12 to 50 v, or from 24 to 50 v. Some local regulations classify <50 v as extra low voltage. For example, in the UK at page 36 of the 17$^{th}$ edition of the UK Wiring Regulations, in BS 7671:2008 Amendment 3, extra low voltage is a voltage not exceeding 50 v AC i.e. <=50 v AC.

The terms single phase and 3-phase, in respect of electrical supplies used herein are defined as follows: a single phase electrical supply is a sine wave, alternating current (AC) flow; and a 3-phase electrical supply is three sine wave, alternating current (AC) flows, where each sine wave is out of phase by 120 degrees with the other two other sine waves.

The term star in relation to systems herein having a 3-phase AC electrical supply means a system which includes three line (positive) bus bars and one neutral bus bar. As will be readily appreciated in complex bus bar assemblies there may be a series of primary bus bar sections each of which has three line (positive) bus bars and one neutral bus bar.

The term delta in relation to systems herein having a 3-phase AC electrical supply means a system that includes three line (positive) bus bars and no neutral bus bar. As will be readily appreciated, in complex bus bar assemblies there may be a series of primary bus bar sections, each of which has three line (positive) bus bars.

For the avoidance of doubt, the term line conductor as used herein in respect of bus bars means a positive bus bar. Whilst the term "positive" is in general use worldwide, in the UK, the British wiring regulations recommend using the term line conductor. Further terms having the same meaning as a line conductor, as confirmed by BS 7671:2008 Amendment 3 of the 17$^{th}$ edition of the UK Wiring Regulations, at page 30, are protective conductor and/or PEN conductor. As such, the term line conductor, and or line bus bar as used herein means a positive conductor or bus bar, a protective conductor or bus bar, or in systems in accordance with the present disclosure comprising both line and neutral bus bars, a protective earth-neutral (PEN) conductor or bus bar.

Described hereinafter are features of the present system, and in particular a controllable power and lighting system for domestic and/or commercial/industrial utility, particularly including use of a bus bar assembly of one or more conductive bus bars, and more particularly including use of use of a bus bar assembly of one or more conductive tubular or substantially tubular bus bars, for power distribution, wherein the power supplied to the lighting system is 3-phase, AC power, particularly low voltage 3-phase AC power, and more particularly extra-low voltage 3-phase AC power, provided via one or more voltage step-down devices, and especially via one or more step-down transformers, and wherein the power and lighting system includes one or more DC powered lighting devices, particularly one or more LED lights, and optionally one or more non-LED/non-lighting devices which utilises power line technology for the delivery of a communications gateway.

Any suitable means for accomplishing the 3-phase AC/DC rectification may be utilised in the controllable power and lighting systems herein. Exemplary means for AC/DC rectification suitable for use herein are diode bridge rectifiers and active synchronous rectifiers. The selection of a suitable rectifier for the selected AC input and desired DC output is considered to be within the skill of an experienced practitioner. Thus, there is provided a controllable power and lighting system as defined herein wherein the AC/DC rectification is provided via diode bridge rectification or active synchronous rectification.

Each connected load as defined herein means each power consuming LED-containing lighting device, group of LED-containing lighting devices, or array comprising LEDs-containing devices, or non-lighting device which is adapted to be powered by the rectified DC power provided via the 3-phase AC/DC rectification of the 3-phase AC power, and in particular as distributed via the bus bar(s) as detailed hereinafter. For the avoidance of doubt in systems where the lighting comprises one or more LED arrays then each LED strip having local rectification means would comprise an individual connected load.

As detailed hereinafter in accordance with a particular aspect the controllable power and lighting systems according to the present disclosure, the 3-phase AC power is supplied to the lighting system via bus bars. For the avoidance of doubt, and as discussed herein, where appropriate alternative means for power distribution on the AC-side could optionally be utilised such as for example, wiring, particularly copper wiring depending upon the requirements of the particular system.

Thus there is additionally provided herein a controllable power and lighting system wherein the LED-lighting comprises one or more LED-containing lighting devices, or group of one or more LED-lighting devices, or an LED array comprising LED lights wherein the devices or lights are adapted to be powered by a 3-phase AC power supply wherein (i) the 3-phase AC power distributed to the LED-lighting as a whole is low voltage or extra-low voltage 3-phase AC power linked to an AC main transformer;

(ii) the 3-phase AC power is distributed by conductive bus bars;

(iii) the 3-phase AC power supplied to each lighting device, or group of lighting devices is converted to low voltage or extra-low voltage DC via 3-phase AC/DC rectification of the power supplied to each connected load, and particularly via an AC/DC rectifier associated with each lighting device or group of lighting devices; and (iv) the system includes means for automatic control of the output of the lighting as a whole, or individual lighting devices, or groups of lighting devices within the system; and optionally (v) wherein the bus bars are adapted to power one or more optional non-lighting/non-LED-containing devices within the system.

As detailed herein 3-phase power is modified by the present system prior to provision to the one or more LED-containing lighting devices, such as for example LEDs, luminaires, LED-fittings, modular fittings and the like as described hereinbefore. 3-phase electricity is distributed via a suitable bus bar system to the one or more LED-containing lighting devices. Each LED-containing lighting device contains an LED-specific registration chip and means for local rectification of AC to DC prior to supplying power to the LED fixture. In the present systems the initial power signal i.e. the stepped-down 3-phase AC electrical supply, has three sine waves, wherein each sine wave is out-of-phase by 120 degrees with the other two other sine waves. This initial 3-phase stepped-down AC power signal is rectified by suitable local rectification means to provide a rectified, output DC voltage which is used to provide consistent power levels throughout the LED-containing lighting devices within the present systems. The positioning of the local rectification means is very close to the LEDs within the light fittings or fixtures, and the power supply throughout the lighting system is DC power. Suitable means for provision of such local rectification are one or more LED drivers. As the means for sending the data (powerline) only works on AC, the AC must be located close to the lighting within the system to obviate the need for additional wiring or alternative means for directing command signals to the lighting. An exemplary system embodying local rectification is illustrated in FIG. 7.

As detailed hereinbefore the Applicant has found that it is advantageous to use local rectification means for the 3-phase AC/DC rectification. Thus there is disclosed herein a controllable power and lighting system comprising one or more power consuming devices, wherein at least one of the power consuming devices is an LED-containing lighting device, wherein the LED-containing lighting device is adapted to be powered by a 3-phase AC power supply and wherein the 3-phase AC power supplied to the system is converted to DC power via local 3-phase AC/DC rectification. In these systems the means for local rectification/the rectifying components are either housed within the enclosure of the one or LED-containing lighting devices, and are thereby local-to the device, or are co-located with the one or more LED-containing lighting device, and in a particular aspect are either housed within the enclosure of the one or more LED-containing lighting device or are no more than 1 m distant from the one or more LED-containing lighting devices.

Thus there is additionally provided herein a controllable power and lighting system wherein the LED-lighting comprises one or more LED-containing lighting devices, or group of one or more LED-lighting devices, or an LED array comprising LED lights wherein the devices or lights are adapted to be powered by a 3-phase AC power supply wherein (i) the 3-phase AC power distributed to the LED-lighting as a whole is low voltage or extra-low voltage 3-phase AC power linked to an AC main transformer;

(ii) the 3-phase AC power is distributed by conductive bus bars;

(iii) the 3-phase AC power supplied to each lighting device, or group of lighting devices is converted to low voltage or extra-low voltage DC via local 3-phase AC/DC rectification of the power supplied to each connected load, and particularly via a local AC/DC rectifier associated with each lighting device or group of lighting devices; and (iv) the system includes means for automatic control of the output of the lighting as a whole, or individual lighting devices, or groups of lighting devices within the system; and optionally wherein the bus bars are adapted to power one or more optional non-lighting/non-LED-containing devices within the system and wherein the means for local 3-phase AC/DC rectification is housed within the enclosure of the one or LED-containing lighting devices or LED lights, or wherein the means for local 3-phase AC/DC rectification is located close to the one or LED-containing lighting devices, or group of one or more LED-lighting devices, or an LED array comprising LED lights, and is preferably no more than 1 m distant from the device, group of devices, or array. There is additionally disclosed herein a power and lighting system having enhanced safety wherein the means for local 3-phase AC/DC rectification is housed within the enclosure of the one or more LED-containing lighting devices.

In general terms the manner in which a 3-phase LED driver suitable for use in the present controllable power and lighting systems works is as follows: an input 3-phase AC power supply, and typically at 220 v-415 v, depending upon the requirements of the particular system, supplies a step-down voltage device or a transformer; a lower output AC voltage, exits the transformer or step-down voltage device and is fed into a suitable 3-phase AC/DC rectifier which outputs a rectified DC voltage, represented by; at this stage the voltage ripple within the DC current exiting rectifier can still be observed; the now-rectified DC voltage supplies a suitable LED driver stack comprising one or more LED driver chips, a microcontroller, and means for provision of communications functionality; the output from the LED driver stack is a stable DC current, which can be linear or pulse width modulated. It is this stable DC current which drives the one or more LED-containing lighting devices, such as for example an array of LED fixtures.

To implement that perfectly balanced scaling-up of the 3-phase LED driver system as used in the present controllable power and lighting systems, as discussed hereinbefore in a large installation for example, having a 3-phase+neutral supply, all the power loads within the lighting system i.e. the one or more LED-containing lighting devices, such as LED lighting fixtures, are in common electrical communication with the 3-power phases and optionally to the neutral line, depending upon whether a STAR or DELTA arrangement is being utilised. Utility of the 3-phase LED driver system is illustrated in FIG. 13, which additionally shows that by use of the present 3-phase LED driver system, when the lights are dimmed all 3 power phases remain 100% balanced across all combinations of dimming. This is required for large installations.

The Applicant has found that the use of hollow bus bars as detailed herein, and in particular the use of tubular or substantially tubular hollow Aluminium bus bars, in systems where high currents are utilised provides an additional advantage that less transformers are required than would be necessary for a conventional system at the same current level. For example, the Applicant has found in the present systems based on a total bus bar length of 50 m of tubular aluminium bus bars, as primary, secondary, and or tertiary bus bars, can function with 2, 3 or 4 transformers, which in a building of 50 m by 50 m equates to one transformer per 600 $m^2$ to one transformer per 1250 $m^2$.

Lux (lx) is the SI unit of measurement of light level intensity, also known as illuminance or illumination and is measurable using a lux meter. A single lux is equal to the illumination of a surface one metre away from a single candle. One lux (Lx) is equivalent to one lumen spread over an area or one square metre. A Lumen, also known as luminous flux, is a standardised unit of measurement of the total amount of light (packets or quanta) produced by a light source such as an LED. For example, 1000 lumens, concentrated into an area of one square metre, lights up that square metre with an illuminance of 1000 lux, whilst spreading the same 1000 Lumens, over ten square metres, produces an illuminance of only 100 Lux.

Store lighting ranges from 200 lumen/$m^2$ to 1,000 lumen/$m^2$, and is typically about 200 lumen/$m^2$ for warehouse and 1,000 lumen/m² for supermarkets. Warehouses and supermarkets are relatively large area, and to provide desired illuminance levels in supermarkets typically requires larger number of light fittings, and an increased number of transformers with the associated increases in both initial implementation costs and ongoing power consumption costs for the system.

Utility of LEDs capable of providing 200 lumen/watt in the present systems to product a Lux of 1,000 lumens/m² would equate to 5-6 watts/m² and require the use of transformers at between 6 and 8 Kw. The Applicant has found that the present systems where a 3-phase voltage of less than or equal to 50 v AC is used, a lux of 1,0000 lumens/m² can be delivered using transformers at between 6 and 8 Kw and a current level of between 50 and 100 amps per phase.

Thus the present disclosure additionally provides a controllable power and lighting system comprising one or more power consuming devices, wherein at least one of the power consuming devices is an LED-containing lighting device, wherein the LED-containing lighting device is adapted to be powered by a 3-phase AC power supply of less than or equal to 50 v AC, wherein the 3-phase AC power supplied to the system is converted to DC power via 3-phase AC/DC rectification and wherein the power is distributed by tubular or substantially tubular bus bars and the voltage is reduced using a step-down device and in particular a transformer of between 6 and 8 Kw.

This means that the present systems are ideally suited for use in large installations, such as for example supermarkets and the like, where high Lux (lumen/m²) is required.

Bus Bars

The bus bar arrangements for use in the present systems employ 3 positive/line bus bars and an optional neutral bus bar (star or delta configuration) running in conjunction with one another. The present systems can employ arrangements of line and neutral bus bars that run in parallel with one another, which are non-parallel with one another, or where the bus bars are provided in a concentric arrangement. A segment of an exemplary parallel positive and neutral bus bar arrangement is discussed hereinafter and is illustrated in the Figures. As detailed hereinafter in relation to particular lighting devices comprising LED lighting arrays in one arrangement the +/− electrical connections from the bus bars to the local rectifiers associated with each LED containing T-shaped strip are effected by any suitable means, and in particular by clips from the bar(s) to each strip. For the avoidance of doubt, whilst a specific T-shaped LED-containing strip arrangement is described herein, any suitable strip shape can be used in the present controllable power and lighting systems, including conventional, commercially available LED-containing strips as also detailed herein.

According to a further aspect there is provided herein a power and lighting system as detailed hereinbefore wherein the 3-phase AC electrical supply, particularly a low voltage 3-phase AC electrical supply, more particularly an extra-low voltage 3-phase AC electrical supply from the voltage step-down device, more particularly from the transformer, which may be located internally or externally, to the bus bar assembly is provided in a star or delta configuration.

According to a yet further aspect there is provided herein a power and lighting system as detailed hereinbefore wherein the 3-phase AC electrical supply, particularly a low voltage 3-phase AC electrical supply, more particularly an extra-low voltage 3-phase AC electrical supply, from the voltage step-down device, more particularly from the transformer is provided via a star configuration to a primary bus bar assembly comprising three line bus bars and one neutral bus bar, or via a delta configuration to a primary bus bar assembly comprising three line bus bars.

According to another aspect there is provided use of a power and lighting system as detailed herein, in large scale commercial applications, such as industrial applications, and particularly for large scale indoor farming, wherein the 3-phase AC electrical supply, particularly a low voltage 3-phase AC electrical supply, more particularly an extra-low voltage 3-phase AC electrical supply, from the voltage step-down device, more particularly from the transformer is provided via a delta configuration to a primary bus bar assembly comprising three line bus bars and wherein the input level of electrical energy into the system is more than 100 Amps.

Advantages of the bus bar arrangement versus present commercially available lighting systems include: the use of voltage step-down devices, such as transformers to effect an AC voltage reduction combined with local rectification/local voltage correction to provide a usable power and lighting system, particularly a usable low voltage power and lighting system, more particularly a usable extra-low voltage power and lighting system; efficiencies of from 90 to 94%; means for self-regulating system control; provision of automatic voltage correction; ability to control arrays containing more than 100,000 lighting devices, and particularly more than 100,000 LEDs via use of power line technology; more efficient wiring system with typically only final wiring to the LED-containing devices on the DC-side, being required, and being provided via copper wire; provision of a "plug and play" LED array; use of wireless link(s) to local sensors within the system as part of the management and remote-control of features within the array(s); and the ability to carry large currents at low or extra-low AC voltages over long distances. As detailed hereinbefore the use of a 3-phase AC power supply, particularly a low voltage 3-phase AC power supply, more particularly an extra-low voltage 3-phase AC power supply with associated 3-phase rectification enables the use of smaller capacitors with associated advantages in terms of overall operating costs and efficiency of the system, versus a single phase based system.

In applications employing the present system the power is initially provided from the voltage step-down device, more particularly from the transformer, into a main bus bar system comprising one or more main bus bars, and thereafter to one or more secondary bus bars, and optionally onto one or more tertiary bus bars. For the avoidance of doubt, and as explained hereinbefore the bus bars as utilised herein can employ arrangements of line and neutral bus bars which run in parallel with one another, which are non-parallel with one another, or where the bus bars are provided in a concentric arrangement. The Applicant has found that for efficient system design, bus bar assemblies employing line bus bars and optional neutral bus bars running in parallel with one another are of particular use. This feature is discussed and illustrated in the Figures hereinafter.

In such systems a main bus bar system comprising one or more main bus bars means one or more positive/line bus bars and optional neutral bus bar running in parallel with one another and where the bus bars are connected to one another, or are joined to for example secondary bus bars, or where one or other of the bus bars is shaped or bent in order to be suitably located into the commercial/industrial or domestic location then said bus bars may be non-parallel with one another at such joins, bends or otherwise shaped sections.

Thus the present application provides a power and lighting system for commercial/industrial and/or domestic applications as defined hereinbefore wherein the power is distributed via a conductive bus bar assembly comprising a main bus bar system comprising one or more main bus bars, and thereafter to one or more secondary bus bars, and optionally onto one or more tertiary bus bars.

Any suitable conductive bus bars, also known as bus bars, buss bars, or bus bars made of any suitable conductive material, and in particular metals such as aluminium, copper or brass, or mixtures thereof may be used in the present bus bar assembly. The bus bars for use in the commercial/industrial and/or domestic systems herein include; hollow bus bars; tubular or substantially tubular bus bars; hollow metal bus bars; tubular or substantially tubular metal bus bars; aluminium tubular or substantially tubular bus bars; aluminium hollow bus bars; copper tubular or substantially tubular bus bars; copper hollow bus bars; metal-coated hollow bus bars and combinations thereof. The present systems may employ different bus bars for each of the main, secondary and tertiary bus bar arrangements, or the same material for each, or any other combination of suitable bus bar materials according to the requirements of the particular power and lighting system.

As discussed hereinafter, the Applicant has found that the use of hollow conductive bus bars is advantageous not only for the provision of desirable mechanical strength in combination with design flexibility but additionally provides skin-effect benefits. Thus, according to a further aspect the present disclosure additionally comprises a system as defined herein having conductive bus bars, particularly hollow conductive bus bars, particularly tubular or substantially tubular hollow bus bars, and more particularly tubular or substantially tubular hollow bus bars which are made of Al or Cu or a mixture thereof. For the avoidance of doubt, this includes systems having main, secondary and optionally tertiary bus bars wherein each of the main, secondary and optionally tertiary bus bars assemblies independently comprises Al or Cu bus bars, and particularly tubular or substantially tubular hollow Al or Cu bus bars.

The Applicant has found that for optimal results hollow conductive bus bars are preferred. Whilst any suitable shape of such hollow conductive bus bars including tubular, square or alternative shape as desired may be used, the Applicant has found that for optimal results tubular or substantially tubular hollow bus bars are preferred. In addition, the Applicant has found that use of tubular bus bars, particularly aluminium tubular bus bars, are of particular benefit for the provision of system design flexibility, such as for example for use in large-scale growth systems. Tubular bus bars are hollow internally. Typically, tubular bus bars are essentially circular in cross-section and are hollow internally. Whilst the Applicant has found that for optimal results circular or essentially circular tubular or substantially tubular bus bars are preferred, alternative tubular curved bus bars having elliptical or oval cross-sections can also be utilised in the present systems. Tubular or substantially tubular bus bars having any wall thickness and/or diameter are suitable for use herein. Where the term tubular is used hereinafter this means tubular and/or substantially tubular as defined herein unless specified otherwise. The external surface i.e. the wall of a tubular or substantially tubular bus bar as defined herein may be solid, or may include holes or pits or indents.

According to a further aspect the present disclosure additionally comprises a controllable power and lighting system comprising one or more power consuming devices, wherein at least one of the power consuming devices is an LED-containing lighting device, wherein the LED-containing lighting device is adapted to be powered by a 3-phase AC power supply and wherein the 3-phase AC power supplied to the system is converted to DC power via 3-phase AC/DC rectification and wherein the power is distributed by hollow conductive bus bars, wherein the bus bars are tubular or substantially tubular bus bars and are independently selected from tubular bus bars that are essentially circular in cross-section and are hollow internally; tubular bus bars that are essentially elliptical in cross-section and are hollow internally; tubular bus bars that are essentially oval in cross-section and are hollow internally; and hollow tubular or substantially tubular bus bars made of non-conductive material which are coated with a conductive metal.

The bus bars for use herein additionally include hollow tubular or substantially tubular bus bars made of non-conductive material which are coated with a conductive metal such as Al, Cu or brass, and particularly Al or Cu are also suitable for use herein as conductive hollow bus bars. Non-conductive materials, also known as insulators suitable for use herein in metal-coated bus bars include glass, porcelain, rubber or composite polymer insulators. From the viewpoint of system flexibility use of rubber or composite polymer insulators as the internal hollow core onto which the outer metal layer is coated are preferred in systems employing metal coated bus bars.

For the avoidance of doubt and as detailed hereinafter, the system may additionally include copper wiring. For example a bus bar assembly may include a series of connected tubular or substantially tubular conductive Aluminium bus bars to carry the 3-phase AC power within the system, initially to the means for voltage step-down and thereafter to distribute the stepped-down 3-phase AC power throughout the bus bar assembly on the AC-side of the rectification means. As detailed hereinbefore the main or primary bus bars have the widest diameter, the secondary bus bars have a narrower diameter, and if the system-scale or parameters require tertiary tubular or substantially tubular conductive Aluminium bus bars then these would have a narrower-still diameter. On the DC-side of the rectification means the 3-phase DC power is provided to the power consuming device via any suitable means. In particular where the LED-containing lighting device is directly connected to the means for AC/DC rectification i.e. the device can be bolted together with the means, or where the LED-containing lighting device is connected to the means for AC/DC rectification and is hung from a suitable line. Where the device is hung the connection is effected via suitable device wiring and in particular via a short tubular line, more particularly via a short copper wire. The length of the short copper wire is related to the voltage drop. The Applicant has found that if the copper wire is too long then the voltage drop is too great and the LED-containing lighting devices within the system will not function properly. The length of the copper wire will be dependent upon the particular lighting requirements within any particular system.

Various different bus bar shapes are discussed herein.

For the avoidance of doubt the selection of a suitable bus bar, and in particular the wall thickness (for a tubular or substantially bus bar, and/or diameter of the bus bars will be dependent upon the requirements of the particular part of the commercial/industrial and/or domestic power and lighting system in which it is to be employed, either from the viewpoint of providing the necessary levels of support for the lighting devices, and in particular LED array(s), where required, or for the provision of optimal cost per metre of the particular power loading being provided to and distributed by the bus bar system.

As such metal bus bars, including Al and/or Cu bus bars, for use herein can be designed to have large diameters and small wall thicknesses or small diameters and larger wall thicknesses to achieve optimum cost per metre for each power loading (current). The selection of Al and/or Cu bus bars for use in a bus bar assembly or in any portion of a bus bar assembly will be dependent upon the requirements of the particular system, whilst Cu is an especially efficient conductor, Al is lighter and can be more cost-effective which can provide more design flexibility.

Without wishing to be bound to any particular theory it is proposed herein that metal bus bars, particularly Al and/or Cu bus bars, and especially tubular or substantially tubular Al and/or Cu bus bars for use in bus bar assemblies herein having large diameters and small wall thicknesses are preferable for use herein because use of such bus bars with alternating current (AC) provides desirable skin effect properties versus those found for bus bars of small diameters and larger wall thicknesses. It is proposed that use of the preferred bus bars for distribution of 3-phase, AC power, particularly low voltage 3-phase AC power, more particularly an extra-low voltage 3-phase AC power, achieves a higher current density between the outer surface of the bus bar and the skin depth of the bus bar than would be provided by bus bars having larger wall thicknesses and smaller diameters. Commercially available tubular bus bars of any suitable diameter and width can be used. Exemplary bus bars for use as the main, or primary, bus bars in the power and lighting systems herein are tubular aluminium bus bars. Suitable aluminium bus bars for use herein are commercially available hollow tubular aluminium bus bars, including tubular aluminium bus bars available from Alcomet in a range of outside diameters of from 10 mm up to 250 mm, more particularly from 10 mm up to 200 mm, and especially from 10 mm to 100 mm, or, from 10 mm to 50 mm, or from 10 mm to 25 mm, or from 10 mm to 15 mm. Exemplary bus bars particularly suitable for use herein are 15 mm diameter Aluminium bus bars with a wall thickness of 1.6 mm. The Applicant has found that use of such 15 mm Al bus bars with thickness of 1.6 mm distribute power at about 50 v AC at 100 amps with a voltage drop of about 0.03 v per metre (of bus bar). In addition, where tubular bus bars are used the Applicant has found that the number of LED-containing lights which can be powered by the system increases as the diameter of the bus bars increases.

According to a further aspect the present disclosure additionally comprises a system as defined herein having conductive bus bars where the relative ratio of the diameter of the bus bars to the wall-thickness is in the range of from 15:1 to about 7:1, from about 12:1 to about 8:1 and particularly from about 10:1 to about 9:1. For the avoidance of doubt where the bus bars are hollow tubular circular bus bars then diameter has its ordinary meaning, and wherein the bus bars are essentially circular, elliptical or oval then the diameter is the diameter at the widest point of the cross-section.

Thus, according to a further aspect the present disclosure additionally comprises a system as defined herein having conductive bus bars, particularly conductive tubular bus bars, which are made of Al or Cu or a mixture thereof, wherein the voltage drop per metre of bus bar at AC power levels of about 50 v and 100 amps is in the range of from 0.01 to 0.1 v, preferably where the voltage drop is in the range of from 0.02 to 0.1 v, more preferably where the voltage drop is in the range of from 0.02 to 0.05 v, and especially about 0.03 to 0.05 v. The Applicant has found that the structural strength gained from removing the centre of a solid conductor i.e. to provide a tubular (bus bar-like) structure enables lighting, and optionally other devices, to be connected to the tubular conductor with less support than is possible via systems employing conventional solid conductive wiring and associated fixtures. The Applicant has found that the tubular bus bars as presently used are structurally stronger than conventional lighting systems and can support more LEDs and, optionally, other devices. Furthermore, the Applicant has also found that removing the conductive material from the centre, of a solid conductor to provide a tubular (bus bar-like) structure also leads to reductions in the eddy currents within the conductive element of the tubular structure, and that these eddy currents push the current flow towards the outside of the tubular conductor i.e. 100% of the current is located within the "walls" of the tubular conductors. The Applicant has also found that via use of the tubular bus bars in the present systems the current flow is substantially located on the external surfaces/outside extremities of the bus bars. It is proposed herein that removal of the centre of the conductor allows more of the wall thickness to be used for a given cross-sectional area of conductive material and thereby the negative impact of the skin effect is reduced.

In addition to the many technical advantages provided by the present system and as described herein, the Applicant considers that use of the present system also has the potential to deliver significant cost-savings. In particular cost-savings can be derived via removal of the centre of a solid conductor to make a tubular structure, via use of reduced numbers and size of capacitors and/or inductive components. Without being restricted to the use of bus bars, specifically tubular bus bars, many of the advantages of 3-phase local rectification can be achieved using traditional solid or stranded wiring methods when these are combined with a 3-phase AC supply, LED lighting, 3-phase AC/DC rectification and control features of the present systems.

Commercially available copper tubular or substantially tubular hollow bus bars may be utilised on the AC-side of the power distribution assemblies for use in the present systems, either as hollow tubular or substantially tubular hollow copper bus bars. Use of copper bus bars in the present bus bar assemblies, tubes and/or as wires, advantageously allows for ease of positioning of the lighting devices, especially LED lights in their selected spots.

Copper wires can also be in electrical connection with the present bus bar assemblies, and as discussed hereinafter in relation to provision of power to LED-containing devices on the DC-side to provide additional power distribution means in the present systems. As this wiring-based DC-power distribution follows the AC-based power distribution on the bus bar assembly it is also referred to herein as subsidiary or additional power distribution means. For the avoidance of doubt, and as discussed hereinafter where copper wires are utilised at points in the system where the distances are very small and the currents are very low and the wire merely distributes the power at a subsidiary level i.e. directly to a lighting device, particularly an LED light or such like.

For the avoidance of doubt, where the PCB is connected directly to the bus bar, such as for example via utility of the T-shaped strips as detailed hereinafter in LED arrays the use of copper wires to effect the connections to the individual lighting devices or LEDs is not necessary.

In many commercial/industrial and/or domestic buildings, the main bus bars typically having a vertical or substantially vertical arrangement and can be located externally, internally or centrally. This feature is illustrated in the Figures hereinafter. From these main bus bars the power can then be distributed to lighting arrays throughout the system via a secondary bus bar system comprising a series of secondary bus bars, or optionally and alternatively copper wiring as a subsidiary or additional power distribution means, at each floor or level of the building having a horizontal or substantially horizontal arrangement. The tertiary power supply on the AC-side of the power distribution system typically comprises a series of tertiary bus bars, or may optionally and alternatively comprise copper wires as a subsidiary or additional power distribution means, at low voltage, or extra-low voltage 3-phase AC at each floor or level of the building having a horizontal or substantially horizontal arrangement.

As will be readily appreciated the present system provides for desirable flexibility in design of the bus bar assemblies for domestic and/or commercial/industrial applications, with the relative arrangements of the main, secondary and tertiary bus bar systems providing the ability to build-in bespoke power and lighting systems which are cost-effective, efficient and controllable. In general, the size of the bus bars (diameter) is reduced between the main and secondary system, and again between the secondary and tertiary system. This feature is illustrated and discussed further in the Figures.

Typically the power for the lighting devices is distributed by the secondary bus bar arrangement and as such in the majority of cases this arrangement will be located towards the ceiling or roof of the room, or office, or warehouse or other section of the domestic and/or commercial/industrial building, although the system does include the capacity for the lighting to be provided from bus bars connected to walls, or other structures to provide lighting from alternative perspectives than simple downward arrangements. Where the system requires such, the secondary bus bar arrangement may be linked to a tertiary bus bar arrangement to further distribute power to the lighting.

The tertiary bus bars, or optionally and alternatively copper wires as a subsidiary or additional power distribution means, at low or extra-low voltage further distributes the power from the secondary bus bars to the lighting devices, as detailed hereinbefore as well as to non-lighting devices (where present) as also defined hereinbefore. Again, for the non-lighting devices the design freedom provided by the present system allows these bus bars to be located according to the bespoke needs of the building users, but most commonly, tertiary bus bars provided for power distribution to non-lighting devices will be located at, or close to, the floor at each level of the commercial/industrial and/or domestic building within which the system is employed. For certain rooms, such as kitchens the tertiary system may be advantageously located above workbench/kitchen unit height.

According to a further aspect the power and lighting systems as detailed hereinbefore may additionally comprise a coated bus bar assembly wherein the coated positive/line and neutral bus bars components of each of the main and secondary bus bars run in parallel to one another, or are non-parallel to one another, or are in concentric arrangement with one another and wherein the main bus bars are provided in a substantially vertical arrangement and wherein the secondary bus bars are provided in a substantially horizontal arrangement.

Suitable bus bars for use in the present systems include coated bus bars, and more particularly plastic coated bus bars. Any suitable commercially available plastic coating material suitable for use on bus bars, and in particular coatings suitable for use with Al or Cu bus bars may be utilised. For electrical and heat insulation the bus bars for use in the present systems can be protected with any suitable commercially available insulating materials, such as for example heat shrink coatings. Suitable heat shrink bus bar tubing for use herein includes BBIT heat-shrinkable bus bar tubing from Raychem. A section of a coated bus bar is illustrated in the Figures herein.

In systems where the main voltage step-down device, more particularly the main transformer is externally located and the main bus bar system is either fully or partially externally located then the main bus bar is optionally further coated with a suitable thermal insulation/environmental protective layer. Any suitable commercially available thermal and/or environmentally protective material suitable for use on bus bars, and in particular thermal and/or environmentally protective materials suitable for use with Al or Cu bus bars may be utilised.

Where one bus bar system is to be connected to another bus bar system within a bus bar assembly for use in the present power and lighting system, for example to make a connection from the secondary bus bars to the main bus bars, the connection may be effected by baring the plastic at the desired connection point of the main bus bar to expose the metal and connecting to a correspondingly exposed metal aspect of the secondary bus bar thereto. Where an electrical connection is to be effected, such as for final wiring to the one or more LED-containing lighting devices, LED light(s), LED strip(s), or strips containing one or more LED lights as required by the particular system and application, to the secondary, or tertiary bus bars, then a connection point may be drilled into the secondary, or tertiary, bus bar to effect such electrical connection.

For the avoidance of doubt, where the main bus bar system is either fully or partially externally located, then connection to the secondary system may be effected as designed hereinbefore.

Power Line Communications Functionality

As detailed hereinbefore the disclosure provides a controllable power and lighting system including a lighting system comprising one or more lighting devices as defined hereinbefore, and in particular an LED array having communications functionality.

Power line technology provides the ability to include communications functionality on top of an existing AC supply waveform. Thus, in addition to the advantages and benefits of the power and lighting systems for lighting devices, particularly LEDs, and also for non-lighting devices, where present, as detailed herein, the disclosure provides as a further aspect a power and lighting system as detailed herein having communications functionality.

Power line technology, also known as power-line communication (PLC), power-line carrier, power-line digital subscriber line (PDSL), mains communication, power-line telecommunications or power-line networking (PLN). For the avoidance of doubt, and in accordance with one or more aspects herein the present systems provide communications technology via PLC over a 3-phase, AC bus bar assembly, and in particular over a low voltage 3-phase, and especially over an extra-low 3-phase, AC bus bar assembly. In the present power and lighting systems the combination of the power line technology with the bus bars provides means for simultaneous carrying of data on the bus bar assembly as well as providing distribution means for the 3-phase, AC power, and in particular distribution means for low voltage 3-phase, and especially extra-low AC power.

In addition to the desirable controllable, low cost, high efficiency benefits provided by the present power and lighting systems, the utilisation of power line technology provides the ability to build-into such systems unique identifying information and the ability to drive-down installation and running efficiency costs yet further.

According to an aspect there is provided a controllable power and lighting system comprising one or more power consuming devices, wherein at least one of the power consuming devices is an LED-containing lighting device, wherein the LED-containing lighting device is adapted to be powered by a 3-phase AC power supply and wherein the 3-phase AC power supplied to the system is converted to DC power via 3-phase AC/DC rectification, in accordance with any one or combination of the aspects described herein, wherein the system includes means for automatic control of each device, wherein the means for automatic control of the output of the system as a whole or individual devices or groups of devices within the system is means for providing automatic independent control of the devices, and wherein each device for use in the system is fitted with a registration chip that can be identified and controlled separately.

According to a further aspect there is provided a controllable power and lighting system comprising one or more power consuming devices, wherein at least one of the power consuming devices is an LED-containing lighting device, wherein the LED-containing lighting device is adapted to be powered by a 3-phase AC power supply and wherein the 3-phase AC power supplied to the system is converted to DC power via 3-phase AC/DC rectification, in accordance with any one or combination of the aspects described herein, wherein the system includes means for automatic control of each device, wherein communications are extracted from the AC waveform at each load connected to the system via power line technology in combination with communications, and registration chips within the devices, and wherein the system can be monitored and controlled remotely by the combination of powerline and wireless technology.

According to a still further aspect there is provided a controllable power and lighting system in accordance with any one or combination of the aspects described herein, wherein the system includes means for automatic control of each device, wherein the system includes means for automatic control of each device, wherein the 3-phase AC power supplied to the system is distributed by conductive bus bars and wherein the control system is provided by powerline technology provided by the bus bars.

According to a still further aspect there is provided a controllable power and lighting system in accordance with any one or combination of the aspects described herein, wherein the system includes means for automatic control of each device, wherein the system comprises one or more power consuming devices, wherein at least one of the power consuming devices is an LED-containing lighting device and wherein each individual LED light, and/or non-LED device where present, or group of lights and/or non-LED devices where present, or array of lights and/or non-LED devices where present, is individually or selectively registered wherein the system can be monitored and controlled wirelessly and remotely, wherein the individual LED(s), or strips of LED light fittings are fitted with a registration chip, and a local rectifier and a powerline communications chip or wherein the registration chip provides means for communication with local/repeater wireless technology and wherein the LEDs and/or non-LED devices where present are thereby suitable for control via the internet. For the avoidance of doubt registration chips for LEDs are detailed hereinafter.

Thus, according to a further aspect there is provided a controllable power and lighting system wherein the LED-lighting comprises one or more LED-containing lighting devices, or group of one or more LED-lighting devices, or an LED array comprising LED lights wherein the devices or lights are adapted to be powered by a 3-phase AC power supply wherein the 3-phase AC power distributed to the LED-lighting is linked to an AC main transformer that may be positioned externally or internally;

the 3-phase AC power is distributed by conductive bus bars, or wherein the bus bars are conductive tubular or substantially tubular bus bars;

the 3-phase AC power supplied to each lighting device, or group of lighting devices is converted to low voltage or extra-low voltage DC via 3-phase AC/DC rectification of the power supplied to each connected load, or where the 3-phase AC power is converted via an AC/DC rectifier associated with each lighting device or group of lighting devices; and the system includes means for automatic control of the output of the lighting as a whole, or individual lighting devices, or groups of lighting devices within the system.

According to a further aspect in the above controllable power and lighting system the bus bars are adapted to power one or more non-lighting based devices within the system and additionally includes wherein the system additionally comprises power line technology in combination with communications, and registration means within the array, and the non-LED based devices and wherein the system can be monitored and controlled remotely.

For the avoidance of doubt, the adaptation of the bus bars to accommodate the powering of one or more non-lighting devices means that a lighting system can be installed and non-lighting devices can be added into the system either as a temporary measure or as part of the core system as required at a later date, or where the system design requires such the non-lighting devices can be incorporated into the system at the installation stage.

According to a particularly preferred aspect there is provided a controllable power and lighting system comprising an LED array as detailed hereinbefore wherein the system additionally comprises power line technology in combination with communications, and registration means within the array and wherein array is adapted to be powered by an AC low voltage, and particularly by an extra-low AC voltage power supply.

As will be appreciated the above systems comprising powerline technology in combination with communications and registration means can also be provided for the control and powering of alternative, non-LED lighting devices or for a lighting system employing a mixture of LED and non-LED lighting devices.

Advantages of the present controllable power and/or lighting system which additionally includes power line technology versus present commercially available systems include: the use of voltage step-down devices, more particularly transformers to effect an AC voltage reduction combined with local rectification/local voltage correction to provide a usable low voltage or extra-low voltage power and lighting system; efficiencies of from 90 to 94%; means for self-regulating system control; provision of automatic voltage correction; ability to control arrays containing more than 100,000 lighting devices, and especially more than 100,000 LEDs via use of power line technology; more efficient wiring system with only final wiring, to the LED-containing device, being required, and being provided via copper wire; provision of a "plug and play" LED array; as well as the potential use of wireless link(s) to local sensors within the system as part of the management and remote-control of features within the array(s). The potential use of a combination of powerline technology and wireless technology (Wi-Fi®) is discussed hereinafter.

In addition, as such controllable systems including bus bars, step-down AC devices or step-down transformers, 3-phase, AC, especially low or extra-low voltage AC, power distribution and power line technology as detailed herein, provide unprecedented efficiencies in running costs, versus current 24/7 monitored systems, as well as being less capital intensive to set-up, typically in the region of 30% cheaper, the present power and/or lighting system provides for the first time means to deliver bespoke LED lighting, and/or power to non-LED devices (where present) in commercial/industrial and/or domestic applications via a system which is reliable, efficient, sensitive and remotely-controllable.

According to a further aspect, where the lighting devices comprise one or more LED lights, the power and lighting system of the disclosure provides means for independent control of the wavelength intensity and photoperiod of each LED light, or groups of LEDs, within the one or more LED arrays used in the present systems over large areas 1 $m^2$ to 10,000 $m^2$. By registering the LEDs or groups of LEDs upon installation, or periodically thereafter, the radiant power of the overall system, individual LED lights, groups of LED lights, LED strips or groups of LED strips, or one or more LED arrays within the system over a range of input currents is known.

Each registered LED can be recalibrated using a spectroradiometer as required. This process allows for repeatability and data logging of the radiant power delivered by the lighting aspect of the present system to be measured, and for the first time provides information in real-time as to the radiant power being delivered to the users, either across the system, or within individual sections, segments, offices, floors, factory lines, or other such pre-determinable sectors of the system wherein these individual areas within the system are aligned to corresponding LEDs or groups of LEDs within the one or more LED arrays as defined herein before and as utilised in the present power and lighting system.

Thus, according to a yet further aspect the present disclosure provides a control system for LED lighting devices, and non-lighting/non-LED based devices within the system as defined herein wherein the control system includes means for logging of data for measurement of radiant power and wherein the non-lighting/non-LED based device control system includes means for logging of data for measurement of power consumption.

According to an aspect there is provided a controllable power and lighting system comprising one or more power consuming devices, in accordance with any one or combination of aspects herein, wherein at least one of the power consuming devices is an LED-containing lighting device, wherein the LED-containing lighting device is adapted to be powered by a 3-phase AC power supply and wherein the 3-phase AC power supplied to the system is converted to DC power via 3-phase AC/DC rectification, wherein the system may comprise one or more non-LED devices, additionally incorporating means for logging of data for measurement of the radiant power of the at least one LED-containing lighting device, or individual LED-lighting devices, or groups of LED-lighting devices within the system, and wherein, where one or more non-LED devices are present the system additionally includes means for logging of data for measurement of power consumption or radiant power.

According to a further aspect the means for logging of data for measurement of power consumption or radiant power is provided by registration of each LED within the array and pre-calibration of the LEDs by spectroradiometers.

The present control system for the power and lighting system for LED-containing lighting devices, and non-LED based devices, where present, as defined herein uses smart software to manage the data being captured and relayed to the control system from various sources including: lighting registration chips; rectifier control means; power line communications chip; wireless technology; local PCs; other data capture means; or mixtures and combinations thereof in order to provide tailored monitoring and control of the system as a whole.

Each lighting device, preferably each LED-containing lighting device, group of LED-containing lighting devices or LED lights, LED strip, group of LED strips, strip containing one or more LED lights, or group of strips containing one or more LED lights, within a lighting array, or non-LED based device, or group of non-LED based devices, or a combination of LED-containing lighting devices, preferably LED lights, and non-LED based devices for use in the present controllable power and lighting systems can be controlled independently using powerline technology as detailed herein, or where the demands of the system require such functionality control may be effected by a combination of powerline and wireless technology, or via stand-alone wireless technology using a wireless link to a local PC or via the internet remotely. To affect such control for LED lights, or non-LED based devices where present, each LED light or group of LED lights, within an array, or each non-LED based device or group of such devices, is fitted with a registration chip that can be identified and controlled separately.

As detailed herein after the Applicant has also found that in addition to power line technology the present controllable power and lighting system comprising 3-phase, AC, preferably low voltage, and especially extra-low AC distributed via bus bars to one or more LED-containing lighting devices, and particularly to one or more LED arrays, and one or more non-LED based devices (where present), wherein the array(s) and/or devices have local registration chips is highly compatible with local/repeater wireless technology. For power and lighting systems herein, which require the capacity to deliver significant/strong wireless signal strength, such as for example in applications where internet access is required, or where portability of smart devices for use within the system is required local/repeater wireless technology can be advantageously employed.

Voltage Step-Down Devices

As detailed hereinbefore the AC power from the main power supply is provided to a voltage step-down device, and in particular to a transformer, which may be located externally or internally. The AC power provided to such a device is also known as the input voltage and may be at any level provided it is within the capacity of the device. Input voltage ranges will vary depending upon the geographical location in which the present power and lighting system is to be employed, the selection of a suitable device having the required capacity to accommodate the input voltage and ability to provide the desired output voltage, and in particular the selection of a device to accommodate the input voltage and having the ability to provide an output of low voltage AC, or particularly extra-low voltage AC of less than 50 v AC, i.e. the voltage to be used by the equipment in electrical connection with the output side of the device, is considered to be within the skill of a suitably qualified electrical contractor. Transformers are suitable voltage step-down devices for use herein.

Transformers suitable for use herein have an input voltage capacity of up to and including 415 v AC. The Applicant has found that whilst transformers having any output voltage suitable for use with any particular power and lighting arrangement for use in the present systems can be employed, the use of transformers having an output voltage level of less than 50 v AC are especially useful for both the provision of enhanced safety as well as for the delivery of efficiency benefits. Exemplary transformers for use in the present systems are independently selected from: 415-50 v; 240-50 v; or 230-50 v AC RMS star or delta transformers. As will be appreciated such a transformer can be sized to supply either a single building or a series of buildings, or a series of sections within a single building to provide capacity of thousands of metres square. For safety reasons such transformers are generally located externally. To optimise system efficiency larger transformers are preferred, and as such when a new power and lighting system for a commercial/industrial or domestic application is being designed the current and future capacities should be considered to ensure that the system is designed to deliver both initial and on-going efficiency. In general, larger transformers provide greater the efficiency, typically in the region of 95-99% or more. The Applicant has found that to achieve high efficiency greater than or equal to 5 kw levels are required, i.e. =>5 kw.

Any commercially available AC voltage step-down device, and particularly any commercially available AC step-down transformer, or combination of such devices and/or transformers may be used to supply reduced levels of AC power for use in the control systems according to the present disclosure. As will be readily appreciated, the selection of the selection of an appropriate transformer will be dependent upon where in the world the system is to be deployed, for example in the UK approximately a 10:1 reduction ratio is particularly suitable for use where low or extra-low AC voltage levels are desired. Step-down transformers adapted to provide/having a suitable reduction ratio to provide desirable low or extra low AC voltage levels, typically in the range of between about 24 v AC to about 50 v AC, are particularly useful. AC step-down transformers having reduction ratios of: from: 5:1; 10:1; or ratios from about 5:1 to about 10:1, to achieve low or extra-low voltage AC, and typically between about 24 and 50 v AC are especially useful for the supply of power to the present LED control systems for commercial or domestic applications, and are particularly useful for applications for the control of LED lighting in plant and/or animal growth systems.

The present power and lighting system provides lighting, particularly LED lighting for commercial/industrial and/or domestic applications wherein for LED lighting arrangements especially, electrical and radiant efficiency benefits are provided versus conventional systems in addition to providing power for non-LED based devices where present.

For LED lighting arrangements the present system can provide electrical efficiencies in the region of: greater than about 80%; greater than about 85%; about 87% in combination with radiant efficiencies (wall plug efficiencies), for LED and non-LED based devices in electrical connection with the system, in the region of: greater than about 30%; greater than about 35%; greater than about 40%; about 43%, in an examples where the LED is 50% radiant efficient.

The present systems utilise 240/415 v AC to 24/50 v AC transformers which can be up to 99% efficient at large scale, in combination with local rectifiers/local voltage correction device (two steps) associated with each lighting device within the system, particularly each LED-containing light, or group of LED-containing lights, or with each non-LED based device (where present). Such rectifiers can be selected for optimal efficiency levels, and ideally in the region of about 95% efficient. By use of the present control system having 95% efficiency the present system is capable of providing electrical efficiencies in the region of 87% (99%×95%×95%), which corresponds to about 43% wall plug efficiency (50%×87%), in an example where the LED is 50% radiant efficient.

According to a further aspect the present disclosure provides a controllable power and lighting system as defined herein which includes LED lighting, and utilises 240/415 v AC to 24/50 v AC transformers in combination with local rectifiers/local voltage correction device associated with each LED light, or group of LED lights, or with each non-LED based device (where present).

Representations of domestic and commercial/industrial systems system utilising this efficient power and lighting system are illustrated by the Figures herein.

To accommodate commercial/industrial systems such as for examples warehouses having very large footprints of thousands of metres square, the Applicants have designed a modified system wherein the main large voltage step-down device, more particularly a main large transformer can be installed at a remote point inside the warehouse with power being distributed to the lighting array and any non-LED devices as desired via the bus bar assembly and having the remote control features as defined herein. Only the internal cabling to the voltage step-down device, transformer, would need to be IP rated with the remainder of the system being as defined hereinbefore.

For the avoidance of doubt, in the present power and lighting systems for commercial/industrial and/or domestic applications the main AC voltage step-down device, transformer, can be located internally or externally. Where the present system is incorporated into a commercial/industrial and/or domestic building having one or more AC voltage step-down devices (transformers), the main AC voltage step-down device (transformer) can be located externally, at a central location to the system, or internally either centrally, or at the top or at the bottom of the building according to the particular building requirements. A central location as defined herein includes: a position central to the system; a plant room; a central plant room; a position central to a group of rooms, floors, offices, or buildings and the like which are powered by the present power and lighting system.

Thus the disclosure additionally provides a power and lighting system suitable for use in commercial/industrial and/or domestic applications in accordance with any of the aspects detailed herein comprising an external or internal main AC transformer, wherein when the main AC transformer is internal to the building it may be positioned centrally or at the top or at the bottom of the building, and wherein when the main AC transformer is external it is positioned at a central location.

The Applicant has recognised that although there would likely be reductions in both the number and levels of the advantages relating to efficiency, safety and cost, versus the levels provided by the combination of 3-phase step-down devices, and particularly 3-phase transformers and tubular bus bars in systems employing LED lighting arrangements, high voltage 3-phase power can also be distributed directly to local 3-phase switch mode power supplies (SMPS) to power LED lights.

In such LED lighting arrangements, high voltage 3-phase AC and SMPS for powering LEDs, are more efficient than high voltage single phase AC due to the reduced ripple effect, the also require smaller capacitors, and have improved power factor and reduced harmonics versus the corresponding single phase systems. These arrangements may well be attractive for retrofit situations or for high-powered LED clusters for new buildings, street or flood lighting or any other application where infinitely variable current and PWM are not required.

Without being restricted to the use of voltage step-down devices, particularly transformers, specifically low voltage step-down transformers, many of the advantages of 3-phase local rectification can be achieved using traditional solid or stranded wiring methods when these are combined with a high voltage 3-phase AC supply, SMPS, LED lighting, rectification and control features of the present systems.

3-phase SMPS lose efficiency levels when not operated at the designed nameplate capacity (less than 50% nameplate capacity has steep, compounding drops in efficiency). The Applicant has found large 3-phase transformers offer a much higher efficiency across a large range of loadings. For example, efficiency improvements of >95% have been demonstrated from increasing the name place capacity from 15% to 100% loadings. The Applicant has found that improvements in the nameplate capacity as particularly advantageous in applications where dimming or modulating the LED light is required. The Applicant has also found that for optimal system efficiencies distributed of the high voltage AC power from the large transformer to the LEDs by tubular bus bars is preferred.

Electrical Power Surge Protection on High Voltage Side of Transformer

According to a further aspect, the present disclosure provides a novel lighting system suitable for commercial/industrial or domestic use as defined hereinbefore wherein the system additionally provides means for protecting the lighting arrangements within the system from electrical power surges via the use of transformer related surge protection equipment on the high voltage side of the transformer. Any suitable surge protection equipment, also known as surge protection devices, surge suppression devices, or transient voltage surge suppression equipment capable of protecting against surges or spikes in the 3-phase, AC, preferably low voltage AC, more preferably extra-low voltage AC, being supplied from the transformer into the system can be used. As will be appreciated the selection of any particular surge protection equipment will be dependent upon the particular 3-phase, AC power level being supplied to any particular system in accordance with the present disclosure.

Thus, the present disclosure provides a novel lighting system suitable for commercial/industrial or domestic use in accordance with any of the aspects defined herein wherein the system additionally comprises means for protecting the lighting arrangements within the system from electrical power surges.

Watch Dog Surge Protection on Lower Voltage Side of Transformer

According to a further aspect the present disclosure provides additional means for protecting the controllable power and lighting arrangements within systems having bus bars against electrical surges. In addition to the transformer related surge protection equipment on the high voltage side of the transformer i.e. the input side, as detailed hereinbefore, the system additionally comprises watchdog-type technology, as defined herein, on the lower voltage side of the transformer i.e. the output side which compares the actual power being used on each bus bar to that predicted by the software. Variances from the pre-set levels can be incorporated into the control system to show as an alarm and any pre-set large variances can be configured to trip the power to the particular bus bar, or group of bus bars which are out of compliance with the pre-set power distribution levels in order to protect the overall system.

Watchdog-type technology as defined herein means equipment which is both compatible with the control system being operated for any particular system herein and which is capable of monitoring power consumption and distribution levels at one or more point within the power distribution apparatus (bus bars/wiring) of the present systems in real time. Any suitable monitoring equipment such as a power meter can be used.

As a further feature suitable conventional fuses can also be installed to provide an additional safety measure should the power levels being distributed to any particular bus-bar, or group of bus bars within the system exceed a pre-determined level. For the avoidance of doubt such pre-determined level may vary depending upon the nature of the specific system, and the relevant breaking capacity/interruption rating of the particular fuse selected for use.

Thus the present disclosure provides a novel lighting system suitable for commercial/industrial or domestic use in accordance with any of the aspects defined herein wherein the system additionally comprises provides means for protecting the lighting arrangements within systems from electrical power surges wherein said means comprises the combined use of surge protection equipment, watchdog timer equipment and optionally one or more fuses.

Power Supply and Control Functions for LEDs and Non-LEDs

As detailed hereinbefore, the applicant has found that conductive tubular, or substantially tubular bus bars, and particularly tubular, or substantially tubular aluminium bus bars and 3-phase AC, particularly low voltage 3-phase AC, and especially extra-low voltage 3-phase AC, can be advantageously used to power complex power and lighting systems comprising one or more lighting devices, especially LED lights, individually or in groups, within one or more lighting arrays optionally in combination with one or more non-lighting/non-LED based devices, within commercial/industrial and/or domestic applications where 'power line' technology, provided via the bus bars, provides a control system for the lighting devices and the optional non-lighting devices within the system, and wherein the control system communicates with each individual lighting device, or non-lighting/non-LED based device (where present), or groups thereof, or array(s) of lights via use of one or more registration chips for identification.

In particular substantially tubular aluminium bus bars and low voltage or extra-low 3-phase AC is use to power systems comprising one or more LED lights and optionally one or more non-LED based devices in commercial/industrial applications where 'power line' technology, provided via the bus bars, provides a control system for the LED lights and the optional non-LED devices within the system, and wherein the control system communicates with each individual LED light, or non-LED based device (where present), or groups thereof, or array(s) of lights via use of one or more registration chips for identification.

Any LED array which has been made to link to the 3-phase, AC via a registration chip can be utilised in the power and lighting systems herein for commercial/industrial and/or domestic applications. The means by which such LED array(s) may be registered are as detailed herein.

For non-lighting devices, such as for example a mobile phone charger, the charger plug is connected to the 3-phase, AC supply which is converted to DC by a suitable inverter which can be incorporated into either the device lead or into the charger plug. Each non-lighting device can be monitored and/or controlled independently using a wireless link to a local PC or via the internet remotely via the combination of a local individual controller containing a suitable pre-registered chip, which is incorporated into either the device lead or into the charger plug.

For the avoidance of doubt, any commercially available wireless technology which provides a Wi-Fi® facility whereby a non-LED based device, such as for examples a computer, tablet or smart form or the like is able to connect to the internet or connect wirelessly to another non-LED based device within a defined area i.e. within the system may be utilised.

As detailed hereinafter the lighting devices, preferably LED-containing lights are powered by 3-phase, AC, as distributed and supplied by a bus bar assembly and as discussed herein. The 3-phase, AC is converted to DC at each light, or on each light fitting, or at the end of each strip of LED-lights via 3-phase AC/DC rectification, and in particular by using an appropriate rectifier. This enables the independent monitoring and/or control of each LED-light, or groups of LED-lights, such as for example within array(s) of LEDs.

Powerline

As detailed herein powerline technology, associated with the bus bar assembly, is advantageously employed to provide control of the system. Representations of power and lighting systems incorporating powerline technology are discussed and illustrated in the Figures.

Whilst all digital communications rely on timing, multiple methodologies exist for implementing timing in different communications techniques. The Applicant has recognised that at the lowest layer, the so-called binary layer, a common challenge exists across all present digital communications techniques. Essentially this is how can the nodes on the communications network tell the difference between what is the start-point and what is the end-point of a message when, in a binary system, the data being presented (seen) to the system is a constant string of 0 or 1's.

In the currently available communication systems based on single-phase power supplies which utilise powerline, the traditional powerline modems send data (to and from the system) via the line/live conductor. The line or live conductor is referenced to a neutral conductor. This means that in such traditional systems all the powerline nodes on the network are powered by the same phase and neutral wires. This conventional arrangement enables the powerline modems to take advantage of the supply frequency for example, 50 Hz in the UK, and 60 Hz in the USA. Every node then has a simple method of synchronizing time without stand-alone sync wires. By virtue of this conventional arrangement, the power supply wave crosses the zero point at exactly the same time for each node on the network and the timing mechanism is put into place.

In the present controllable power and lighting systems which are powered by a 3-phase AC power supply, which is converted to DC power via 3-phase AC/DC rectification, where powerline technology is used to provide communications functionality, the data to and from the system from the powerline modem is sent over one or more of the line/live conductors. As detailed herein there are different variants of 3-phase power supplies, the so-called STAR and DELTA arrangements or connections. Where a STAR connection is used, both live and neutral lines are present, and in such systems all the powerline nodes on the network are powered by the same phase and the neutral wires. This STAR connection enables the synchronisation of time without stand-alone sync wires.

The Applicant has recognised that where a DELTA connection is used it is not possible to provide the desired timing functionality to enable powerline to work effectively because the 3-phase supply does not have a neutral line. This means there is no potential mechanism in place to provide the required "zero point crossing" and thereby to enable synchronisation of time. To resolve this problem the Applicant has developed a timing mechanism which is capable of distinguishing between the start-points and end-points of a message (data) in the present systems powered by a 3-phase AC power supply, which is converted to DC power via 3-phase AC/DC rectification, where powerline technology using a DELTA connection is used to provide communications functionality by use of associated electronics for the powerline which includes means for creation of a "virtual zero-point", or means for mathematically calculating the zero-point crossing, or means for changing the fundamental timing reference points to another part of the wave in order to deliver timing functionality. An example of a system employing this arrangement for the provision of effective communications functionality for a system having powerline technology and a DELTA connection is illustrated in the Figures.

In systems herein where the means for provision of communications functionality, is a communications method implemented with a powerline gateway, the power line gateway is in communication with one or more of the LED-containing lighting devices, and can also be in communication with one or more non-lighting/non-LED containing devices within the system (where present). The means for making the devices on the powerline network accessible by the internet to enable remote control of the system can be via utility of Wi-Fi®, serial or Ethernet® communications, or other communications means as discussed herein. In the present systems the means for transmission of the powerline communications from the powerline gateway to the one or more power consuming devices, including one or more LED-containing lighting devices, and one or more non-lighting/non-LED devices within the system, for example one or more LED fixtures, is via a bus bar arrangement. The Applicant has found that use of 3 parallel primary tubular conductive bus bars is of particular value in the present systems. A segment of an exemplary system having powerline communications functionality is illustrated in FIG. 3 herein.

Wi-Fi/Li-Fi

Further and/or alternative control system features such as the use of a wireless link to a local PC or via the internet remotely are detailed hereinafter.

According to a further aspect each lighting device, preferably each LED-containing light, or non-LED device where present, herein including individual LEDs strips, groups of LEDs within an array, one or more arrays of LEDs, individual non-lighting device, or a group of non-lighting devices can be individually controlled ultimately via the internet with all data collected via the cloud.

Such control is provided by a local PC linked to a central microcontroller which is wireless enabled. For example, for an LED-based lighting system, each LED strip, or more typically each group of LED strips, or one LED within a group of linked LEDs, receives the wireless signal and distributes the command to each individual LED within the strip or group of LED strips, or each LED within a group of linked LEDs, via a series of low voltage or extra-low voltage control wires, according to the needs of the particular system, which link the strips together. These same control wires and wireless signals are two-directional and are able to send commands and collect data from local sensors and other monitoring equipment.

Further advantages of the controllable, low cost, high efficiency, power and lighting systems of the present disclosure comprising lighting devices and non-lighting devices, particularly LED lights and non-LED devices, are the ability to build-into such systems unique identifying information and the ability to drive-down installation and running efficiency costs yet further via the utilisation of a combination of Wi-Fi® and power line technology.

For LEDs in particular, such local controllers are able to vary the voltage and current from zero to typically 200% of the LEDs design specification where 100% is the optimum or 'sweet spot' where the ratio of radiant power to electrical power is at its maximum. Current boost above the 'sweet spot' can be beneficial where 'off peak' power costs are available. The microcontrollers can also pulse in order to control light intensity and photoperiod by pulse wave modulation (PWM). They can also vary the voltage, current and pulse simultaneously.

As discussed hereinbefore, in relation to LEDs, to enable advantageous lighting system control each LED, group or strip of LEDs is fitted with a registration chip which can be identified and controlled separately. On installation each LED, group or strip of LEDs is calibrated over the range of input currents and 'on-off' pulse widths using a purpose designed spectrometer or spectroradiometer thus enabling the control system to deliver and record the wavelengths, intensities and photoperiods delivered by each strip. This enables the manufacturers of LED bin selections to be corrected to compensate for LED production variances. It also enables many more bins of LEDs to be bought thus reducing cost. Over time the LEDs deteriorate and require more electrical power for the same radiant output power. By periodically recalibrating these variances become known and can be adjusted for. Further by collecting the input power data over time (years) the deterioration can be predicted and strip replacement can be optimised. The calibration also allows for faults to be identified and early replacement undertaken. The calibration process also allows for automated LED cleaning with associated benefits for system efficiency as well as ancillary cost-savings for physical cleaning.

LED calibration may be carried out on manufacture, on installation into a system, or as required during the life-cycle of an LED, such as for example on fixing an LED light or LED light fitting into an array. For optimal control efficiency an LED for use in the present system should be calibrated before it is registered. Any suitable calibration process may be used to calibrate LEDs for use in the present systems prior to their registration and utility. In an exemplary LED calibration process suitable for use herein the following steps are carried out:

1. Each LED, or if all the LEDs within a group of LEDs within the array are identical, then one LED from each group by bin, would be manually connected to the AC low or extra-low voltage supply via an appropriate bus bar or wire and inserted into a 'dark box';

2. A pre-set combination of currents and PWM sequences would be run and the resultant data would be logged as relating to all the LEDs used in the system from that bin. Where there are more complex systems containing different groups of LEDs and/or LEDs from different bins, then steps 1 and 2 would be repeated in respect of each differently sourced LED;

3. The relevant resultant data-set would be allocated to the registration chip for each group of LEDs within the array which contains the LEDs from the logged bin number; and 4. Once the system is up and running with the calibrated, registered LEDs then, in the future when any of these combinations are used the data will be known and can be mapped for the areas within the building/array under each LED or group of LEDs.

As detailed hereinbefore the LED lights for use here are ideally calibrated and registered prior to the array being operated. Each LED has a 'serial identifier chip' to provide serial registration which means that the LED calibration information would be stored against this unique number.

Any LED-containing lighting device within the present power and lighting systems, such as for example an LED, a luminaire or an LED fixture, can be commanded to perform a specific lighting event within the present controllable power and lighting systems. The lighting commands enter the physical LED-containing device via an LED registration chip. LED registration chips are as detailed hereinbefore. As will be readily appreciated, in a controllable power and lighting system lighting comprising one or more LED-containing lighting devices, such as for example luminaires or LED fixtures, lighting commands can be distributed to the registration chips for individual LED-containing lighting devices, luminaires or LED fixtures, or to registration chips for groups of inter-connected LED-containing lighting devices, luminaires or LED fixtures if so-desired, via a suitable bus bar arrangement, in particular a conductive tubular or substantially tubular bus bar arrangement, and more particularly an arrangement of 3 parallel line or live conductive tubular or substantially tubular bus bars which distributes both the power to the lighting system, as well as any non-LED/non-lighting devices where present, and also contains the data-signals for the devices within the system.

Data Management/Security

As discussed hereinbefore, according to a yet further aspect the present disclosure provides a controllable power and lighting system for lighting devices and non-lighting devices, particularly LED-containing lighting devices, and non-LED/non-lighting devices where present, within the system as defined herein wherein the lighting control system includes means for logging of data for measurement of radiant power and wherein the non-lighting control system includes means for logging of data for measurement of power consumption.

As also discussed hereinbefore whilst the total number of lights, particularly for LED-containing lighting devices within the system, and their arrangement within it will be dependent upon the needs of the particular commercial/industrial and/or domestic application, advantageously the combination of the present system and power line technology provides for the first time the ability to manage and individually control lights, particularly LEDs in systems having 100,000 or more individual lights or LEDs.

A particular advantage of the present controllable power and lighting system for LED-containing lighting devices and non-LED based devices in commercial/industrial and/or domestic applications having up to 100,000 or more individual LEDs and comprising 3-phase, AC, particularly low voltage AC power, and especially extra-low voltage AC power, distributed via bus bars in combination with automated control of said devices via powerline technology in accordance with any of the aspects detailed herein is the provision of unprecedented levels of security.

For the LED lighting system for use in the controllable power and lighting system of the present disclosure, advantageously the lighting control system includes means for logging of data for measurement of the radiant power of the LED array as a whole, or individual LEDs, or groups of LEDs within the array without continuous spectroradiometry.

Thus, by linking the LED array control system to movement sensors and light sensors an overall control system providing real-time or periodic data-sets which enable progressive/on-going of optimisation and/or maintenance of pre-defined output levels within the system can be achieved.

Thus according to a further aspect the present disclosure provides a controllable power and lighting system for providing effective light levels to a commercial/industrial or domestic system via an LED array as defined herein before and wherein it is a feature of said control system that there is no need for on-going measurements of the LED wavelengths, intensities or photo periods.

According to a yet further aspect said control system can be linked to a natural light meter to enable the controls to adjust the LEDs as light levels change within the commercial/industrial or domestic environment.

According to a preferred aspect the power and lighting systems have the capacity to power the LEDs at voltage levels that are safe for operatives/maintenance personnel. This is achieved by connecting the lighting system to an AC extra-low voltage power supply. Extra-low voltage as defined herein is an AC voltage of less than or equal to 50 v AC (<=50 v AC), more particularly between 12-50 v AC, and typically 24-36 v AC which is provided to the system via bus bars. A further safety advantage provided by the present controllable power and lighting system when used at low AC voltage levels, versus those currently available, is that once installed operatives responsible for day-to-day maintenance of the building can safely install and maintain all the lighting devices, and in particular LEDs, because they are operating at extra-low voltage, 3-phase, AC. This leads to commercial/industrial operating cost reductions. The overall efficiency of the lighting system, for example and LED array, can be controlled to maintain operational voltages which optimise the rectification.

Thus according to a further aspect there is provided herein a control system for use in a power and lighting system comprising one or more LED arrays and one more non-LED devices as defined herein wherein the control system includes means for logging of data for: measurement of: the radiant power of the LED array as a whole, or individual LEDs, or groups of LEDs within the array; measurement of light levels within the building, or section or floor of the building in which the power and lighting system is employed via light sensors; measurement of power levels to one or more, LEDS, groups of LEDs within the array, and/or individual or groups of non-LED devices within the power and lighting system and wherein said control system provides means for control of the operational voltages to maintain efficiency of 90% or above.

For example to implement a controllable power and lighting system in accordance with the present disclosure in any given application an input 3-phase AC power supply, voltage step-down means, and means for distribution of power to one or more consuming device and in particular one or more LED-containing lighting devices where 3-phase AC/DC rectification occurs are required. As will be readily appreciated the power transformation and rectification means can be any of those discussed herein and these can be readily applied to power a wide variety of different LED-containing lighting devices, as well as non-lighting devices as defined hereinbefore. The power can be distributed to the one or more power consuming devices, and in particular to the one or more LED-containing lighting devices via conductive bus bars, as will be also appreciated from the foregoing description, alternative conductive means can also be used to distribute power in systems according to the present disclosure. In such systems, a 3-phase supply provides input power to a voltage step-down device to convert the input voltage into a lower, lower voltage power supply, and this lower voltage power is distributed to the one or more power consuming devices of which at least one is an LED-containing lighting device, such as for example an LED fixture, and particularly via a conductive bus bar arrangement. The distribution of this lower voltage power to means for provision of communications functionality, such as power line gateway or modem, is particularly provided by a main bus bar arrangement having 3 parallel line and optionally one neutral tubular bus bars. Thereafter power can be provided via a secondary distribution branch of the bus bar arrangement comprising 3 parallel tubular bus bars, and optionally one neutral bus bar to the one or more LED-containing lighting devices, such as one or more LED fixtures. In such systems the bus bar arrangement provides the one or more of the line/live conductors to enable data to be sent to and from the system from the power line modem.

A segment of an exemplary system which is an embodiment of the present disclosure is illustrated in FIG. 1.

One Gateway

As discussed hereinbefore the present disclosure additionally provides means for independent control of each individual device within the power or lighting system, wherein said individual device is a lighting device, an LED device or a non-LED based device, as well as means for selective control of group of lighting devices, LEDs or groups of non-LED based devices, or arrays of LEDs within the power and lighting system. As will be appreciated such lighting systems comprising one or more LEDs may contain LEDs of different wavelengths. This is achieved with low voltage or extra-low voltage control lines, power line technology or wireless technology, or a combination of both power line and wireless technology commanded by a central microcontroller.

This microcontroller also acts as a common gateway for traditional Personal Computer (PC) communications. This data can be arranged to vary the intensity or radiant power at each wavelength and photoperiod of any one of, or any combination of LEDs within the controllable power and lighting system either by varying the current or by incorporating pulse width modification (PWM).

The method of communications between this common gateway (microcontroller) and the PC can be through hard wired means serial or Ethernet etc., or wireless, via Wi-Fi®, snap, Zigbee®, Xbee® or other wireless protocols.

In particular the use of a combination of powerline technology with a central microcontroller to provide the central gateway in the control system for the controllable power and lighting systems herein is especially advantageous from a data security perspective, particularly when compared with currently available wireless-based systems.

Use of the present powerline and central microcomputer based system channels all the data from the 1000's or tens of 1000's of LED and/or non-LED based devices in the present controllable power and lighting systems via a single, common gateway which is appreciably more secure than using a series of 1000's or tens of 1000's of individual wireless links which would be required using currently available wireless-based technology.

In addition to this beneficial data-security aspect, the use of dual system combining a single microprocessor as a common gateway and powerline technology of the bus bar assembly provides a system which is easier to maintain and update than one having potentially 1000's of different Wi-Fi® channels. An illustration and detail relating to the utility of gateway technology is provided in the Figures There are some non-LED based devices which require the facility for mobile connectivity throughout a system, such as for example portable devices having smart technology, mobile phones, laptops, tablets and the like. Bespoke control functionality for such non-LED based devices which require a facility for mobile connectivity can be enabled via use of a local Wi-Fi® generator to enable wireless connectivity to/data transmission to/from the mobile device(s) connect to the device using radio frequency wireless signals wherein the Wi-Fi® generator is fed by power line technology, or alternatively via use of Li-Fi from specified LEDs to enable wireless connectivity to/enable data transmission to/from the mobile device(s) using wireless optical networking technology using visible light communication (VLC) means wherein the specified LEDs are fed by powerline technology.

Accordingly there is provided herein a controllable power and lighting system having means for independent control of each individual power consuming device within the power or lighting system, wherein said individual device is an LED device or a non-LED based device, as well as means for selective control of group of LEDs, or groups of non-LED based devices, or arrays of LEDs within the power and lighting system via use of low voltage, and particularly extra-low voltage, 3-phase, AC distributed via bus bars as defined in accordance with any of the aspects hereinbefore and an automated control system comprising power line technology and wireless technology commanded by a central microcontroller.

According to a further aspect there is provided a controllable power and lighting system having means for independent control of each individual power consuming device within the power or lighting system, wherein said individual device is an LED device or a non-LED based device, as well as means for selective control of group of LEDs, or groups of non-LED based devices, or arrays of LEDs within the power and lighting system via use of low voltage, and particularly extra-low voltage, 3-phase, AC distributed via bus bars as defined in accordance with any of the aspects hereinbefore and an automated control system comprising power line technology and wireless technology commanded by a central microcontroller and wherein said wireless technology is independently selected from: Wi-Fi®; Li-Fi; a combination of Wi-Fi® and Li-Fi.

For enhanced data security in controllable power and lighting systems herein which require wireless connectivity to non-LED based devices which require mobile networking functionality there is provided a system as defined hereinbefore system having means for independent control of each individual device within the power or lighting system, wherein said individual device is an LED device or a non-LED based device, as well as means for selective control of group of LEDs, or groups of non-LED based devices, or arrays of LEDs within the power and lighting system via use of low voltage, and particularly extra-low voltage, 3-phase, AC distributed via bus bars as defined in accordance with any of the aspects hereinbefore and an automated control system comprising power line technology and wireless technology commanded by a central microcontroller and wherein said wireless technology comprises means for providing a Li-Fi wireless connection from the system to one or more non-LED based devices and a Wi-Fi® wireless connection from the one or more non-LED based devices to the system.

A control system for non-LED based mobile devices for which the control system includes Wi-Fi® and Li-Fi connectivity as well as LED lighting controlled via powerline is illustrated and discussed in the Figures.

For the avoidance of doubt, this is for the transmission of data and control functions. Where there is communication between the device and the system, this is for the transmission of control functions and/or data and where there is a communication between the system and a device is for the transmission of control functions and/or data. In one embodiment a Wi-Fi®/Li-Fi system is employed where the transmission if one-way for the device and another way for the system.

The ability to control the intensity and the photoperiod of each wavelength to each individual LED, to groups of LEDs, to each LED strip or group of strips, or one or more specified LED arrays within the overall array allows for feedback loops to vary the LEDs according to the ambient light conditions in a pre-determined area of the commercial/industrial or domestic system in which the present controllable power and lighting system is employed. Such pre-determined area can be an entire building, one or more rooms or floors, or sections, or areas or spaces within a building such as for example, corridors, and stairwells within a building, groups of rooms or spaces, or one of more floors, or any other arrangement of LEDs as desired. This allows for the optimum use of lighting-related power by optimising the LED photon production.

An optimisation process can be employed once the system has been installed and the building is in use, such an evolutionary optimisation process would enable lighting needs across a specified period (minutes, hours, days, weeks, months) to be assessed by the use of light and/or movement sensors with the resultant data being collected via the control system. Processing of this data would provide the base-line pre-set lighting levels across the specified period which can then be monitored and controlled for on-going efficient light level delivery by linkage of the control system to imaging and light sensing equipment allowing feed-back loops to control the light in real time.

LEDs

An LED is a light emitting diode and any suitable LED may be utilised in the lighting arrays for use in the present controllable power and lighting systems. Typically, the LEDs for use in any particular application, including commercial, industrial domestic systems or mixed systems as defined herein, are selected for their ability to provide light across the desired wavelength range, or at a particular wavelength for a specific section of a system.

In the controllable power and lighting systems herein the LED lights can be spaced according to the preference of the user and the levels of light required in any particular environment.

Any commercially available LED lighting which can be adapted to incorporate a local registration chip as defined herein, may be used in the present controllable power and lighting systems. For the avoidance of doubt, whilst the present controllable power and lighting systems are primarily directed to the provision of white/broad spectrum LED lighting, LED lighting providing bespoke LED coloured light either throughout, or in specific segments or sections of the system, such as for example IR or UV can also be delivered via the present systems via use of specific LEDs.

The choice and selection of the particular LEDs for use within the present systems will be dependent upon the particular needs of the application. As will be appreciated, in more complex applications different LED lighting arrangements may be employed in different sections, rooms, floors, or otherwise defined segments of the building or area to be lit in accordance with the particular requirements of said sections, rooms, floors and the like. The number of LEDs which can be incorporated into the lighting arrangements, such as for example LED array(s) for control using the present power and lighting system is limited only by the relative scale of the particular application into which the system is to be applied.

Advantageously the present controllable power and lighting system provides LED lighting, and particularly LED arrays which can be designed on an area-by-area, room-by-room, section-by-section, or floor-by-floor basis according the needs of the particular environment to be powered and lit.

Use of the present controllable power and lighting system enables for the first time the potential for unprecedented numbers of LEDs within one or more LED arrays to be utilised in large-scale commercial/industrial systems comprising millions of LEDs. Advantageously the present system provides means by which LED lighting, and particularly LED arrays can be controlled individually, in groups, or all together in a practical manner. As detailed herein the degrees of control provided by use of the present system provides unprecedented levels of flexibility.

For the avoidance of doubt, and according to a particular aspect, each LED light, or strip, or each LED light fitting for use within the present power and lighting systems, contains means for local conversion and final correction of the voltage. Typically, this local means for conversion and correction comprises local means as defined hereinbefore, such as suitable rectification means for the conversion of the low voltage, or extra-low voltage, 3-phase, AC into DC locally to the LED.

According to an especially useful LED arrangement for use herein each LED strip, or LED light fitting is a complete unit comprising the LED(s), an LED registration strip or chip, a local rectifier and optionally a power line communications chip.

For the avoidance of doubt powerline chips as utilised herein, either in the aforementioned especially useful LED arrangement, or as utilised within a control system for any other LED-containing lighting devices herein, are adapted to interpret the instructions, also known as data or information herein, for the LED chips within the lighting system. The powerline chips take the real world instructions for the lighting system i.e. 'turn on', 'dim', 'flash for a specified period of time, X' and converts these instructions into simple command for sending to the LED chips. The LED chips and the powerline chips operate in conjunction with one another to provide tailored control of lighting system.

As detailed hereinbefore the present systems provide power and control to one or more power consuming devices wherein at least one device is an LED-containing lighting device, as will be readily appreciated where further non-lighting/non-LED containing devices are present, these can also be fitted with device-specific registration chips in order to facilitate control of instructions for these devices also.

Typically, the LEDs for use in any particular aspect of the controllable power and lighting system as detailed herein are selected for their ability to provide light across the desired wavelength range throughout the particular commercial/industrial and/or domestic application into which they are to be employed, or at a particular wavelength for provision of a specific colour within a section thereof.

Exemplary coloured and broad spectrum LEDs for use herein are independently selected from LEDs capable of providing wavelengths in the range of: from about 400 nm to about 700 nm; about 460 nm to about 640 nm; about 460 nm; about 560 nm; about 640 nm, wherein such wavelengths are provided by the individual LEDs, by one or more LEDs arranged in a group or strip, or by all of the LEDs within the array.

In addition the present system may include one or more UV or IR LEDs, as individual lights, or in groups, or as the entire lighting system, depending upon the application, wherein such IR or UV LEDs have wavelengths of less than about 400 nm or greater than about 760 nm respectively, to provide bespoke lighting requirements either in specific segments or throughout a power and lighting system for commercial/industrial and/or domestic application.

As such, in addition to LEDs suitable for provision of white/broad spectrum LED lighting, the LED array may include one or more Infrared Light Emitting Diodes (IR-LEDs) in combination with white and/or broad spectrum LEDs, or may wholly comprise IR-LEDs. IR LEDs send out light with longer wavelengths than visible light, typically at wavelengths similar to that used in remote control units. As such, although not visible to the naked eye, many digital devices can detect IR LED, and as such IR LEDs have applications in systems requiring activation of light sensors or remote triggering. IREDs typically have wavelengths in the region of from 770 nm to 950 nm and are known for use in sensing systems. IREDs with wavelengths 770 nm, 870 nm 880 nm, 940 nm, and/or 950 nm are known for use, in conjunction with non-lighting sensing devices, for a variety of applications including smoke detection, and in "opto-switching".

For the avoidance of doubt, the present power and lighting systems may comprise a mixture of different LED light fittings, also known as LED fixtures or LED-containing lighting devices herein, and/or a mixture of coloured, broad spectrum, UV or IR LEDs having different wavelengths.

The term 'about' means that any LED or groups of LEDs which provide wavelengths substantially as defined herein are LEDs suitable for use herein.

Thus, the present disclosure provides a novel power and lighting system including: LED light fittings, LED strip lighting/LED strip lights; strips containing LED lights; LED spot lights, LED floodlights and mixtures thereof Lighting System Control As detailed herein the system includes local means for management of LED-containing lighting devices, particularly LEDs and non-LED devices (where present) within the power and lighting system via use of suitable registration chips and local inverters which may be in the form of a chip. For the avoidance of doubt the automatic correction of voltage drop at an LED or registered group or strip of LEDs within the system is managed by the local inverters on each LED, or group or strip of LEDs, and the registration chip(s)

enable identification and individual and/or group control of LED lights or non-LED devices within the system via a suitable control system.

Whilst the selection of any particular LED lighting will depend upon the requirements of the particular commercial/industrial and/or domestic application to be lit, the means by which it can be adapted to operate within the present system are as follows:

1. To enable advantageous system control each LED light, or group or LED lights, or strip of LED lights, or strip containing LED lights is fitted with a registration chip which can be identified and controlled separately. The means by which such chips may be fixed to any particular strip are as detailed hereinbefore and can be applied to chip-affixation to individual LED lights, or groups of LED lights;

2. On installation each LED light, or group or strip of LEDs, is calibrated over the range of input currents and 'on-off' pulse widths using a purpose designed spectrometer or spectroradiometer thus enabling the control system to deliver and record the wavelengths, intensities and photoperiods delivered by each LED light, group of LED lights, strip of LED lights, or strip containing LED lights. The means by which such calibration may be carried out are as detailed hereinbefore.

The present control system for the LED array(s) as defined herein uses smart software to manage the data being captured and relayed to the control system from various sources, lighting registration chips, rectifier control means, power line communications chip, wireless technology, local PCs, or other data capture means, in order to provide tailored monitoring and control of the overall growth system in response to such data capture in real-time.

According to one aspect the controllable power and lighting systems as defined herein wherein the LED lighting, including one or more LED strips, or groups of LED strips, or groups of LEDs, or individual LED light fittings/LED(s), are fitted with a registration strip, a local rectifier and optionally a powerline communications chip.

According to an alternative aspect the power and lighting systems as defined herein wherein the LED strips, or groups of LED strips, or groups of LEDs, or individual LED light fittings/LED(s) are fitted with a registration strip, and a local rectifier and wherein the registration chip provides means for communication with local/repeater wireless technology.

According to a further aspect there is provided a system as defined hereinbefore wherein each power consuming device, i.e. each individual LED-containing lighting device, and/or non-LED device where present, or group of LED-containing lighting devices and/or non-LED devices where present, or array of LED-containing lighting devices and/or non-LED devices where present, is individually or selectively registered wherein the system can be monitored and controlled wirelessly and remotely, wherein the individual LED(s) within the LED-containing lighting device(s), or LEDs in strips of LED light fittings are fitted with a registration chip, and a local rectifier and a powerline communications chip or wherein the registration chip provides means for communication with local/repeater wireless technology and wherein the LED-containing lighting devices and/or non-LED devices where present are thereby suitable for control via the internet.

Thus, the present disclosure additionally provides a method for adapting commercially available LED lighting for use in the novel power and lighting system and for the management and control thereof as defined herein.

Use in Applications Relating to Growth/Proximity to Living Organisms

Use of the controllable power and lighting systems for LED lighting in applications relating to growth as defined hereinbefore, and in particular to use in growth systems provides unprecedented efficiencies in running costs, versus current 24/7 monitored systems, as well as being less capital intensive to set-up, typically in the region of 30% cheaper. The present controllable power and lighting system provides for the first time a reliable, efficient, controllable and sensitive lighting system utilising 3-phase AC power, particularly low voltage AC power, and especially extra-low voltage AC power, for use in such applications, particularly growth systems, and in particular a controllable power and LED lighting system comprising an LED array for use in close proximity to living organisms, growing materials, humans or animals.

The present disclosure also relates to the spacing of LED lights in applications relating to growth as defined hereinbefore, and in particular to utility in commercial or domestic growth systems to achieve optimum uniformity in close, suitable, proximity to a growing material for example plants.

The present controllable power and lighting system provides a very low level of distorted light (unwanted distortion via electrical harmonics or other) at close proximity to plants, growing materials, animals and/or humans.

The disclosure also concerns the safe adjustment of distance between the growing material and the lighting arrangement, in applications relating to growth as defined hereinbefore, and in particular to use in commercial or domestic growth systems, for example between plants and LED lights.

The disclosure also concerns a method that allows LED lighting in the present power and lighting systems for use in applications relating to growth as defined hereinbefore, and in particular in a commercial or domestic growth system, to be controlled individually for wavelength, intensity and photoperiod over large surface areas 1 m$^2$ to over 10,000 m$^2$ in a growing environment providing supplementary light or the only light in growth chambers or multilayer growing.

The disclosure also concerns the provision of automated control, digital collection and reporting, as well as for the monitoring and management of wavelength, radiant intensity, photoperiod and other growth parameters in real-time and the use of feedback loops and evolutionary algorithms linked to the growth parameters and other conditions in applications of the present power and lighting system relating to growth as defined hereinbefore, and in particular to use in growth systems.

Historically in commercial/industrial greenhouses, plants have been grown under various forms of lighting such as HID sodium lamps. These are placed high above the plants, typically at from about 2 to 4 metres (m) above the plants, to evenly distribute the light and avoid damage from the large quantities of heat these lamps produce.

These sodium-HID lamps are typically powered at 240 v AC and typically produce white light. These lamps take a few minutes to reach full power and the lighting wavelength cannot be adjusted. They are therefore only appropriate for use in systems having long photoperiods and long dark periods. The introduction of light-emitting diode (LED) lighting technology, and in particular, the increase in power efficiency and the reduction in cost have led to the interest in replacing HID sodium lamps with LED fixtures. In addition, the ability to control each wavelength independently and to vary the intensities and the photoperiods is very attractive. It is technically possible using LEDs to adjust the photoperiods from milliseconds to hours. LED lighting manufacturers have designed compact LED lighting arrays using conventional printed circuit boards (PCBs) often incorporating 100's of high-powered LEDs. These are IP rated and supplied by high voltage, typically 240 v AC.

Commercial growth systems require LED strips to be specifically arranged and the LEDs thereon spaced in a particular manner to effect optimal growth with light efficiency.

Current compact LED lighting arrays are often air cooled with fans because over 50% of the power is typically converted to heat rather than radiant power. In addition to their high heat output, such LED arrays are unsuitable for use in close proximity to growth systems due to the manner in which the LED light is spread. In plant growth, systems such compact LED arrays are typically placed 2 m to 4 m above the growing crop with associated loss of heat and consequent impact on the plant growth cycle. In an effort to increase efficiency, smaller, strip-style LED arrays have been designed which can be placed much closer to the growing crop. However, as the LEDs within these strips are arranged uniformly in only one direction these must still be placed at least 50 cm above the growing crop in order to deliver the required uniformity of light distribution.

The Applicant has recognised the need to provide a controllable power and lighting system for use in applications relating to growth as defined hereinbefore, and in particular to use in growth systems, and in particular the need for a such a controllable system for providing power to LED strips which are capable of delivering radiant power distribution in a uniform manner which can be located more closely to growing materials than the presently available conventional compact or strip style LED lighting arrays. In particular, the Applicant has recognised that there is a need to provide a controllable power and lighting system for use in applications relating to growth as defined hereinbefore, and in particular to use in growth systems comprising strip style LED lighting arrays (LED strips) which deliver uniform power with minimised light paths which are capable of retaining the heat generated close to (<50 cm from) the growing material.

From a commercial perspective, it would clearly be of considerable benefit if such modified LED strips for use in the present controllable power and lighting systems could be operated in a cost-efficient manner. For commercial utility across a wide range of applications relating to growth as defined hereinbefore, and in particular to utility across a wide range of growth conditions such LED strips should be capable of providing these power and heat advantages in a manner compliant with the relevant safety standards for use in dry, wet or moist conditions. Given the increased complexity of commercial/industrial growth systems where a range of different crops can be produced at one site, the ability for remote control of the wavelength, radiant intensities and photoperiods of such LED strips is a pre-requisite for efficient growth systems.

Many commercial plant growth systems, such as greenhouse and poly-tunnel systems employ both artificial light as well as natural light. For optimal efficiency of the available light, shadow should be minimised, and the amount of natural light passing through to the growing crop should be maximised. This is not possible with either of the presently available systems because as discussed hereinbefore these must be placed at some distance from the growing organisms to protect from overheating, which means that the overall system design is inefficient. Commercially available LED lights are powered with DC current that means that they are typically placed in close proximity to an AC/DC inverter, typically 230 v AC-24 v DC. As discussed previously herein, at low voltage DC there is a significant voltage drop over short distances that mean that for system efficiency in growth systems in particular the AC/DC inverter must be placed at a distance from the strips of less than 5 m, and typically about 2 m from the strips.

When the currently available LED strips are placed in close proximity to growing crops the spacing between each LED light must be increased along the strips in order to deliver the required light uniformity and the adjacent LED strips must be paced closer together to provide the necessary heat. This necessitates use of an increased number of LED strips with associated increases in set-up and on-going operating costs with the associated increased risk of DC voltage drop.

To date efforts to resolve this issue have provided modified systems which utilise conventional LED lights in conventional LED strips in association with an increased number of AC/DC inverters which are smaller in size, with increased LED and inverter costs and far higher quantities of high voltage AC wiring. This is especially expensive in commercial/industrial growth systems where all wiring and inverters must be IP rated, and also the complexity of such systems means that the measures required for controlling each strip, as well as the wavelength, intensity and photoperiod generated herein becomes impractical as well as potentially hazardous should any fault occur.

Thus, there is a need to provide LED strips, suitable for use in the present controllable power and lighting systems, which are capable of delivering radiant power distribution in a uniform manner, which can be located more closely to growing materials, than the presently available conventional compact or strip style LED lighting arrays and which overcome the disadvantages associated with the presently available increased LED light spacing/increased LED strip arrangements. In particular, there is a need to provide strip style LED lighting arrays (LED strips), suitable for use in the present controllable power and lighting systems, which deliver uniform power with minimised light paths in a safe and effective manner which are capable of retaining the heat generated close to (<50 cm from) the growing material.

The Applicant has developed an improved LED array for use with the present controllable power and lighting systems that utilise a 3-phase AC power supply, which LED array is suitable for use in close proximity to organisms capable of growth, such as plants. Any LED suitable for use in growth systems may be utilised in the present improved LED arrays. Exemplary LEDs for use in systems suitable for plant growth as defined herein are independently selected from LEDs capable of providing wavelengths in the range of: from about 400 nm to about 750 nm; about 460 nm to about 640 nm; about 460 nm; about 560 nm; about 640 nm, wherein such wavelengths are provided by the individual LEDs, by one or more strips of LEDs arranged in a group, or by all of the strips of LEDs within the array. In particular LEDs capable of providing wavelengths of from about 400 to about 420 nm for the delivery of Violet #1 or Violet #2 LED lighting, or wavelengths of about 455 nm for the delivery of Blue LED lighting, wavelengths of about 530 nm for the delivery of Green LED lighting, or wavelengths of from about 6600 nm to about 730 nm for the delivery of Hyper red or Red lighting are suitable LEDs for use in any of the applications for the controllable power and lighting systems utilising 3-phase AC power, particularly low voltage 3-phase AC power, and more particularly extra-low voltage 3-phase AC power, as defined herein.

In accordance with an additional embodiment, the present disclosure additionally provides a method for the arrangement and control of LED lighting in a uniform and safe manner in close proximity to living organisms and which arrangement is suitable for use in the controllable power and lighting systems utilising 3-phase AC power as detailed hereinbefore.

Thus there is described an improved LED array for use with the present controllable power and lighting system for use in growth systems wherein said LED array comprises a series of individual aluminium strips arranged in parallel wherein one or more individual LED lights can be spaced at any distance along the length of each individual strip, wherein each individual strip is spaced at a similar distance from each individual adjacent strip and wherein the overall LED pattern provided by the LED array approximates to a uniform grid and wherein the LED strips are adapted to be powered by a 3-phase AC low voltage power supply, and particularly an extra-low voltage 3-phase AC power supply.

As detailed hereinbefore use of the present controllable power and lighting system using 3-phase AC voltage power, particularly low voltage AC, more particularly extra-low voltage AC, in accordance with the present disclosure removes the need to use high voltage AC supplies. The Applicant has found that is particularly advantageous for controllable power and lighting systems adapted for the promotion of growth of living organisms because this means that there is no longer any need for the high voltage AC supply to be located near the growing environment in a greenhouse or other growing chamber, and ideally enables removal of any high voltage AC to an external location.

Use of the present controllable power and lighting systems employing 3-phase AC voltage power, particularly low voltage AC, more particularly extra-low voltage AC, advantageously allows for the improved, controllable LED arrays as detailed hereinbefore to be utilised in close proximity to growing organisms, such as for example plants, greenhouse crops, vegetables, lettuce, fruits, tomatoes, cucumbers, glowers, algae, microorganisms. For the avoidance of doubt these improved, controllable LED arrays are also suitable for use in the promotion or management of growth of organisms that are capable of being grown in a growth tower. As detailed hereinafter the improved, controllable LED arrays can be used in close proximity to growing organisms without the heat-related and/or light spread-related risks associated with current systems, whilst overcoming the safety concerns and significant cost issues associated with currently available LED arrays.

For the avoidance of doubt the terms LED array(s), or improved LED array(s), or present LED array(s) as defined herein in respect of LED array(s) suitable for use in growth systems means controllable LED array(s) wherein such control is provided via the controllable power and lighting control system comprising 3-phase, AC power, particularly low voltage 3-phase AC power, more particularly extra-low voltage 3-phase AC power, linked to a main voltage step-down device, and particularly a main transformer wherein the 3-phase, AC power is distributed via conductive bus bars and wherein the system includes means for automatic control of the output of the LED array as detailed hereinbefore.

For the avoidance of doubt the definitions of terms used in relation to applications relating to growth hereinafter are in accordance with the definitions provided hereinbefore unless specified otherwise.

Proximity and Relative Location of LED-Array to Growing Materials

Close proximity as defined herein means that LED arrays suitable for control by the present power and lighting system can be placed at distances of: less than 50 cm; from about 5 cm to about 25 cm; from about 5 cm to about 20 cm; from about 5 cm to about 15 cm; from about 5 cm to about 10 cm; from growing materials in applications relating to growth, as defined hereinbefore, and particularly from growing organisms in a growth system.

Thus use of the controllable power and lighting system using 3-phase AC power as detailed hereinbefore in conjunction with controllable LED arrays, particularly controllable LED arrays suitable for use in applications relating to growth as described hereinafter, additionally provides a flexible system which allows for LED arrays to be selectively positioned in accordance with the predicted growth requirements for the selected growth material in applications relating to growth, for example in accordance with the predicted growth heights for the particular organisms within a chosen growth cycle. Advantageously, and as discussed hereinafter the present disclosure provides a flexible system which allows for different groups of LED strips within an array to be positioned at different heights to one another to accommodate growth of either different materials/organisms/plants, or different stages in the growth cycle of a particular material/organism/plant depending upon the requirements of the particular horticultural, agricultural or aqua-cultural application.

There is also provided herein a controllable power and lighting system for use in applications relating to growth wherein the lighting comprises one or more LED arrays, wherein each LED array comprises one or more strips wherein one or more individual LED lights are spaced at any distance along the length of each individual strip, wherein the LED containing strips are adapted to be powered by a 3-phase AC low voltage power supply and wherein:

(i) the 3-phase, AC power distributed to the array is reduced by an external voltage step-down device;

(ii) the 3-phase AC power is distributed by conductive bus bars;

(iii) the 3-phase AC power supplied to each strip is converted to low voltage DC via 3-phase AC/DC rectification of the power supplied to each connected load wherein each strip is a connected load;

(iv) the system includes means for automatic control of the output of the LED array as a whole or individual LED lights, or groups of LED lights within the array; and (v) optionally wherein the one or more LED arrays is placed at distances of less than 50 cm from growing organisms in a growth system.

According to a further aspect there is provided a controllable power and lighting system for use in applications relating to growth as defined immediately hereinbefore wherein the 3-phase AC power supplied to each LED-containing lighting device is reduced by a main AC voltage step-down device.

According to a yet further aspect, in the above controllable power and lighting system for use in applications relating to growth wherein the 3-phase AC power supplied to each LED-containing lighting device is reduced by a main voltage AC step-down transformer and wherein the power is 3-phase extra-low voltage (<=50V) AC RMS.

According to a yet further aspect, in the above controllable power and lighting system for use in applications relating to growth wherein the 3-phase AC power supplied to each LED-containing lighting device is reduced by a main AC step-down transformer, the power is 3-phase extra-low voltage (<=50V) AC RMS and wherein the 3-phase AC power supplied to the system is distributed by conductive bus bars wherein the bus bars are tubular or substantially tubular.

The relative location of the LED strips within the arrays in relation to the growing materials or organisms can be varied according to the nature of the growth system employed. Exemplary arrangements of the relative location of the LED strips within the arrays in relation to growing materials or organisms independently include:

growth systems wherein the LED strips of the array are located at a suitable distance above the growing organisms or materials;

growth systems wherein the LED strips of the array are vertically positioned and located at a suitable distance from vertically positioned growing organisms or materials;

growth systems wherein the LED strip arrangement is located at a suitable distance beneath the growing organisms or materials;

and growth systems wherein the LED array is located substantially alongside the growing organisms or materials and positioned at a suitable angle to provide heat and light for growth.

For the avoidance of doubt substantially perpendicular as defined herein includes systems having the array arranged at a 90° angle to the growing organisms or materials as well as systems wherein the array is arranged in a manner so as to substantially provide the equivalent growth parameters, heat and light, associated with a perpendicular arrangement. Such systems may include arrays at 90°+/−5°.

For example, in growth systems wherein the LED strips are vertically positioned, the strips may be positioned along one-side of any single row of supported plants; along both-sides of any single row of supported plants as; or may be positioned to provide strips in-between plants supported in a row in relation to LED strip arrangement.

According to one aspect the present disclosure provides a controllable power and lighting system as defined herein for use in a growth system including one or more LED arrays wherein each LED array comprises a series of aluminium strips arranged in parallel wherein individual LED lights can be spaced at any distance along the length of each individual strip, wherein each individual strip is spaced at a similar distance from each individual adjacent strip, and wherein the overall LED pattern provided by the LED array approximates to a uniform grid, and wherein the LED strips are adapted to be powered by a 3-phase AC low voltage power supply and wherein each LED array is associated with one or more growth units.

A growth unit as defined herein includes both vertically or substantially vertically arranged stacks of trays or shelves, as well as horizontally or substantially horizontally arranged rows of trays or shelves in which the organism to be grown is located, wherein said trays or shelves are configured to hold hydroponic, aeroponic, or tray- or pot-based growing systems or soil systems. For the avoidance of doubt, growth units as defined herein additionally includes trays or shelves which are present in intermediate positions between vertical stacks or horizontal rows, such as for example substantially trays or shelves which are positioned at angles of more than 5° to less than 85° from a horizontal position i.e. between about 6° and about 84° from a horizontal (flat) position. The term substantially in relation to vertically or horizontally as defined herein includes stacks or rows which are up to and including 5° from a horizontal position, or 90°+/−5° from a vertical position.

The improved LED arrays suitable for use with the controllable power and lighting systems herein can be utilised in a wide variety of applications relating to growth as defined hereinbefore, and in particular to utility across a wide range of growth systems including systems having access to natural light such as for example greenhouses or poly-tunnels, as well as systems without access to natural light such as for example enclosed tower systems.

Advantageously, the present controllable power and lighting system provides for the first time an effective "plug and play" system for complex LED systems for use in systems for the promotion of growth of living organisms, which can be designed and changed by the grower in accordance with the desired growth system to be accommodated and then the individual LEDS, or groups or LEDs can be registered and routinely calibrated as detailed herein.

Exemplary lighting arrangements for use of the present LED arrays in greenhouses and supported growth systems are discussed hereinafter.

As will be appreciated the advantageous flexibility of design and control afforded by the present controllable power and lighting system in combination with the exceptional efficiencies, desirable grid pattern delivered via the LED array as detailed hereinafter and enhanced safety features versus currently-available compact strip-style LEDs, coupled with the use of 3-phase AC with local rectification as also detailed herein, make this an attractive system for use in areas other than growth systems.

Thus the present disclosure additionally provides an LED array suitable for use with the present power and lighting system and suitable for use in commercial/industrial and/or domestic applications wherein the LED array comprises a series of aluminium strips arranged in parallel wherein individual LED lights can be spaced at any distance along the length of each individual strip, wherein each individual strip is spaced at a similar distance from each individual adjacent strip and wherein the overall LED pattern provided by the LED array approximates to a uniform grid and wherein the LED strips are adapted to be powered by a 3-phase AC low voltage power supply. For the avoidance of doubt the control measures for individual LEDs, or groups of LEDs within this LED array, are as defined herein in relation to LED arrays for use in applications relating to growth.

The present disclosure also details a control system for use with LED arrays as defined herein wherein the control system includes means for logging of data for measurement of the radiant power of the LED array as a whole, or an individual LED strip, or groups of LED strips within the array without continuous spectroradiometry. For the avoidance of doubt the mean for logging of data for measurement of the radiant power of the LED array as a whole or an individual LED strip, or groups of LED strips within the array is as defined hereinbefore.

As detailed hereinafter there is provided an LED array suitable for use in applications relating to growth and particularly for use in growth systems comprising a series of strips arranged in parallel wherein individual LED lights can be spaced at any distance along the length of each individual strip, wherein each individual strip is spaced at a similar distance from each individual adjacent strip and wherein the overall LED pattern provided by the LED array approximates to a uniform grid and wherein the LED strips are adapted to be powered by a 3-phase AC low voltage and particularly via a 3-phase AC extra low voltage power supply.

LED Arrangement for Use in Arrays in Applications Relating to Growth

The advantageous use of the present controllable power and lighting system for the control of LED arrays having potentially millions of LEDs is detailed hereinbefore. These advantages are equally applicable to use in applications relating to growth.

A suitable LED array for use in applications relating to growth comprises a series of aluminium strips arranged in parallel. A series of aluminium strips arranged in parallel as defined herein means a plurality of individual strips wherein each individual strip is substantially parallel to at least one other individual strip. In contrast to current commercial systems the number of LEDs that can be incorporated into these LED arrays is limited only by the scale of the growth system to which the arrays are to be applied.

Exemplary arrangements of one or more linear strips of LEDs, for location upon a suitable host strip are discussed herein. As detailed herein the flexibility of the present system means that there is a high degree of freedom in relation to the arrangement of the strips of LEDs, and as will be readily appreciated by the skilled person this means that any other desirable configurations, other than those exemplified herein are equally possible.

These LED arrays herein can distribute 3-phase, AC power, particularly low voltage, 3-phase AC power, efficiently over large growing areas from 1 $m^2$ to over 10,000 $m^2$ by use of suitable voltage step-down devices, and particularly transformers such as large high voltage AC to low voltage, 3-phase AC transformers. As detailed hereinbefore, in general, larger transformers provide desirable efficiencies, typically in the region of 95-99% or more and the Applicant has found that to achieve high efficiency greater than or equal to 5 kw levels are required, i.e. =>5 kw. Exemplary high voltage AC to low voltage, 3-phase, AC transformers at or above 150 kilowatts (kW), or 200 kW suitable for use herein can provide efficiencies of around 95 to 99%. Accordingly, use of such a transformer in a controllable power and lighting system as detailed herein in combination with one or more of these LED arrays could supply a growth system such as a commercial/industrial greenhouse with 5000 $m^2$ of growing crop or 7000 $m^2$ total area.

The voltage step-down devices for use in the present controllable power and lighting systems, and therefore for use in relation to applications relating to growth, are as detailed hereinbefore. In particular the Applicant has found that 240/415 v to <=50 v AC RMS step-down transformers can be advantageously employed in applications relating to growth, particularly plant growth. As will be appreciated a suitable step-down device, such as a step-down transformer, can be sized to supply multiple growth locations, such as multiple greenhouses, to provide capacity of thousands of metres square. For safety reasons such step-down devices are generally located externally. To optimise system efficiency larger transformers are preferred, and as such when a new growth system is being designed the current and future capacities should be considered to ensure that the system is designed to deliver both initial and on-going efficiency. In general, larger transformers provide greater the efficiency, typically in the region of 95% to 99% or more.

As detailed herein, use of the present controllable power and lighting system comprising 3-phase AC power, and in particular low or extra-low (<=50V AC RMS) voltage 3-phase AC power, in conjunction with the controlled LED arrays as also detailed herein provides efficiency benefits, such as electrical efficiencies as detailed hereinbefore. According to a preferred embodiment, the present controllable power and lighting systems for use in growth utilise 240 v AC to 24/50 v AC transformers that can be up to 99% efficient at large scale, in combination with local rectifiers/local voltage correction device on each LED strip. Such rectifiers can be selected as discussed hereinbefore.

Thus a combination of the controllable LED array suitable for use in the present controllable power and lighting system using low or extra-low (<=50V AC RMS) voltage, 3-phase, AC as detailed hereinbefore advantageously provides unprecedented efficiency benefits, improved rectification and increased safety as well as overcoming the disadvantages associated with multiple drivers and 240V AC wiring required by currently available power and lighting systems suitable for use in applications relating to growth and in particular in a growing environment. In particular, currently available compact LED strip style arrays require 240 v AC to 24 v DC drivers to be located very near to the LED strips, typically within 2 m, because of the inherent limitations of 240c AC to 24 v DC drivers. This means that on a commercial/industrial scale, growth systems based on currently available technology require thousands of LED strips, thousands of drivers and thousands of metres of high-cost 240 v AC wiring in order to simply be run.

Advantageously the present systems that comprise the unique combination of running low voltage, 3-phase, AC to the LED strips from a remotely located AC to AC transformer successfully overcomes these issues with the additional advantage that automatic correction of voltage drop at any strip within the system is managed by local inverters on each strip. As also discussed herein the present system is uniquely able to accommodate local controllers for current control and for pulse wave modulation (PWM). In particular the controllers for current and/or PWM control may be located on the strips.

A representation of a growth system utilising this efficient power system is illustrated in the Figures and exemplary greenhouse-based systems are provided in Example 1.

According to a further aspect the present disclosure provides additional means for protecting the improved LED arrays in the lighting arrangements suitable for use in growth systems from electrical power surges via the use of transformer related surge protection equipment on the high voltage side of the transformer. The means for providing such surge protection is as detailed hereinbefore.

Thus, the present disclosure provides a novel and improved LED lighting system suitable for use in growth systems in accordance with any of the aspects defined herein wherein the system additionally provides means for protecting the lighting arrangements in systems from electrical power surges.

In particular the present disclosure provides a novel and improved LED lighting system suitable for use in growth systems in accordance with any of the aspects defined herein wherein the system additionally provides means for protecting the lighting arrangements in systems from electrical power surges wherein said means comprises the combined use of surge protection equipment, watchdog timer equipment and optionally one or more fuses. To accommodate greenhouses having very large growing areas of thousands of metres square, the Applicants have designed a modified system wherein the large transformer is installed at a high level inside the greenhouse with only the cabling up to the transformer being IP rated and the remainder of the system being as defined hereinbefore.

For greenhouses having very large growing areas, or any other system where the improved LED array and present controllable power and lighting system comprising 3-phase low or extra-low (<=50V AC RMS) voltage AC power is to employed which has a large footprint, the conductive bus bars not only provide the means for distribution of the low or extra-low (<=50V AC RMS) voltage, 3-phase, AC power to the rectifier means on the LED strips, but also are advantageously also employed to provide the supporting structure upon which the T-shaped strips comprising the LED strips and additional components are placed.

Any suitable bus bars as previously defined herein and in particular metals such as aluminium, copper or brass or mixtures thereof may be used in applications of the present controllable power and lighting system which relate growth. The shape, details of commercially available tubular bus bars, and examples of suitable bus bars suitable for use in applications relating to growth are as detailed hereinbefore. For the avoidance of doubt, the selection of a suitable bus bar, and in particular the wall thickness and/or diameter of the bus bars will be dependent upon the requirements of the particular application in which they are to be employed.

For the avoidance of doubt each of the aspects and feature of bus bars detailed hereinbefore are equally applicable to use in relation to growth systems. Tubular or substantially tubular bus bars are particularly useful for use in applications relating to growth, and tubular or substantially tubular circular bus bars are especially useful.

In addition to providing means for distribution of the 3-phase low voltage, particularly 3-phase extra-low voltage AC-power in applications relating to growth, bus bars can also be utilised to host T-shaped strips, and thereby the LED lighting provided by one or more LED-arrays as described elsewhere herein. This combination of the present controllable power and lighting system additionally comprising an LED array hosted upon bus bars provides a reliable, efficient, controllable and sensitive LED array using 3-phase low voltage, particularly extra-low voltage AC power that is suitable for use in close proximity to living organisms or materials.

According to a further aspect the present disclosure additionally comprises a growth system as defined hereinbefore having conductive bus bars of one or more of Al and Cu or a mixture thereof.

Exemplary bus bars for use as the main, or primary, bus bars in the growth systems herein are tubular, or substantially tubular, aluminium bus bars.

For electrical and heat insulation the bus bars for use in applications relating to growth may be protected with any suitable insulating materials as detailed hereinbefore, and the controllable power and lighting system for use in applications relating to growth may also include additional means for protection from electrical surges, over and above the use of transformer related surge protection equipment on the high voltage side of the transformer, such additional means is also detailed hereinbefore.

LEDs on T-Shaped Strips and Hosted on Bus Bars

In addition to the LED-containing lighting devices detailed hereinbefore, the present controllable power and lighting systems, particularly systems for use in applications relating to growth and especially for utility in commercial/industrial growth systems, may include LED-containing T-shaped strips. Suitable LED-containing strips are discussed hereinafter. Exemplary T-shaped strips and use of such exemplary T-shaped strips to host a series of LEDs connected together, as well as utility of such strips within an LED lighting array for use in growth systems are disclosed in WO2016/027095 and are illustrated at FIGS. 11, 12 and 14. The disclosures of WO2016/027095, in so far as they relate to the exemplary lighting arrangements employing LEDs hosted on T-shaped strips, and their use in growth systems as indicated in FIGS. 11, 12 and 14, are incorporated herein by reference.

Thus there is additionally provided herein a controllable power and lighting system for use in use in applications relating to growth and especially for utility in commercial/industrial growth systems or for domestic use comprising one or more LED-containing lighting devices wherein the one or more LED-containing lighting devices is adapted to be powered by a 3-phase AC power supply wherein the 3-phase AC power supplied to each lighting device, or group of lighting devices is converted to DC power via 3-phase AC/DC rectification and wherein the 3-phase AC power supplied to the system is distributed by tubular bus bars and wherein the one or more of the LED-containing lighting devices are one or more LED-containing T-shaped strips.

According to a further aspect the present disclosure provides a power and lighting system wherein the lighting includes LEDs hosted on a T-shaped host strip made of conductive material and wherein said strips are hosted upon bus bars and conduct the low voltage, or more particularly the extra-low voltage 3-phase, AC power from the bus bar to the LEDs, thereby acting as secondary or tertiary bus bars.

The individual LED strips suitable for use with such T-shaped strips comprise an arrangement of one or more LEDs which are connected to one another by suitable wiring. In use, the LED strips are co-located with and are adjoined to a suitable substantially T-shaped host strip. Suitable host strips are substantially 'T' shaped for strength, are light weight and typically less than 20 mm wide. The T-shaped host strips may be made of any suitable conductive material which has sufficient strength to support the LEDs during the lifetime of the strip, LED or system, and, as discussed in relation to use in growth systems hereinafter, T-shaped host strips having the capacity to act as heat sinks are especially useful. An exemplary T-shaped host strip material for use herein is aluminium.

The number of LEDs on each LED strip can be as little as one, with the maximum number being determined by the DC voltage available from the rectifier divided by the forward voltage required by each LED. For example, at the maximum safe voltage of 50 v AC RMS which would convert to 74 v DC with a typical red LED forward voltage of 2.2 this would be 33 LEDs.

Each LED is surface-mounted on to a suitable PCB which is connected to the aluminium T strip by a thermally efficient adhesive bonding.

These T-shaped LED containing strips are especially suited for use in power and lighting systems for use in proximity to living organisms, such as for example in commercial/industrial growth systems as detailed hereinafter.

Such T-shaped strips are particularly well-suited for hosting upon bus bars, as illustrated by the linear section of the linear T-shaped strip in WO2016/027095 at FIGS. 11, 12 and 14. In addition such T-shaped strips may be bent, twisted or otherwise manipulated to provide bespoke LED strips for use herein, provided that the area of the strip to be located upon the bus bars remains intact and in its original form.

The T-shaped strips should also be capable of acting as a heat sink for the waste heat from the LEDs to be dissipated in order to enable the LEDs to operate at their designed temperature.

Each such T-shaped strip, or group of strips, includes a registration chip and a local inverter which may be in the form of a chip. For the avoidance of doubt the automatic correction of voltage drop at any strip within the system is managed by the local inverters on each strip, and the registration chip(s) enable identification and individual and/or group control of strips within the array(s) via a suitable control system.

Where a series of aluminium T-shaped strips is to be arranged in parallel this means a plurality of individual strips wherein each individual strip is substantially parallel to at least one other individual strip. The number of LEDs which can be incorporated into any strip is limited only by the relative length of the strip and the size of the LED fitting. Advantageously the present controllable power and lighting system suitable for use in commercial/industrial growth systems and/or domestic growth systems as defined in accordance with any of the aspects hereinbefore additionally includes one or more LED arrays hosted on aluminium T-shaped strips which can be designed on an area-by-area, room-by-room, section-by-section, or floor-by-floor basis according the needs of the particular environment to be powered and lit.

The relative spacing of the LEDs on the host strips and the relative spacing of the host strips from one another will determine the overall LED pattern provided by the array.

The present power and lighting systems as defined hereinbefore may include LED arrays comprising one or more LED strips wherein each LED strip incorporates a local registration chip, and a local inverter wherein said LED strips may be independently selected from: individual T-shaped linear aluminium strips containing LEDs, groups of such T-shaped LED strips arranged in parallel, or alternative LED arrays comprising individual T-shaped bent, twisted or otherwise manipulated aluminium T-shaped strips, or groups of such bent aluminium strips containing LEDs in non-parallel arrangements, or groups of bent strips in non-parallel arrangements. For the avoidance of doubt the term local in relation to the registration chips for the LED-containing strips is as defined herein before for registration chips for LEDs. The term local in relation to the inverter is as defined hereinbefore.

LED Array Hosted on T-Shaped Strips for Use in Applications Relating to Growth

According to a preferred aspect there is provided a controllable power and lighting system as defined in accordance with any of the aspects hereinbefore suitable for use in applications relating to growth, and in particular in growth systems, wherein the one or more LED arrays employed in said system is hosted on aluminium T-shaped strips and wherein individual LEDs can be spaced at any distance along the length of an individual host strip. As detailed hereinbefore, the relative spacing of the LEDs on the host strips and the relative spacing of the host strips from one another will determine the overall LED pattern provided by the array. For use in applications relating to growth, the Applicant has found that a regular, grid-like lighting pattern, a uniform grid, is useful for the provision of consistent levels of lighting across the area to be lit. The Applicant has found that an overall LED pattern that approximates to a uniform grid is provided by LED arrays where the LEDs are spaced at similar distances from one another in two directions. A uniform grid-like pattern is provided by the series of LED-containing strips in LED-arrays comprising a series of strips, where the LEDs in each individual strip are spaced at similar distances from one another, where the LEDs are hosted on aluminium T-shaped strips, where typically each LED-containing aluminium T-shaped strip is spaced at a similar distance from the adjacent LED-containing strip.

Each individual LED strip comprises a linear arrangement of one or more LEDs connected to one another by suitable wiring and, wherein the LED strips are co-located with and adjoined to, a suitable conductive and substantially T-shaped host strip. Suitable host strips are substantially 'T' shaped for strength, are lightweight and typically less than 20 mm wide.

The maximum number of LEDs located on an LED-containing aluminium T-shaped strip is determined by the safe, accessible voltage of the LED strip power supply; the minimum number of LEDs on a strip is 1 (one).

This arrangement of the LEDs provides a near perfect grid allowing the LEDs in the strip(s) to be placed very close to the material to be growth, and for example in growth systems close to the growing crop, such as for example as close as 5 cm from the crop.

Use of the present controllable power and lighting system which utilises low, or extra-low voltage AC power with LED arrays in applications relating to growth removes the need for any expensive IP rated electrical equipment inside the area to be lit, including inside a greenhouse or growing chamber. Use of the present controllable power and lighting system which utilises low, or extra-low voltage AC power with LED arrays in applications relating to growth means lower voltages, and typically voltages of less than 30 v AC, or even less than 20 v AC can be used for enhanced safety.

For the avoidance of doubt, all references herein to the term strip within an operational LED array, or within an LED exemplary array suitable for use in growth systems means a complete strip comprising a substantially T-shaped host strip with one or more LED strips attached thereto. For the avoidance of doubt, alternative, conductive host strips of different shapes having suitable strength and light-weight properties, or alternative T-shaped host strips comprising mixed materials, whether a mixture of different conductive materials or a mixture of conductive and non-conductive materials can be used.

For plant growth systems that utilise both artificial and natural light this substantially T-shaped design in combination with the lower distances between the growth media and the improved LED lighting array advantageously provides increased levels of natural light. The T-shaped host strips herein should be sufficiently strong and rigid to span between fixing points, which are typically about 2 m to about 4 m apart. These fixing points may be high tensile wires or another appropriate potentially movable fixing means having the potential to be raised or lowered according to crop height. In a preferred embodiment, the tubular or substantially tubular bus bars that provide the low voltage power distribution to the lighting system additionally comprise the fixing means. For example, the tubular bus bars as discussed hereinafter can be incorporated into the present systems with suitable means for height adjustment.

As discussed hereinbefore for growth systems having a very large footprint, aluminium tubular bus bars, which may be insulated, are advantageously employed to provide both the required support for the T-shaped LED containing strips, as well as carrying the power source from the transformer to the local rectifiers via suitable connections.

As discussed hereinbefore the T-shaped strips herein should also be capable of acting as a heat sink for the waste heat from the LEDs to be dissipated in order to enable the LEDs in the improved LED arrays for use in growth systems employing the controllable power and lighting system as defined herein to operate at their designed temperature. Advantageously where the system is employed in a plant growth environment the T-shaped strips enable such waste heat to be dissipated back into the growth system as useful heat due to the close proximity of the LED array to the growing crop.

The T-shaped strips are advantageously adapted to provide a sufficient width to allow ambient light to pass through the strips and reach the growing crop.

The number of LEDs on each strip, and the means for mounting LEDs onto T-strips are as detailed hereinbefore.

Thus, according to a further aspect, the present disclosure provides an improved, controllable LED array as defined hereinbefore for use in growth systems which does not include a PCB, and which does not require IP rating.

Alternatively, micro single component PCBs can be hard-wired in series or a full-length PCB strip can be used in growth systems herein, with associated costs.

Power Supply and Control Functions for Applications Relating to Growth

In applications for the present controllable power and lighting system which relate to growth where the LED lighting is provided by one or more arrays where the arrays comprise a series of LED-containing T-shaped strips as detailed hereinbefore each LED strip in the array is in electrical connection with the low voltage/extra-low, 3-phase, AC power supply, as distributed via the progression of power from the bus bar assembly, via main, secondary and tertiary bus bars where present, to the T-shaped conductive strip and thereafter to the LED strip, or to a conductive element or aspect of the T-shaped strip which is in electrical connection with the LED strip, and subsequently to the individual rectifiers for conversion to low voltage DC via 3-phase AC/DC rectification. This arrangement means there is no need for an IP rating. The low voltage, 3-phase, AC is converted to DC at the end of each strip by using an appropriate 3-phase AC/DC rectifier.

Each LED strip or group of LED strips within the LED arrays for use of the present system in applications relating to growth can be controlled independently. The means for provision of control of the LED strips is as defined hereinbefore and comprises power line technology, or wireless technology or a combination of both via a wireless link to a local PC and/or via the internet remotely.

As also detailed hereinbefore, to enable advantageous system control each strip or group of strips is fitted with a registration chip that can be identified and controlled separately. Each LED strip is calibrated as detailed herein in order to enable the control system to deliver and record the wavelengths, intensities and photoperiods received by the material being grown, such as for example a particular crop, from each LED strip.

As detailed hereinbefore individual LED lights for use in the present systems, including controllable LED arrays using T-shaped host strips for a series of linked-together LEDs, are ideally calibrated and registered prior to the system being operated. Each LED strip has a 'serial identifier chip' to provide serial registration on this low-cost wire network, which means that the LED calibration information would be stored against this unique number.

Once the growth system is up and running with the calibrated, registered LEDs then, in the future when any of these combinations are used the data will be known and can be mapped for the growing cycles under each LED strip or group of LED strips.

Tailored monitoring and control of the overall system in applications relating to growth, is provided by smart software as detailed hereinbefore and for the avoidance of doubt this smart software is also used in the control system for the controllable LED arrays hosted on T-shaped strips as also defined herein.

Power line technology, as detailed hereinbefore, provides the ability to include communications functionality on top of an existing AC supply waveform in applications of the present system relating to growth.

For the avoidance of doubt, the advantages as previously detailed as being provided via use of the controllable power and lighting system as detailed hereinbefore, and in particular the provision of: means for independent control of the wavelength intensity and photoperiod of each LED strip, or groups of LED strips, within LED arrays; means for logging of data for measurement of the radiant power of the LED array as a whole, or individual strip, or groups of strips within the array without continuous spectroradiometry; means for independent control of each individual strip or group of strips containing either one or more strings of LEDs of different wavelengths uniformly; means for individual registration of LEDs for control ultimately via technology the internet with all data collected, controlled and/or managed via a power line communications chip, or wireless technology; equally apply where such systems are utilised in combination with the controllable LED arrays in applications relating to growth herein.

By linking the control system for the LED array to suitable sensors, and in particular sensors relating to growth such as plant sensors and light sensors an overall control system providing real-time or periodic data-sets which enable progressive/on-going of optimisation and/or maintenance of pre-defined output levels within the system can be achieved in applications relating to growth.

Typically, the wavelengths provided by the LED strips within the improved LED arrays for use in applications relating to growth as defined herein are red 640 nm, blue 460 nm and green 560 nm, although many more wavelengths are possible depending upon the particular arrangement selected.

Thus according to a further aspect the present disclosure provides a controllable system for providing effective light levels for use in applications relating to growth, particularly plant growth systems, via an improved LED array as defined hereinbefore and wherein it is a feature of said control system that there is no need for on-going measurements of the LED wavelengths, intensities or photo periods.

In applications relating to growth the present system for control of power and lighting can also be linked to a natural light meter to enable the controls to adjust the individual LEDs within the LED arrays as light levels change in the growth environment, such as for example a greenhouse.

Since LED lights are between 30-60% efficient (radiant power to electrical input power) large amounts of heat are produced. By placing an optically efficient thermal screen immediately above the strips in the array it is possible to retain more of this heat in the growing environment and less is wasted into the headspace of the greenhouse.

Similarly, humidity and $CO_2$ levels can be controlled in applications of the present system relating to growth such as in plant growth systems via the incorporation of automated fans linked to the humidity and $CO_2$ levels in the 'head space' of the greenhouse.

A particular feature relating to the utility of the present systems for the provision of controllable power and uniform LED lighting in applications relating to growth is the ability to power the LEDs at a voltage that is safe for operatives especially where moisture and water may be present. In such systems this is achieved by connecting the LED strips to a 3-phase AC low voltage power supply, between 12-50 v AC, typically 24-36 v AC. This allows the high voltage supply to be either external to the entire greenhouse or placed at high level inside the greenhouse or externally in a closed system with no natural light. This low voltage, 3-phase, AC supply is provided by a simple AC transformer from high voltage to low voltage, 3-phase, AC which typically can be placed either at high level in the greenhouse or externally. The conversion from low voltage, 3-phase, AC to low voltage DC which is necessary to power each strip is facilitated by a 3-phase AC/DC rectifier at the end of each strip. A further safety advantage provided by use of the present system for the provision of improved, controllable and uniform LED lighting for growth systems, versus those currently available, is that once the system has been installed the operatives managing the growth of the plants, or responsible for day-to-day maintenance of the plant growth environment, can safely install and maintain all the LEDs because the LEDs are operating at only low voltage, 3-phase AC. This leads to additional commercial/industrial operating cost reductions.

Thus according to a further aspect there is provided herein use of a control system as defined hereinbefore in applications relating to growth wherein the lighting comprises an LED array as defined herein wherein the control system includes means for logging of data for: measurement of: the radiant power of the LED array as a whole, or individual strip, or groups of strips within the array; measurement of growth of the organisms within the system via plant sensors; and/or measurement of light levels within the growth system via light sensors, and wherein the system includes means for automated control of one or more of: relative height of one or more thermal screens within the plant growth system; one or more fans linked to the humidity and $CO_2$ levels within the plant growth system and wherein said control system provides means for control of the operational voltages to maintain efficiency of 90% or above.

According to a further aspect each individual LED strip or group of LED strips within LED arrays for use of the present systems in applications relating to growth can be individually registered for control ultimately via technology the internet with all data collected, controlled and/or managed via a power line communications chip, or wireless technology.

The ability to control the intensity and the photoperiod of each wavelength on each strip allows feedback loops to vary the LEDs according to the ambient light conditions in applications relating to growth, such as in greenhouses, or the crop conditions in a closed growing environment. This allows for the optimum use of power by optimising the LED photon production with optimal photosynthesis.

This process of optimisation can be evolutionary either by experimentation or by the introduction of hyper spectral imaging to measure all aspects of plant stress. This data can be collected via the control system linked to imaging and light sensing equipment allowing feedback loops to control the light in real time.

As evolutionary algorithms are introduced, and the financial input costs and crop outputs are measured the overall costs of production can be minimised. Further, the varying costs of power throughout can be factored in to minimise the costs of power.

This approach, when compared to HID sodium lamps or fixed output LED arrays will reduce the requirement for heating in greenhouses or in closed growing environments. In closed systems, the increased system efficiency reduces the need for cooling.

FIGURES

Representative examples of bus bars and controllable power and lighting systems utilising low voltage, 3-phase AC power distributed via bus bars suitable for use in commercial/industrial and/or domestic applications are illustrated hereinafter. In particular examples of such systems having aluminium bus bars, at low voltage, 3-phase, AC, used to power LED lights, individually or in groups, within one or more LED array and the capacity to power non-LED devices where 'power line' technology, provided via the bus bars, provides a control system for the lighting system, and wherein the control system communicates with each individual LED light/group or array, or non-LED devices via use of one or more registration chips for identification, as well as particular aspects of features of such systems are illustrated in and are discussed in relation to FIGS. 16 to 19 presented hereinafter.

For the avoidance of doubt, whilst FIGS. 16 to 19 illustrate the utility of a power and lighting system in accordance with an aspect of the disclosure within specific environments, the particular features of the power distribution system and LED arrays illustrated therein and as discussed herein after are equally applicable for use in alternative commercial/industrial and/or domestic systems. As such the following FIGS. 16 to 19 provide representative examples of particular embodiments of an aspect of the present disclosure and are not intended to be limiting thereon.

As discussed hereinbefore the present controllable power and lighting system is suitable for use in a wide-variety of applications. Exemplary applications for such use, and representative examples of growth systems incorporating an LED array suitable for power and control by the present system are disclosed in WO2016/027095 at FIGS. 16, 17, 18 and 19. The disclosures of WO2016/027095, in so far as they relate to the exemplary lighting arrangements indicated in FIGS. 16, 17, 18 and/or 19, are incorporated herein by reference.

Representative examples of growth systems incorporating a novel and inventive LED array, as also detailed herein as well as particular aspects of features of said array are illustrated in and are discussed in relation to FIGS. 14 to 18 presented hereinafter.

For the avoidance of doubt, whilst FIGS. 14 to 18 illustrate the utility of an LED array and control system therefore for use in a growth system in accordance with the present disclosure within a specific environment, a greenhouse of capacity up to 10,000 m² or greater where the LED array is used to supplement natural lighting at different times of the day, the particular features of the LED arrays illustrated therein and as discussed herein after are equally applicable for use in smaller greenhouses having growth areas of from 1 m² up to 10,000 m², as a supplementary light source, for use in the dark growth systems from 1 m² to 10,000 m² and beyond and in particular for use in growth chambers, multi-layer growing systems or integrated growth system (IGS) towers which do not utilise natural light in the growing process.

As such the following Figures provide representative examples of particular embodiments of the present disclosure and are not intended to be limiting thereon.

DESCRIPTION OF THE FIGURES

FIG. 1 illustrates the input 3-phase AC power supply, voltage step-down means, and distribution of power to a lighting device where 3-phase AC/DC rectification occurs. Only a partial representation of a lighting system is illustrated in FIG. 1. As will be readily appreciated the power transformation and rectification means illustrated and as discussed in the present description can be readily applied to power a wide variety of different lighting devices, as well as non-lighting devices. In addition, whilst in the specific system segment illustrated in FIG. 1, the power is distributed to the lighting device via conductive bus bars, as will be also appreciated from the foregoing description, alternative conductive means can also be used to distribute power to the one or more lighting, or non-lighting devices in systems according to the present disclosure, of which a segment of one embodiment is illustrated in FIG. 1.

In particular, FIG. 1 illustrates a 3-phase supply (1), that provides input power to a voltage step-down device (2) to convert the input voltage into a lower, low voltage power supply, and the low voltage power is distributed to a lighting device, LED fixture (3) via a conductive bus bar arrangement (4)/(6). FIG. 1 also illustrates the distribution of the low voltage power via 3 main parallel primary conductive tubular bus bars (4), to means for provision of communications functionality, in this example by power line gateway or modem (5), and thereafter via a secondary distribution branch of the bus bar arrangement (6) comprising 3 parallel tubular bus bars to the LED fixture, only two of these parallel bus bars are visible in the FIG. 3) i.e. the bus bar arrangement provides the one or more of the line/live conductors to enable data to be sent to and from the system from the power line modem (5).

As is shown in FIG. 1, all three bus bars in the main (4) and secondary (6) bus bar arrangements are tubular, and as confirmed in FIG. 5 the bus bars for use herein are tubular and have a hollow interior.

Figure 7:
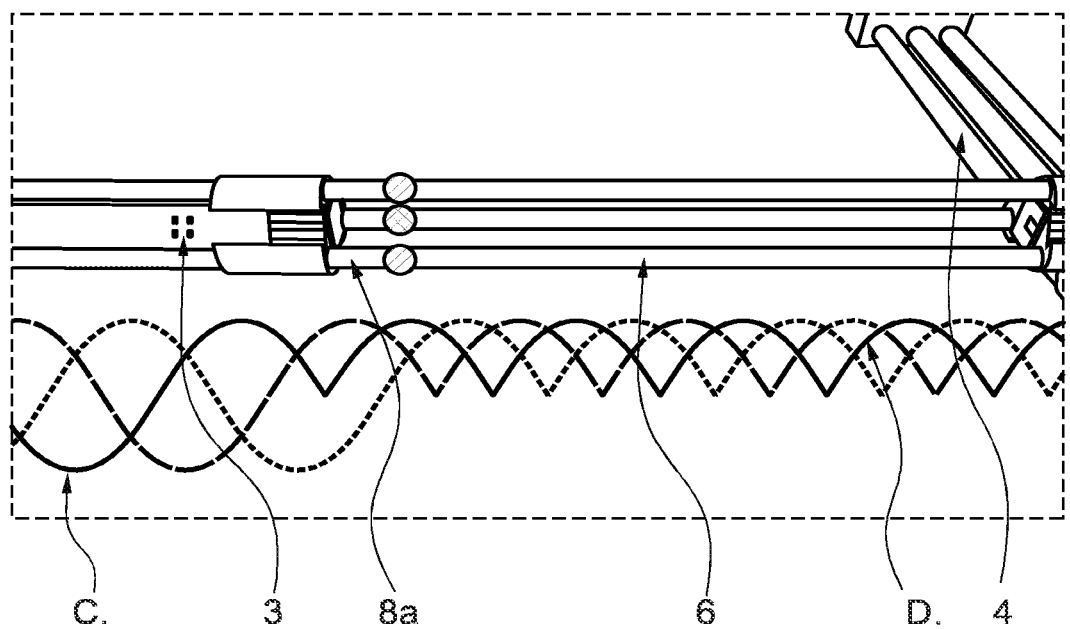

Means for the 3-phase AC/DC rectification of the 3-phase AC power to provide DC power to the lighting system is as described hereinbefore, and an exemplary rectification means is illustrated in FIG. 7.

Figure 1:
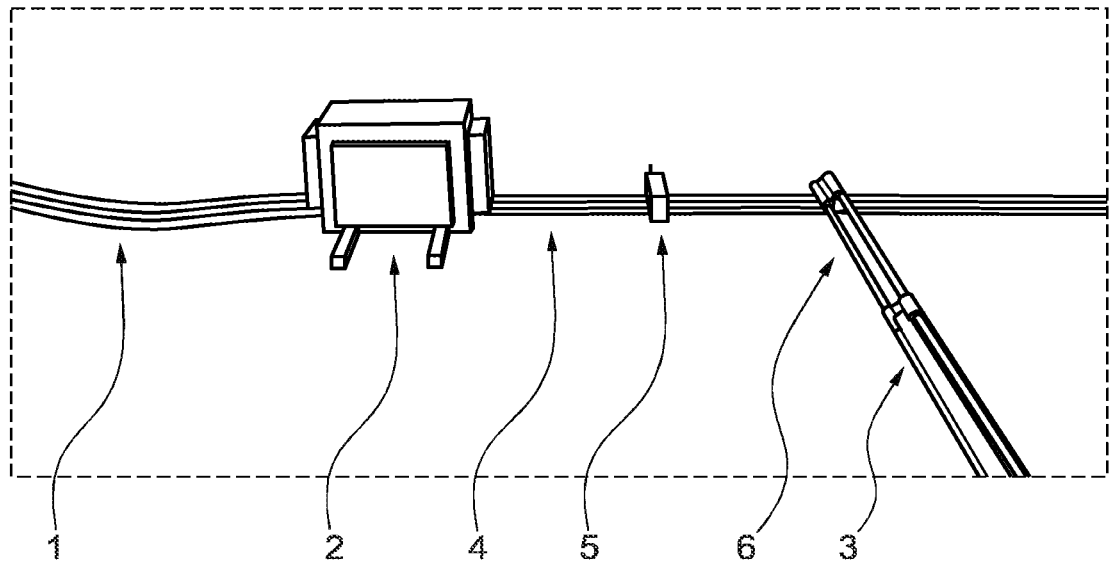
FIG. 1: illustrates an example of an implemented controllable power and lighting system in accordance with the present disclosure. In general

The advantages of the use of a system as illustrated in FIG. 1 are as described hereinbefore, and in particular in Example 2.

Figure 2:
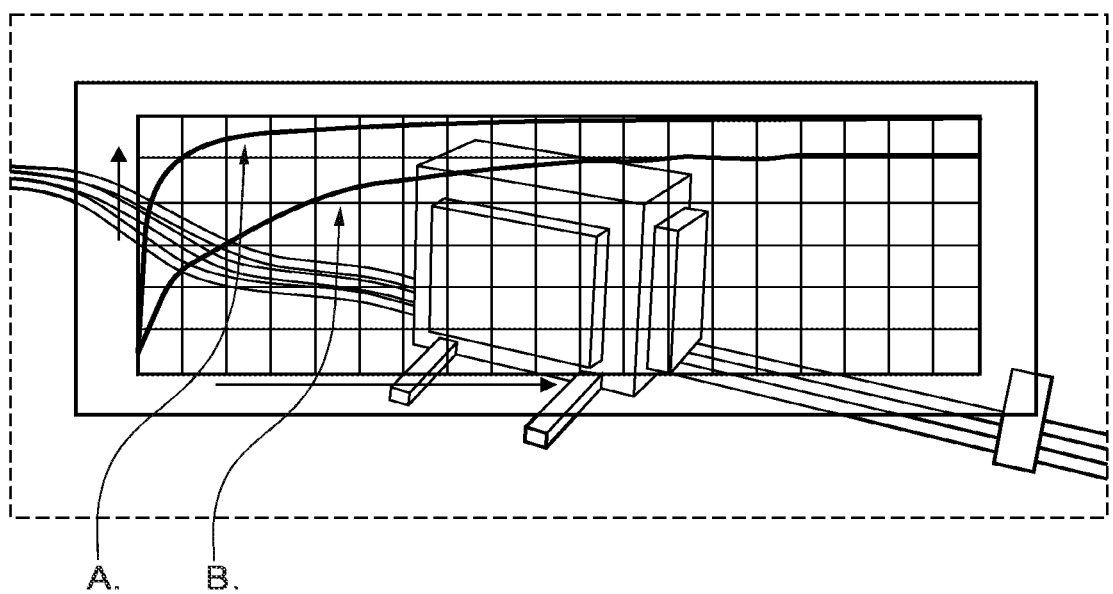

FIG. 2: illustrates the efficiency versus power output curves, the so-called efficiency curves, obtained from use of a 3-phase transformer (A), or a traditional switch mode power supply (B) are used in the present systems, and in particular in the system embodied in FIG. 1. The vertical scale indicates efficiency from 0 to 100%, of output power/input power, and the horizontal indicates output load from 0 to 100%. Comparison of the efficiency curve obtained from use of a 3-phase AC power supply to that for the traditional power supply demonstrates a higher overall efficiency and also a higher efficiency across the loading. The 3-phase approach (A) gives approx. 97% efficiency above 15% load. The traditional single-phase approach (B) is generally 85% efficient above 40% load.

Figure 3:
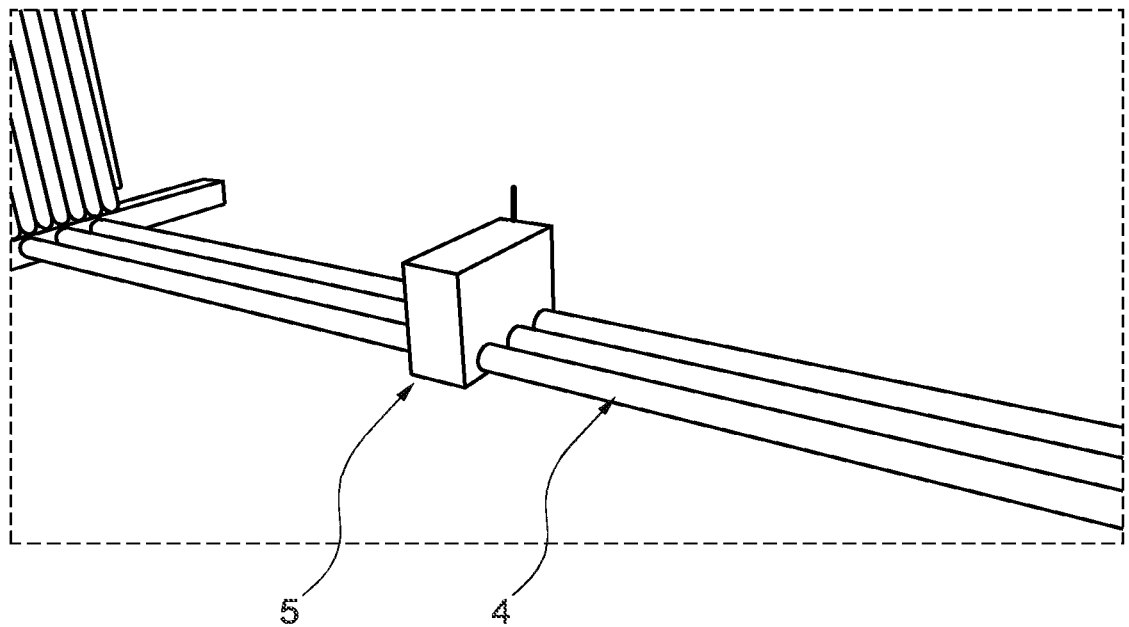

FIG. 3: illustrates a section of the system illustrated in FIG. 1, and in particular means for provision of communications functionality, which in this example is a communications method implemented with a powerline gateway (5). The power line gateway (5) is in communication with one or more lighting devices, as well as one or more non-lighting devices within the system (not shown) and the means for making the devices on the powerline network accessible by the internet to enable remote control of the system can be via utility of Wi-Fi®, serial or Ethernet® communications (not shown). As illustrated in FIG. 3, the means for transmission of the powerline communications from powerline gateway (5) to the one or more lighting devices, or non-lighting devices in the system, for example the LED fixture (3) of FIG. 1, is via 3 parallel primary tubular conductive bus bars (4) in this example.

Figure 4:
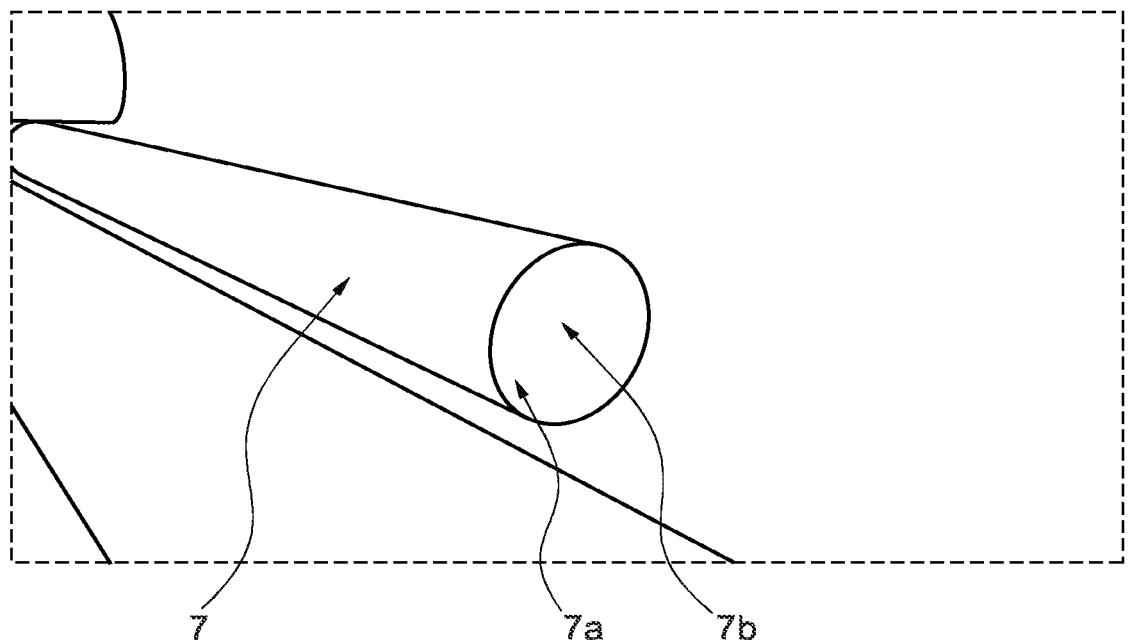

FIG. 4: illustrates the cross section of a solid cylindrical bus bar (7). In FIG. 4, the 'skin effect' around the extremities of the bar is indicated by the darker area towards the external edge approaching the interior of the surface (7a) and the eddy currents which assist the 'skin effect' are illustrated by the lighter area present in the centre of the bar (7b).

Figure 5:
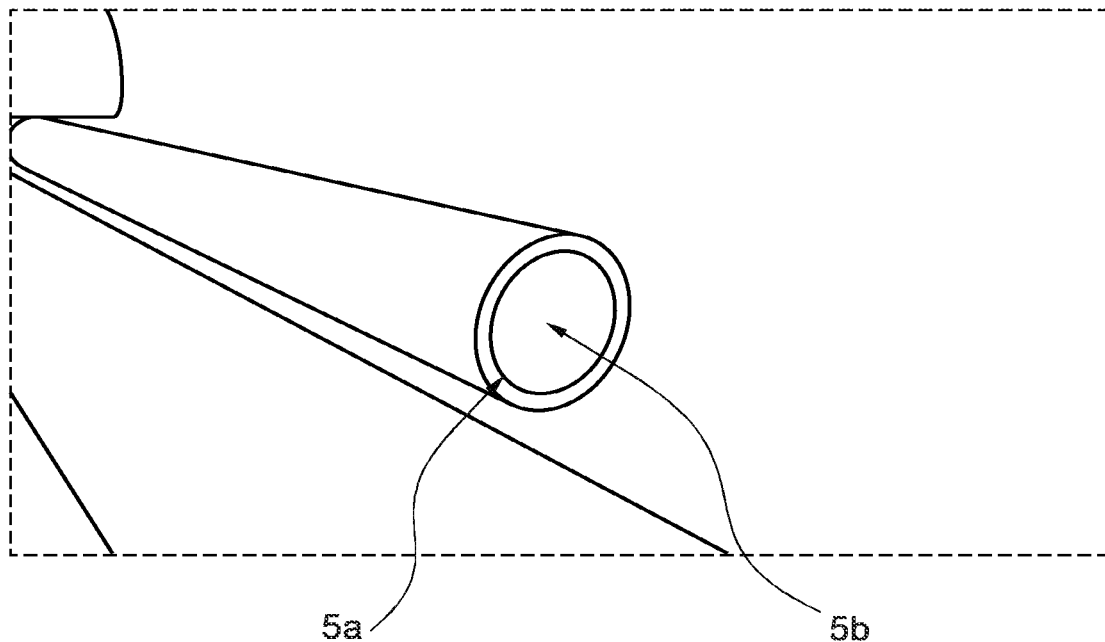

FIG. 5: illustrates the cross section of a tubular hollow bus bar suitable for use in the present controllable power and lighting system. In particular FIG. 5 shows that the 'skin effect' is reduced around the extremities of the bus bar is shown (5a) and confirms that in such a hollow bus bar the internal material which would encompasses the eddy currents, in cylindrical bars which assist the 'skin effect' is removed and is replaced by the hollow interior of tubular the bus bar (5b).

Figure 6:
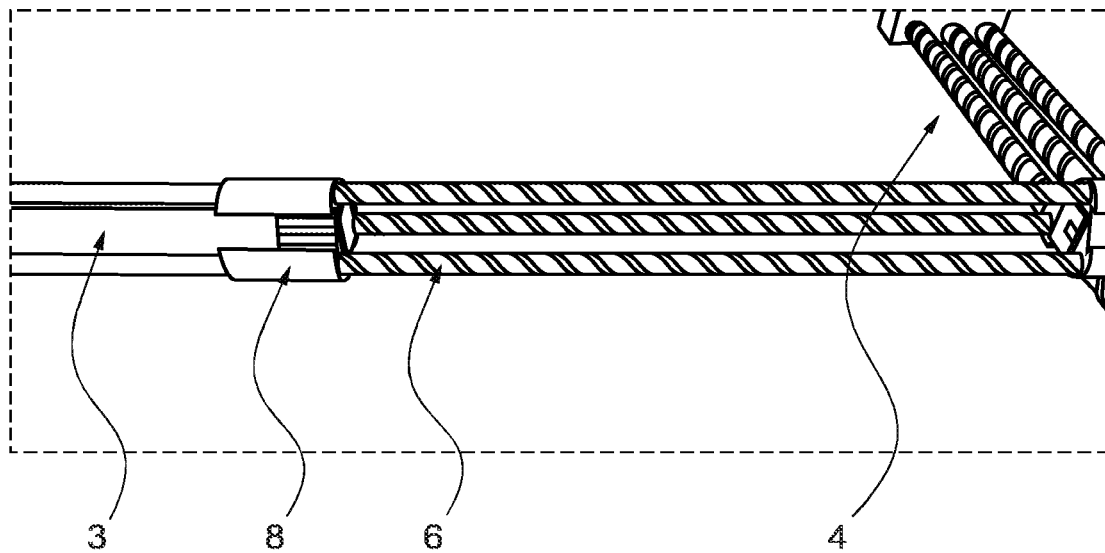
As illustrated in FIG. 6, the diameter of the primary/main bus bars is typically greater than that of the secondary bus bars, which in turn have a greater diameter than any tertiary bus bars (if present). As will be readily appreciated the relative dimensions of the main, secondary and any tertiary bus bars to be used in any particular power and lighting system will vary according to the needs of the specific system.

FIG. 6: illustrates how an LED fixture (3) can be commanded to perform a specific lighting event within the present controllable power and lighting systems. The lighting commands enter the physical luminaire via an LED registration chip (8). As will be readily appreciated, in a controllable power an lighting system lighting comprising one or more lighting devices, LED fixtures in this example, lighting commands can be distributed to the registration chips for individual lighting devices or LED fixtures, or to registration chips for groups of inter-connected lighting devices or LED fixtures if so-desired, via a tubular bus bar arrangement (4), (6) which distributes the power to the lighting system and also contains the data-signals (not shown).

FIG. 7: illustrates how 3-phase power is modified by the present system prior to provision to the luminaire of FIG. 6. 3-phase electricity (C) is distributed via the bus bar system (4), (6) to the luminaire which comprises LED fixture (3), LED registration chip (8) and means for local rectification of AC to DC (8a) prior to supplying power to the LED fixture (3). As illustrated in FIG. 7, the initial power signal (C) i.e. the stepped-down 3-phase AC electrical supply, has three sine waves, where each sine wave is out of phase by 120 degrees with the other two other sine waves. As also illustrated in FIG. 7, the AC power signal is rectified by local rectification means (8a) to provide a rectified, output DC voltage (D) which can be used to provide consistent power levels throughout the lighting system comprising one or more LED-containing lighting devices, i.e. LED fixture(s) (3). The positioning of the local rectification means (8a) is very close to the LEDs within the fixture, and the power supply throughout the lighting system is represented by input DC power (D). As illustrated in more detail in FIG. 12 hereinafter, the local rectification means comprises one or more LED drivers. As the means for sending the data (powerline) only works on AC, the AC must be located close to the lighting within the system to obviate the need for additional wiring or alternative means for directing command signals to the lighting.

Figure 8:
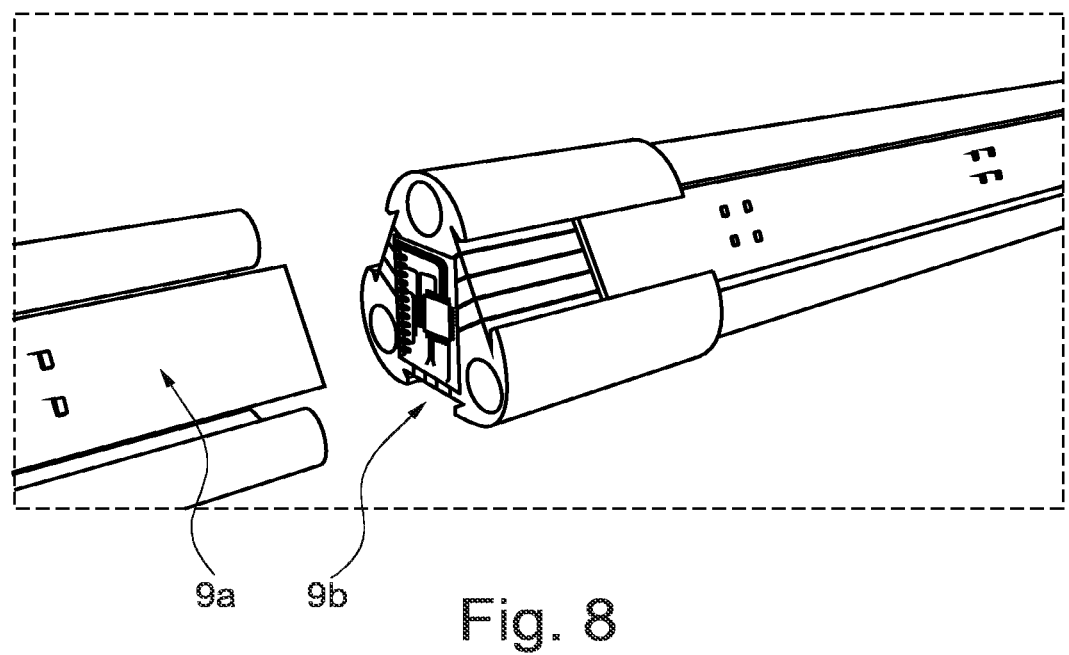

FIG. 8: illustrates component parts of an exemplary modular 3-phase LED fixture suitable for use in the present controllable power and lighting system. The fixture comprises lighting elements (9a) which can be connected together with a connector (9b) to assemble a usable 3-phase LED fixture. As will be readily appreciated the total number of lighting elements within the 3-phase LED fixture can be increased by use of additional lighting elements and connectors as desired.

Figure 9:
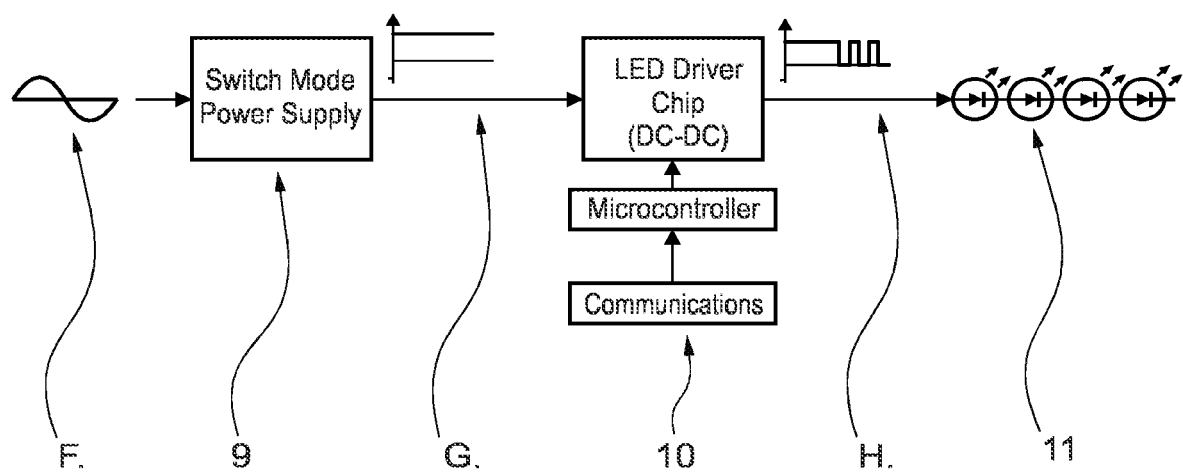

FIG. 9: illustrates a traditional, single phase, LED driver block diagram. A single-phase AC power supply (usually 110-240 v) (F) feeds a switch mode power supply unit (9). The switch power supply mode converts the AC to DC and outputs a near perfect DC voltage (G). An LED driver stack (10) takes this DC supply and using linear dimming or pulse width modulation (H) drives the LED array (11).

Figures 10A, 10B, 10C:
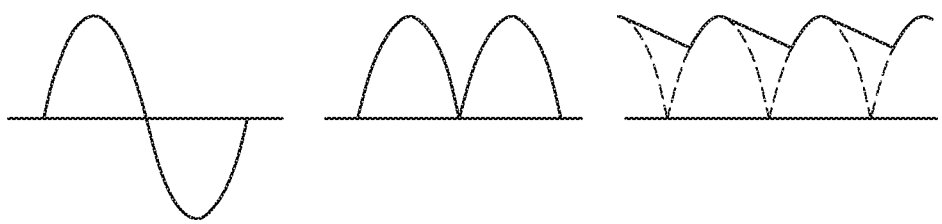

FIGS. 10A-10C illustrate the differences between the output signals observed in traditional, single phase rectification. FIG. 10A illustrates the sine wave for a conventional single-phase AC output. FIG. 10B illustrates the modified output signal observed following AC/DC rectification of a conventional single-phase AC output and it is clearly be from the trace that zero power is present at 3 points of each rectified cycle. FIG. 10C illustrates how the addition of capacitors (not shown) can hold energy during the zero points in a rectified cycle.

Figure 11:
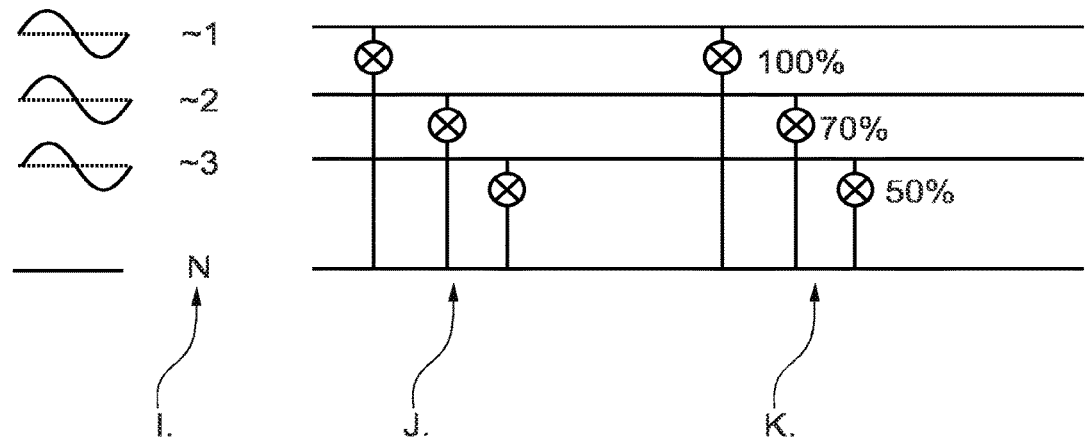

FIG. 11: illustrates the balancing issues which are observed when scaling-up traditional, single phase LED drivers for use in large installations. Large installations using a single phase+neutral input power supply, as indicated at point (I), and the 3 independent single-phase AC power loads are equally distributed between the 3-phases at the system design stage i.e. planning an installation, as indicated by point (J). for the avoidance of doubt, in the design stage the electrical designer must plan to balance the single-phase loads across the 3 phases. It is not possible to do this if the loads are changing. Every LED driver is connected to the neutral power line to complete the electrical return path. When the lights are dimmed, as indicated by point (K) the supply phases can become dramatically unbalanced as illustrated by the different power supply levels 100%, 70% and 50% from the three line/live conductors respectively. As discussed hereinbefore such imbalances are not acceptable.

Figure 12:
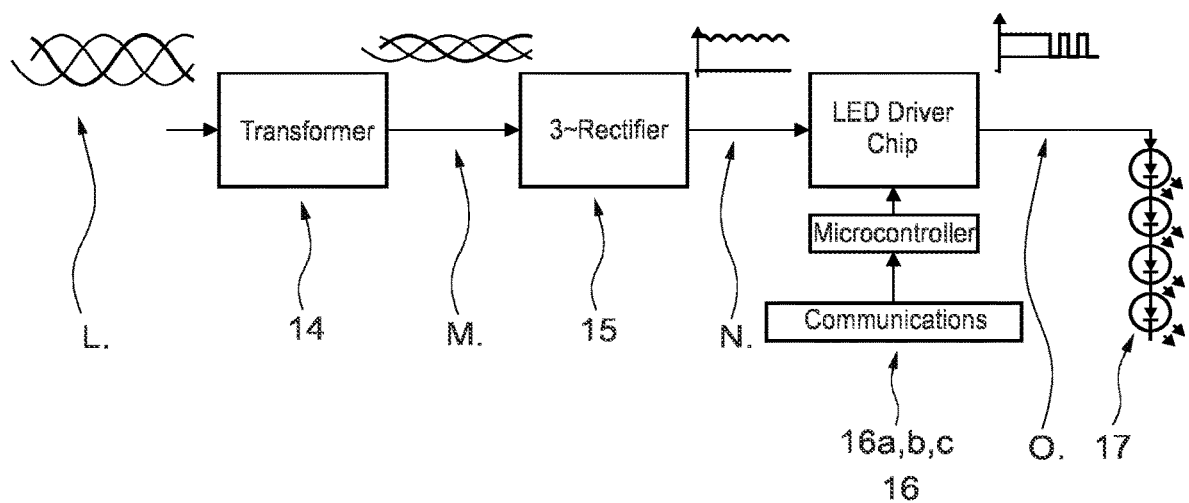

FIG. 12: illustrates a block diagram for an exemplary and preferred 3-phase LED driver (13) suitable for use in the present controllable power and lighting systems. An input 3-phase AC power supply, as indicated by (L), and typically at 220 v-415 v supplies a step-down voltage device or transformer (14). A lower output AC voltage, represented by (M), exits the transformer or step-down voltage device (14) and is fed into a 3-phase AC/DC rectifier (15) which outputs a rectified DC voltage, represented by (N). The voltage ripple within the DC current exiting rectifier (15) can still be observed and is illustrated by the upper waved-line in graph/trace N, whilst the lower (bottom) line of the graph/trace N illustrates the zero volts/axis. The rectified DC voltage supplies LED driver stack (16), comprising one or more LED driver chips (16a), a microcontroller (16b) and means for provision of communications functionality (16c). The output from the LED driver stack (16) is a stable DC current, which can be linear or pulse width modulated, and is represented by (O). This stable DC current (O) drives the array (17) of LED fixtures (8).

Figure 13:
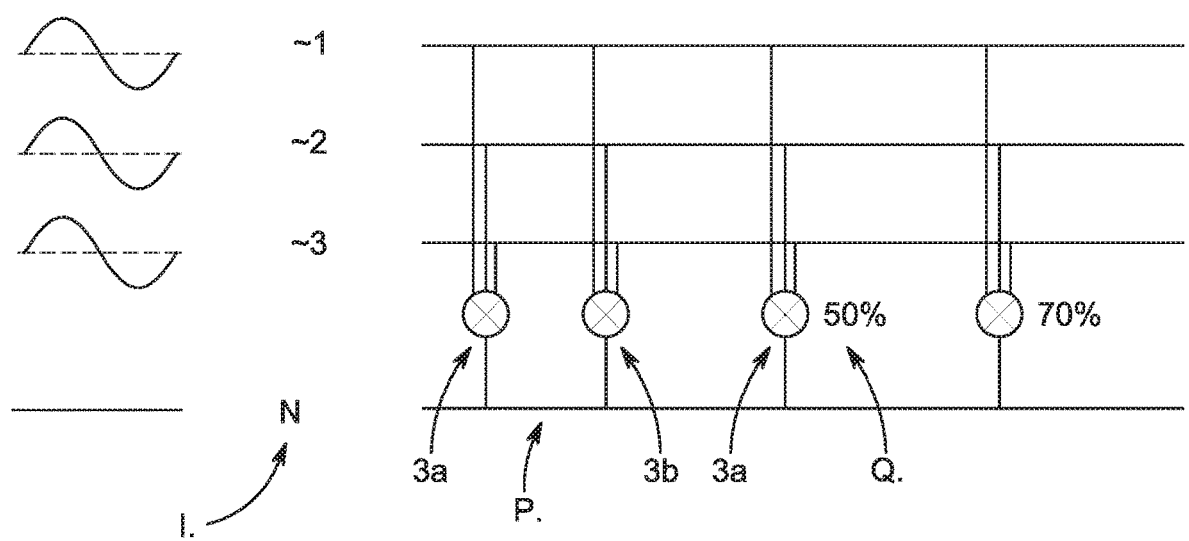

FIG. 13: illustrates the perfectly balanced scaling-up of the 3-phase LED driver system as used in the present controllable power and lighting systems, and as discussed hereinbefore and illustrated by FIG. 12. In FIG. 13 the LED driver system is implemented into a large installation (not shown) having a 3-phase+neutral supply, as indicated at point (I), by phases 1, 2 and 3 and neutral line N. All power loads within the lighting system i.e. LED-containing lighting fixtures, represented by (3a), (3b) and (3c) respectively, are in common electrical communication with the 3-power phases, and optionally to the neutral line, depending upon whether a STAR or DELTA arrangement is being utilised, as indicated at point (P). As also illustrated in FIG. 13, at point (Q) when the lights are dimmed, for example to 50% and 70%, all 3 power phases remain 100% balanced. As will be appreciated, this 100% balancing of the 3 power phases works across all combinations of dimming. This is required for large installations.

Figure 14:
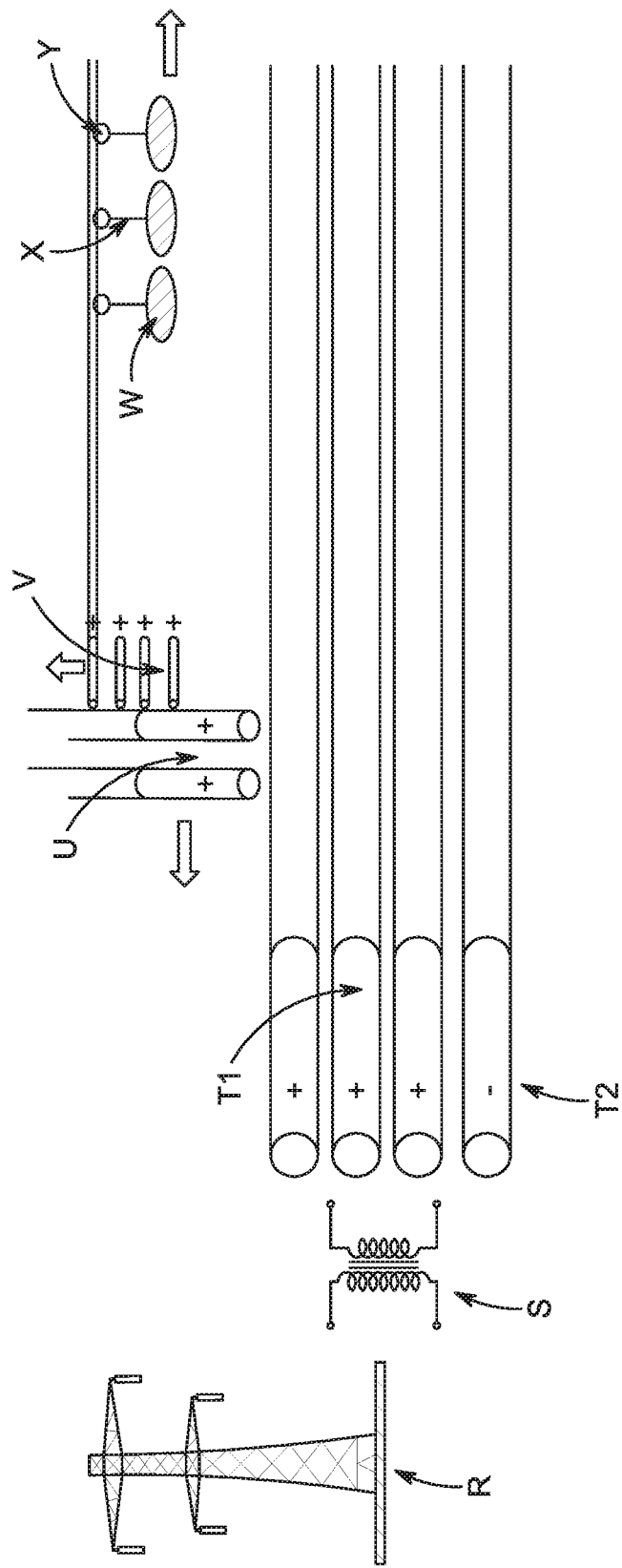

FIG. 14: illustrates how the power for the controllable power and lighting system in accordance with the present disclosure could be distributed in practise from a main power source, and in this example from the grid, via one or more transformers to a bus bar assembly within a building to provide power and lighting to LED lighting. As illustrated, the mains power, at mains supply level i.e. 240 v or 415 v AC, as required by the location of the system, is provided by the grid (R) to a transformer (which may be located externally or internally according to the requirements of the power and lighting system), the transformer (S) provides a first step-down in AC voltage to less than or equal to 50 v AC RMS and this low voltage, 3-phase, AC power is then distributed via a bus bar assembly, comprising a series of primary (T), secondary (U) and tertiary (V) hollow tubular line and neutral bus bars wherein each set of line and neutral bus bars (STAR configuration) are arranged in parallel to one another. A set of parallel line and neutral bus bars is illustrated for the primary bus bars (T1, T2) whilst for the secondary and tertiary bus bars only the line bus bars of the corresponding pairs are shown for the purposes of figurative clarity. For the avoidance of doubt in the bus bar assembly illustrated in FIG. 14 the primary bus bars have the greatest diameter and the tertiary bus bars have the smallest diameter. The connection means between the primary and secondary bus bars and or between the secondary and tertiary bus bars are not shown. Such connections can be effected by any of the means detailed in the present description. The low voltage, 3-phase, AC power is distributed from the primary bus bars to the secondary bus bars and thereafter to the tertiary bus bars. Three pendant LED lighting devices are shown, one of these is labelled (W), which are in electrical connection with the tertiary bus bar systems (V) on the AC-side via copper wiring (X) which provides the 3-phase DC-power to the LED lighting devices. Each LED lighting device is in connection with local voltage control means (Y) for the provision of second step-down voltage control. For the avoidance of doubt such local voltage control means is as detailed in the present description.

Whilst the exemplary system of FIG. 14 includes a neutral bus bar (T2), it will be readily appreciated, from the discussion of the systems of the disclosure as detailed hereinbefore that, the presence of a neutral bus bar is an optional feature dependent on whether a STAR or DELTA configuration is used. For the avoidance of doubt, there is additionally provided herein a system as illustrated in FIG. 14 without the neutral bus bar (T2) where a DELTA configuration is used for the primary bus bar system (T).

Figure 15:
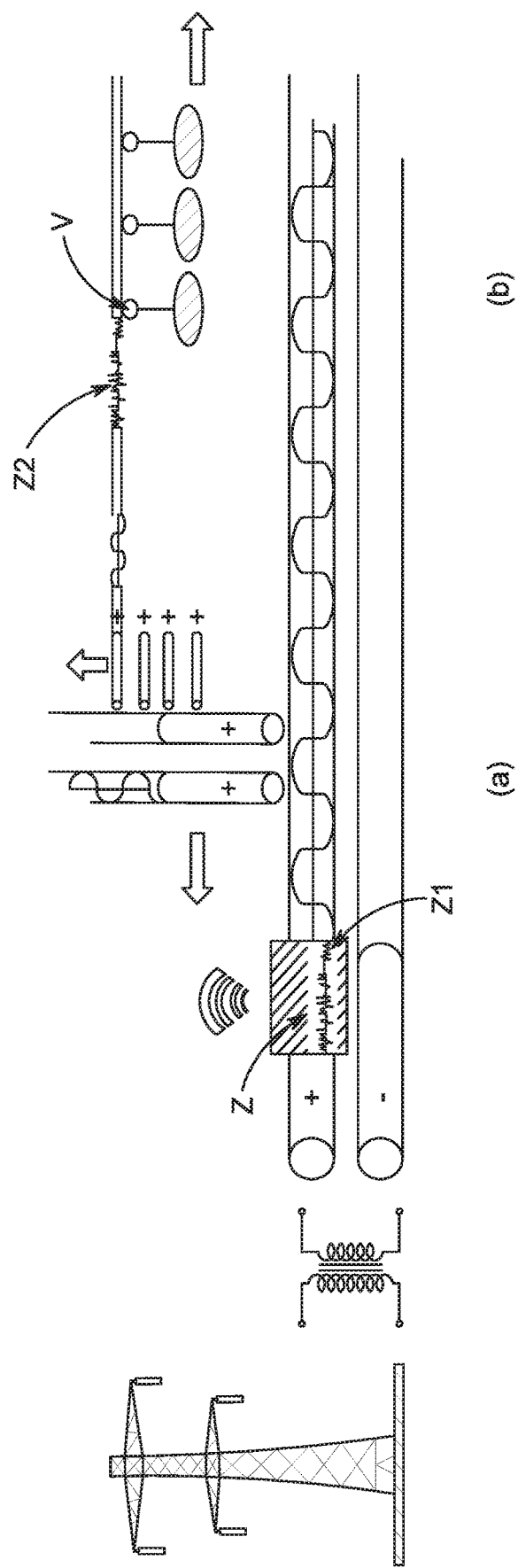

FIG. 15: illustrates how a powerline gateway and PC linked to the internet are utilised in an exemplary controllable power and lighting system in accordance with the present disclosure for the control of data to and from one or more devices within the system. For the avoidance of doubt, whilst FIG. 15 illustrates a system having LED lighting, this exemplary set-up can also be used for the provision of controllable power to one or more non-LED based devices. As detailed hereinbefore in relation to FIG. 14, in the system illustrated in FIG. 15 the high voltage mains power is reduced to less than 50 v AC RMS via use of a suitable transformer with the resultant low voltage, 3-phase AC power being distributed via a bus bar assembly, comprising a series of primary, secondary and tertiary hollow tubular line and neutral bus bars wherein each set of line and neutral bus bars are arranged in parallel to one another.

FIG. 15 shown at (a) is an exploded view of the powerline gateway (Z) on the primary bus bar system and which illustrates in diagrammatic form: the communications between a personal computer, or other suitable microprocessing device and the internet; and an illustration of data superimposed on the AC waveform (Z1).

FIG. 15 shown at (b) is a further exploded view of the powerline gateway (Z) which illustrates in diagrammatic form data (Z2) on the tertiary bus bar (V).

Also illustrated in FIG. 15 are a series of LED light fittings each of which is in connection with a local LED-registration chip that receives command signals for the lighting as detailed herein.

Figure 16:
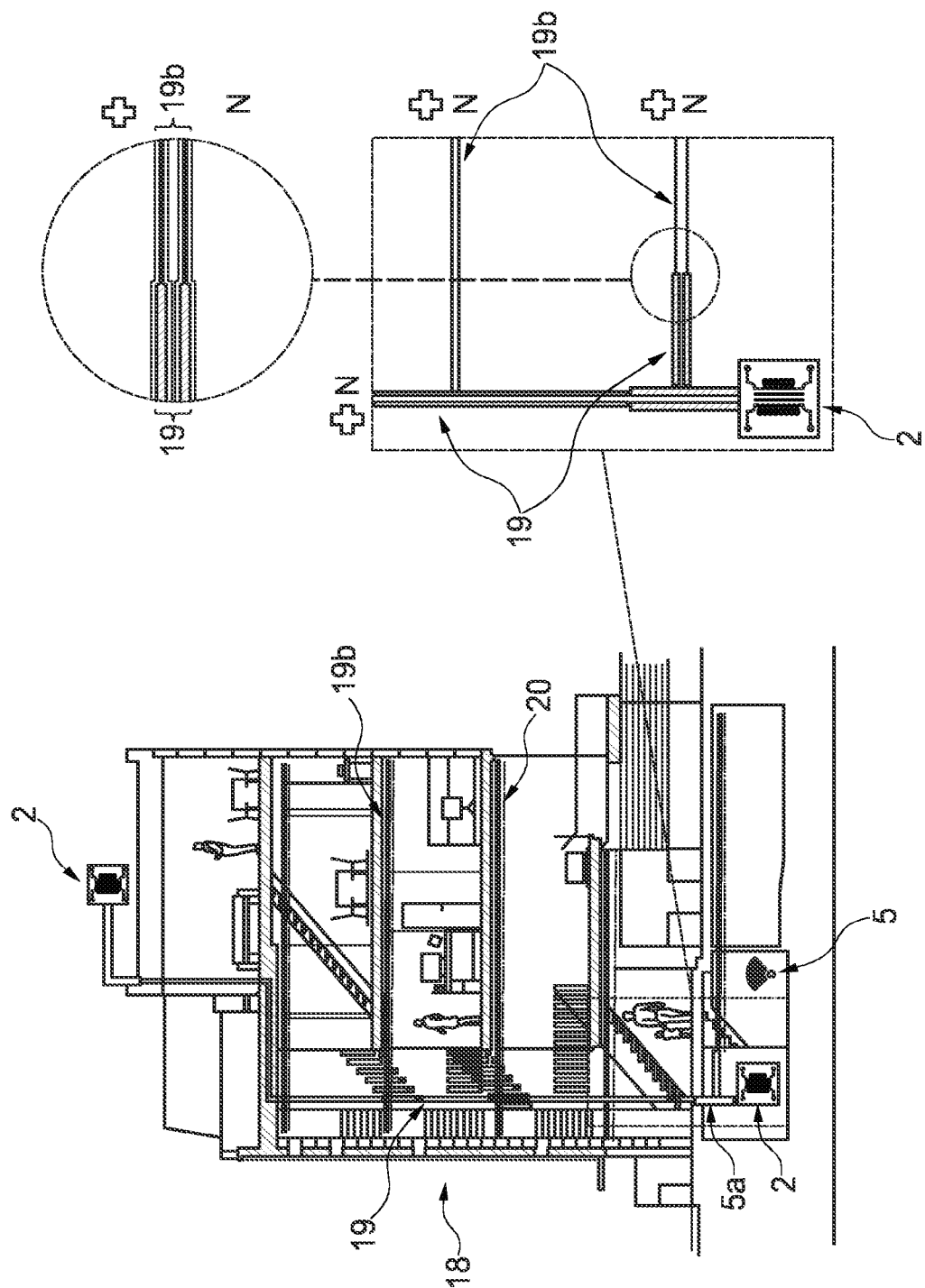

FIG. 16: illustrates a small office block (18) having multiple floors wherein the main AC transformer (2) is located externally and on the top of the building, this large AC to AC transformer (2) receives power from any suitable source of 240 v or 415 v AC, depending on the relevant power source where the system is to be implemented, such as a power line, a source of solar power, renewable power sources such as wind power. The main bus bars used in this exemplary system (19) are plastic-coated, as illustrated in FIG. 16a, and as indicated by the thicker line, are also provided with a further insulating/protective coating from the connection to the main AC transformer at the top of the building to the point of entry into the building (18). The transformer converts this 240 v or 415 v AC input power to less than or equal to 50 v AC RMS prior to entry into the building (18) wherein the so-converted power is distributed throughout each level of the building, i.e. to each office floor within the building (not labelled) as well as the basement, via a system of bus bars more particularly via primary and secondary bus bars (19)/(19b). At each level power is provided to the LED-containing lighting devices, which in this illustration are LED arrays (20) via secondary bus bars (19b) which provide the power to electrically link the LED strips within the array together. As will be appreciated the LED-containing lighting devices can be any suitable devices as detailed herein such as one or more LED fixtures (3), or more especially one or more LED strips.

The Figure also illustrates means for provision of communications functionality, in this example by power line gateway (5) linked to a central microcontroller (5b) which is wireless enabled is linked to a local PC (not illustrated) and each LED strip, or more typically each group of strips within the array(s), is adapted to receive the wireless signal and thereby can distribute the command to each individual LED, or each individual strip, via the series of secondary bus bars (19b) which link the strips together. In this arrangement the wireless signals are two-directional and able to send commands and collect data from local sensors and other monitoring equipment.

FIG. 16a: illustrates a segment of the controllable power and lighting system in building (18) and in particular provides a detailed view of the coated line and coated neutral bus bar components running in parallel to one another in a section of the secondary tubular coated bus bar arrangement (19b) as illustrated in relation to small office block (18) in the FIG. 16. FIG. 16a also illustrates an expanded view of a section of the primary (19) and secondary (19b) components of the bus bar assembly in the lower levels of the building and shows the coated line and coated neutral bus bar components of each of the main and secondary bus bars, where the secondary bus bars are in groups of three and run in parallel to one another, and illustrates the substantially vertical arrangement of the main bus bars, and the substantially horizontal arrangement of the two groups of parallel secondary bus bars in each of the two building levels. For simplicity only two of the three line parallel bus bars are illustrated in FIG. 16. Transformer (2a) at the bottom of the building is simply an illustration that the system would work either with an external transformer located at the top or the building, or with an internal transformer. Powerline technology (5) is also illustrated in the Figure. For the avoidance of doubt only one of the three line bus bars in the secondary bus bar arrangement is shown for clarity in FIG. 16a.

Figure 17:
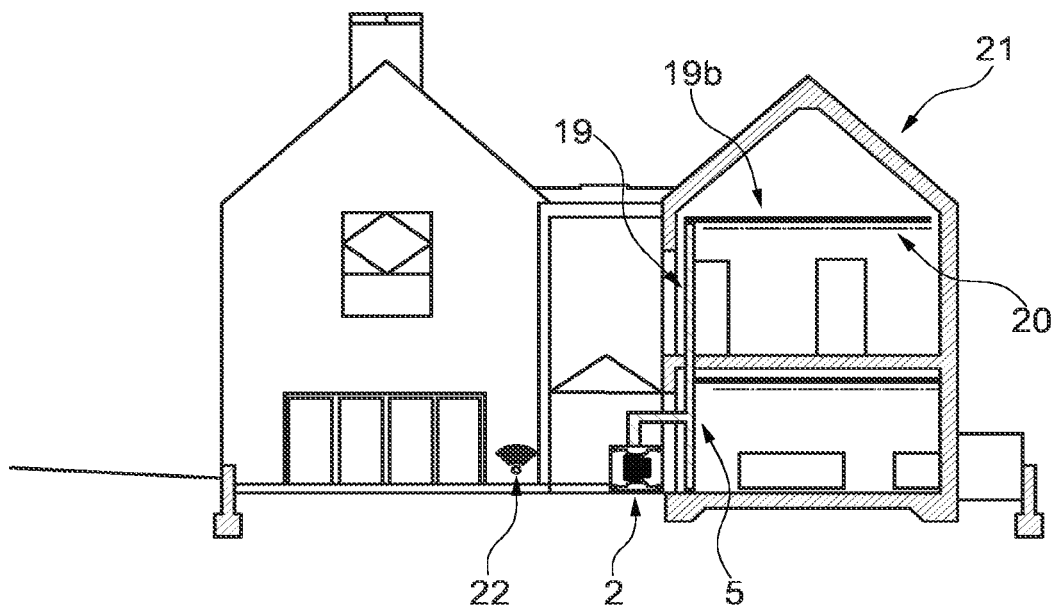

FIG. 17: illustrates a domestic building (21) having two floors wherein the main AC transformer (2) is located externally and at the side of the building, this large AC to AC transformer (2) receives power from any suitable source of 240/415 v AC in the same manner as previously illustrated and described for the small office block (18) and converts the AC input power to less than or equal to 50 v AC RMS prior to entry into the building (21) wherein the so-converted power is distributed throughout each floor of the house, via a system of main, primary bus bars (19) with power being provided to the LED arrays (20) at each level via secondary bus bars (19b) which link the LED strips within the array(s) together as detailed for the system in FIG. 16. For the avoidance of doubt the LEDs within this system are controllable via the internet with data-collection via the cloud. For the avoidance of doubt the transformer can be located either internally or externally.

A central microcontroller (22) which is wireless enabled is linked to a local PC (not illustrated) and each LED strip or more typically each group of strips within the array(s) receives the wireless signal and distributes the command to each individual strip via the series of secondary bus bars (19b). These wireless signals are two-directional and able to send commands and collect data from local sensors and other monitoring equipment. Power line technology (5) is also illustrated in the Figure.

Whilst the internal LED and power arrangements in building (21) are illustrated for the right hand side of the building only, it will be appreciated that the controllable power and lighting system is fully operable throughout the entire building via appropriate bus bar, LED array(s) and low voltage wiring linked to the wireless enabled microcontroller (22).

Figures 18, 18A:
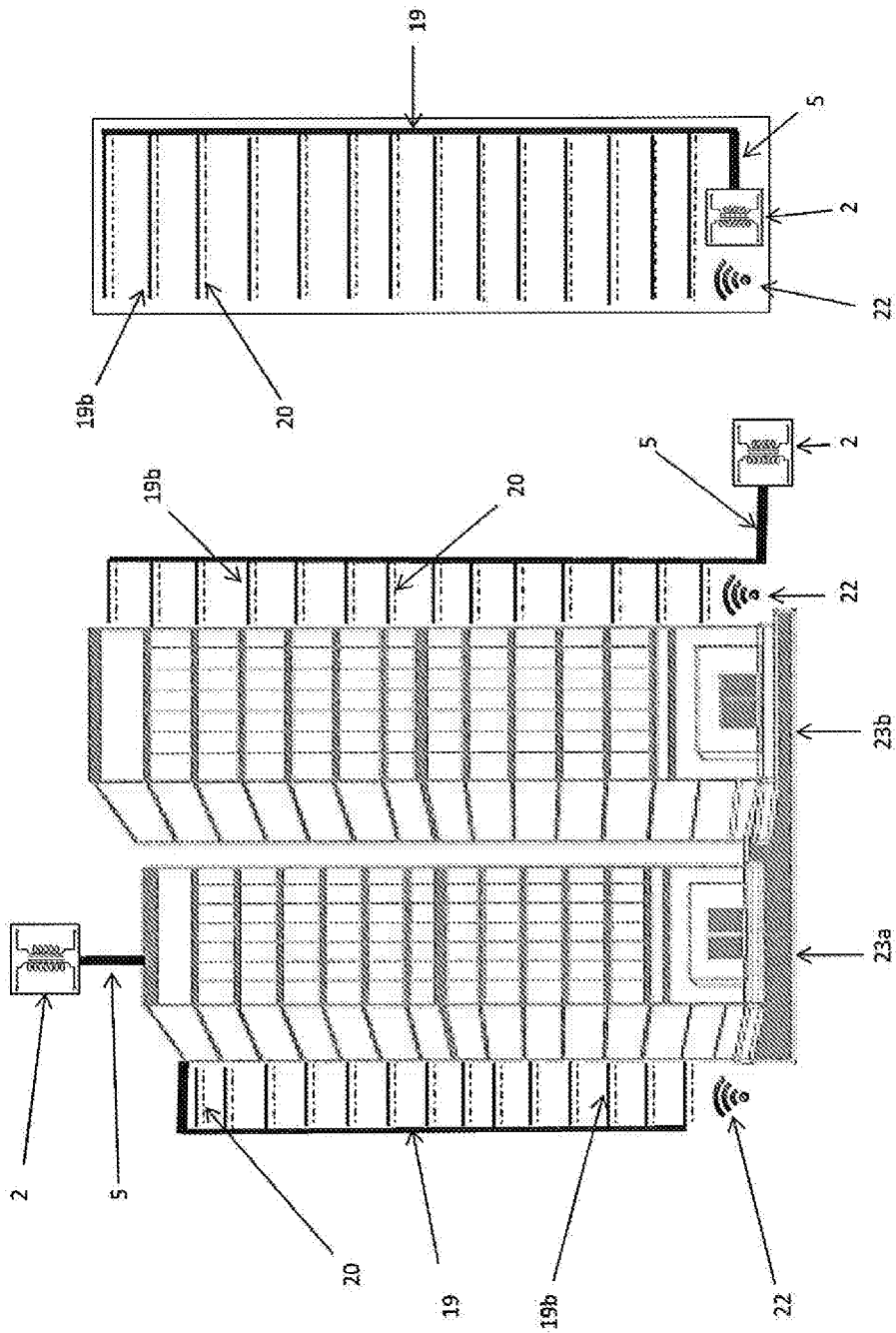

FIG. 18: illustrates two commercial/industrial office blocks (23a) and (23b) having a combined power and lighting system wherein the main AC transformer (2) is located externally and on top of block (23a). For the avoidance of doubt the transformer could equally be placed on the bottom of the block. This large AC to AC transformer (2) receives power from any suitable source of 240/415 v AC in the same manner as indicated for the small office block (18) and domestic building (21) as discussed and illustrated hereinbefore, in order to convert the AC input power to less than or equal to 50 v AC RMS prior to entry into block (23a) wherein the so-converted power is distributed throughout each floor of the block, via a main, primary bus bar arrangement (19) with power being provided to LED arrays (20) at each level via secondary bus bars (19b) which link the LED strips within the LED array(s) together. For avoidance of doubt the LEDs within this system can also be individually controlled ultimately via the internet with all data collected via the cloud in accordance with the power and lighting system as discussed and illustrated herein in relation to the small office block (18).

Local microcontrollers (22) which are wireless enabled are located within each building and are linked to a local PC (not illustrated) and each LED strip or more typically each group of strips within the LED array(s) (20) receives the wireless signal and distributes the command to each individual strip via the series of secondary bus bars (19b) which link the strips together. These wireless signals are two-directional and able to send commands and collect data from local sensors and other monitoring equipment.

Whilst the internal local microcontrollers (22) in blocks (23a) and (23b) are shown at ground level, it should be appreciated that this can be located at any suitable position within the blocks that are convenient.

For the purposes of illustration only, the arrangement of the internal power distribution and lighting within the controllable power and lighting system for block (23a) comprising a main, primary bus bar arrangement (19) which distributes power to the LED arrays (20) from a main transformer (2) at the top of block (23a) via a bus bar arrangement having a series of main, primary bus bars (19) and secondary bus bars (19a), with control of the block being provided by powerline technology (5) and local wireless enabled microcontrollers (22) is shown in the exploded view at the left hand side of the Figure.

Similarly, for building 23b the internal power distribution and lighting within the controllable power and lighting system is provided from a further transformer (2) to the main, primary bus bar assembly (19) and thereby to, a series of secondary bus bars (19a), and LED arrays (20), with control of block (23b) also being provided by powerline technology (5) and a local wireless enabled microcontroller (22) is also shown in exploded view on the right hand side of building 23b.

For the avoidance of doubt, the remote-control of either of blocks (23a) or (23b) may be managed separately or individually using the control system herein.

FIG. 18a: provides an expanded view of the internal system within block (23a). As can be seen from FIGS. 18 and 18a, the position of the transformer (2) can either be an external transformer, located at the top of the building, or an internal transformer (2a).

Figure 19:
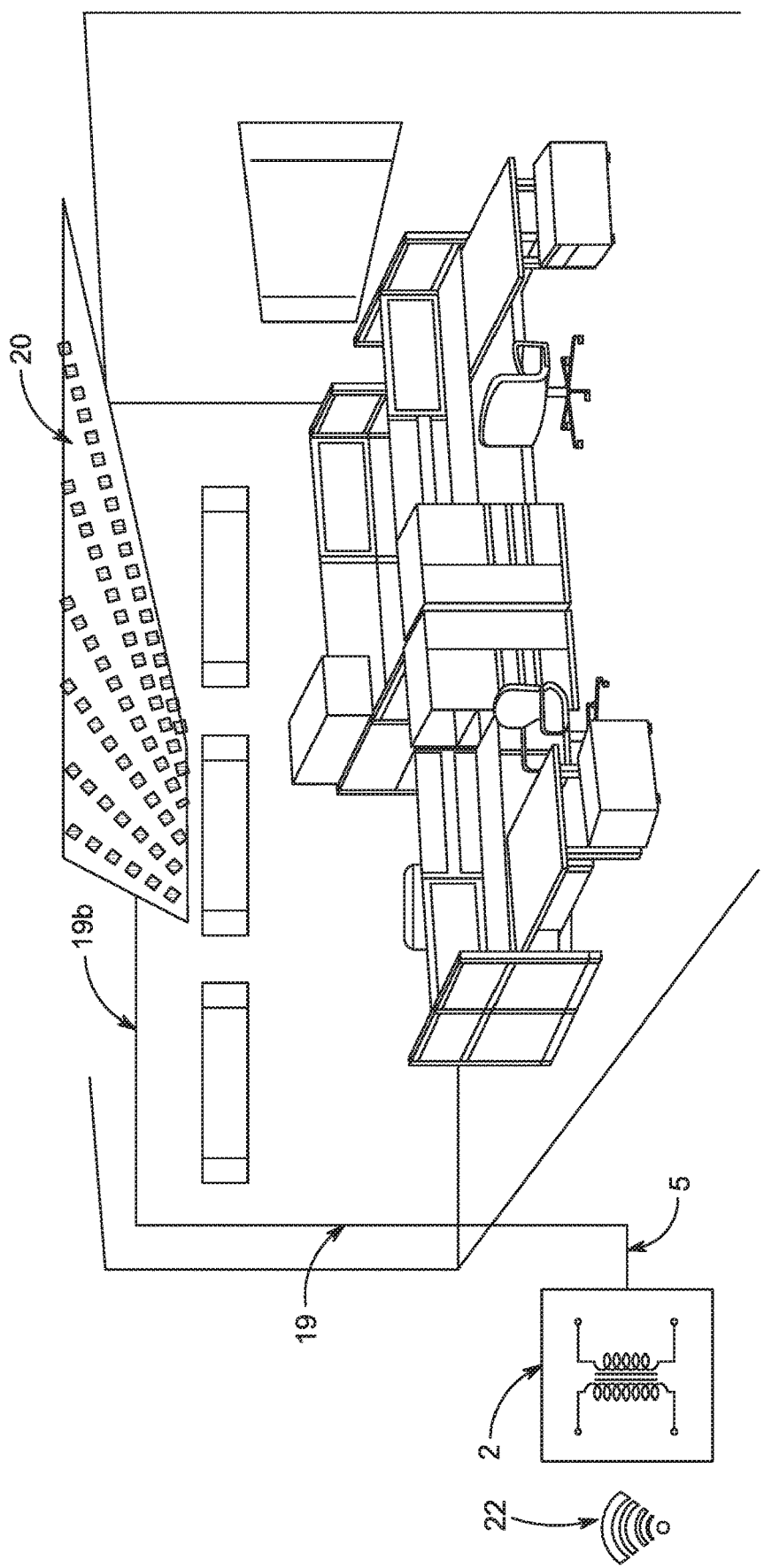

FIG. 19: illustrates a single office within block (23a), and in particular a suspended LED array (20) with power distributed from a transformer (2) via a main, primary bus bar arrangement (19) and secondary bus bar arrangement (19b) with wireless system control and management being provided by a wireless enabled microcontroller (22) and power line technology (5). For simplicity of illustration only the primary and secondary bus bars are indicated by single lines only rather than as two sets of 3 tubular bus bars arranged in parallel.

Figure 20:
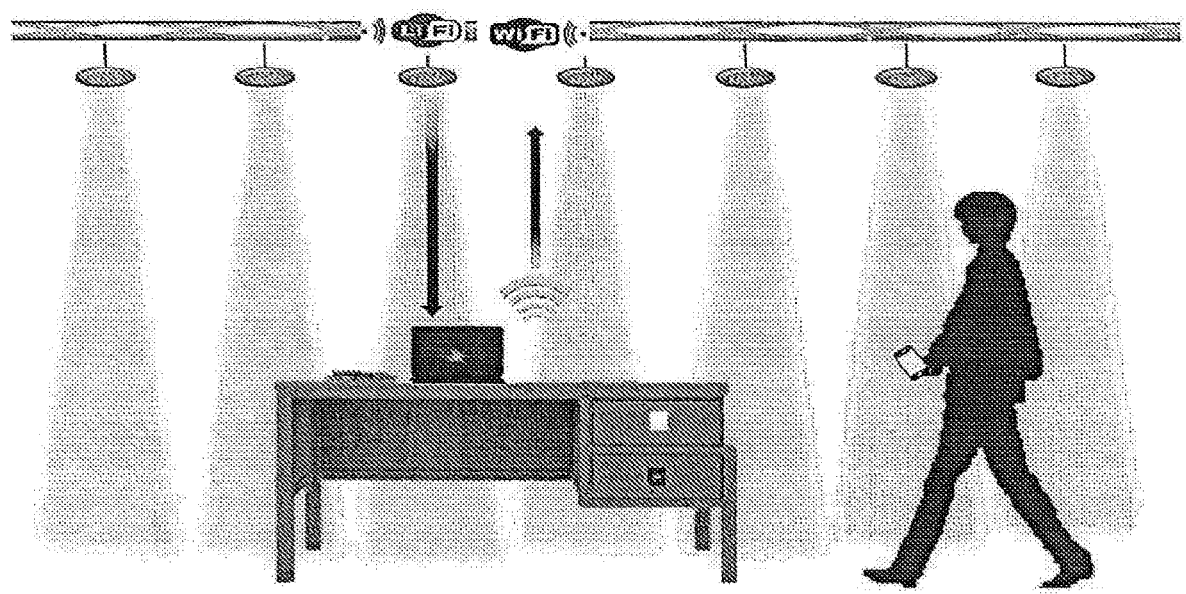

FIG. 20: illustrates a portion of a controllable power and lighting system in accordance with the present disclosure, and in particular an area of a room, or office space wherein a combination of LI-FI and WI-FI® wireless technologies are used to connect to and transmit data-back to the control system from mobile non-LED devices having smart technology, a smart phone and a laptop computer. FIG. 20 additionally illustrates a portion of an LED lighting array as defined hereinbefore wherein the LED lighting is provided via a number of pendant lights.

Figure 21:
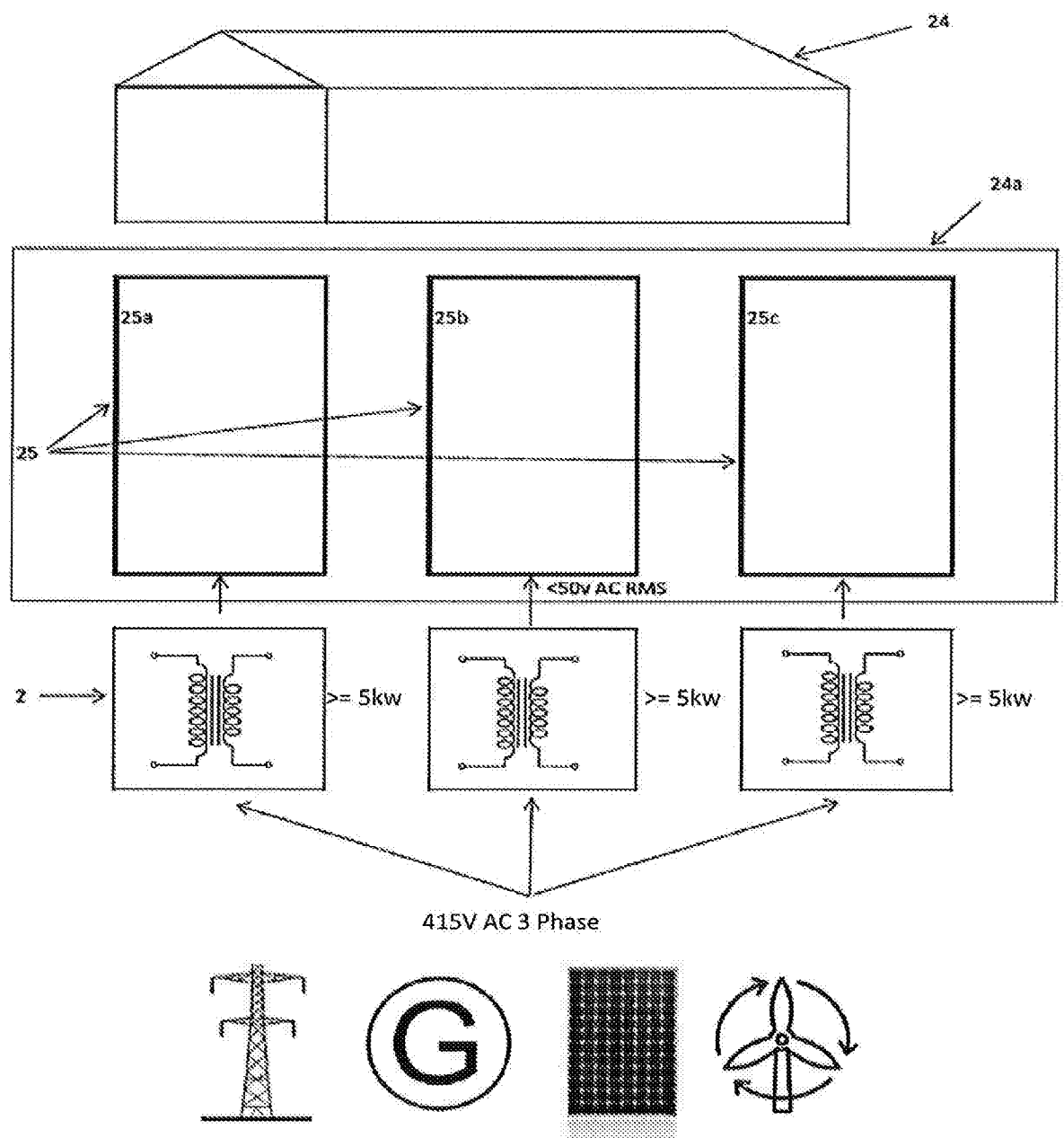

FIG. 21: illustrates a greenhouse (24) incorporating an LED array powered and controlled by the power and lighting system as detailed herein. The power channel from within the greenhouse to the potential sources of commercial/industrial high voltage AC power to the greenhouse site is illustrated.

Greenhouse (24) is shown in both side and overhead elevations, in this exemplary illustration the greenhouse is at least 24 m wide and is suitable for housing growing systems, which may be hydroponic or otherwise, wherein said growing systems are spaced typically at 2, 4, or 8 m spaces between each other. Within the footprint of greenhouse (24a) there is provided an outline for an LED array (25) having three sections provided by three supported structures (25a), (25b), (25c) on which LED containing strips/groups of strips are located (not shown). Structures (25a), (25b) and (25c) are tubular hollow bus bars that are suspended from the ceiling of greenhouse (24) by suitable means and as illustrated provide equal spaces between the three sections of the LED array (25) i.e. between the groups of strips (not illustrated) which are located upon the respective bus bar structures (25a) and (25b), and (25c). The so-suspended and co-located sections of LED array (25) is located above and in close proximity to three individual growth areas (not shown) wherein as will be appreciated these growth areas are located underneath and are substantially of similar area to the areas of each section of the array. In this example the three-sectioned array is positioned at from 5 cm to 10 cm above the growth area.

The three sections of the LED array are illustrated as rectangles, of particular area, but as will be appreciated the absolute shape and dimensions of either an overall array, or sections within an overall array can vary widely in relation to the need for use with different growth areas as detailed hereinbefore.

Three large AC to AC transformers (2) are located outside of the greenhouse, each of which receives power from any suitable source of 240/415 v AC such as a power line, a source of solar power, and renewable power sources such as wind power. These transformers (2) convert this AC input power to less than or equal to 50 v AC RMS prior to entry into greenhouse (24) wherein the so-converted low voltage, 3-phase, AC power is provided via a bus bar assembly having one or more main bus bars for the provision of power to each of the three sections of the LED array (25) as supported by the bus bar structures (25a), (25b) and (25c). As will be appreciated the supporting bus bar structures (25a), (25b) and (25c) are effectively comprise a secondary bus bar system for distribution of power from the primary or main bus bars to the LED array (25) in combination with local rectifiers/local voltage correction device(s) associated with the LEDs (not shown) and as detailed hereinbefore. For example, each LED strip for use within any group of LED strips in array (25) may include a local rectifier (not shown) at one end and be in electrical connection with the power source via the supportive (secondary) bus bar.

EXAMPLES

The following representative examples describe specific embodiments of the present systems. Modifications to the capacity of the transformers used and the system to be provided with power and light and optionally heat where required by the lighting systems as defined herein for use in such systems are within the scope of the present disclosure. In particular whilst the system illustrated in Example 1 are demonstrated to have advantageous utility within systems wherein the required heat and light for growth is provided either partially or wholly by an LED array as defined herein, it should be understood that such systems incorporating such LED lighting arrangements have applications in fields other than growth systems. Such other fields or applications are as detailed hereinbefore.

Example 1—Distribution Tree at Low Voltage, 3-Phase, AC and High Currents

Taking the greenhouse system illustrated in FIG. 21 use of a large AC to AC transformer of 10 kw (Kilowatt) capacity and an LED array as defined hereinbefore provides sufficient heat and light for coverage of a growing area of from about 100 m² to about 200 m². Use of a lower capacity, 4 kw AC to AC transformer with an LED array as defined hereinbefore would correspondingly provide heating and lighting for a smaller greenhouse having a growing area of from about 40 m² to about 80 m².

Using tubular aluminium bus bars, the AC-to-AC transformer could be increased to 150 kW or larger. This would provide sufficient power for larger growing areas of from 1,500 m² to 3,000 m².

Comparative Greenhouse Example

The presently available systems require local DC drivers each having a capacity of about 200 w to 300 w (watt) with subsequent powerage for only a 2 m² to 4 m² area per driver. This means that in order to deliver heat and light to a small greenhouse as indicated in Example 1, up to 40 of such drivers would be required, whilst to service the larger area in Example 1, up to 100 would be needed.

It is clear from these Examples that the novel system herein has the potential for delivery of not only significantly greater lighting coverage than presently available, but also the concurrent provision of efficiencies in terms of heating and lighting via the unique controllable LED array.

Example 2—Controllable Power and Lighting System

The system illustrated in FIG. 1 is an implemented controllable power and lighting system in accordance with the present disclosure. This system includes an input 3-phase AC power supply, voltage step-down means, and distribution of power to a lighting device where 3-phase AC/DC rectification occurs. Although only a partial representation of an exemplary lighting system is illustrated in FIG. 1, any suitable power transformation and rectification means illustrated and as discussed in the present description can be readily applied to power a wide variety of different lighting devices, as well as non-lighting devices from such an arrangement. In this specific system segment the power is advantageously distributed to the lighting device via conductive bus bars. As will be also appreciated from the foregoing description, alternative conductive means can also be used to distribute power to the one or more lighting, or non-lighting devices in such systems.

In the system of Example 2, a 3-phase supply provides input power to a voltage step-down device to convert the input voltage into a lower, low voltage power supply, and the low voltage power is distributed to a suitable LED-containing lighting device, in this instance an LED fixture via a conductive bus bar arrangement of main and secondary bus bars. The low voltage power is distributed via 3 main parallel primary conductive tubular bus bars, to suitable means for provision of communications functionality, in this example by power line gateway or modem, and thereafter via a secondary distribution branch of the bus bar arrangement comprising 3 parallel tubular bus bars to the LED fixture. As detailed hereinbefore the bus bar arrangement provides the one or more of the line/live conductors to enable data to be sent to and from the system from the power line modem.

The Applicant has found that the use of tubular bus bars for all three bus bars in the main and secondary bus bar arrangements, as well as any optional neutral bus bars where present. The Applicant has also found that it is advantageous to use bus bars wherein the diameter of the primary/main bus bars is typically greater than that of the secondary bus bars, which in turn have a greater diameter than any tertiary bus bars (if present). As will be readily appreciated the relative dimensions of the main, secondary and any tertiary bus bars to be used in any particular power and lighting system will vary according to the needs of the specific system.

Means for the 3-phase AC/DC rectification of the 3-phase AC power to provide DC power to the LED-containing lighting system of Example 2 is as described hereinafter. 3-phase AC, particularly low voltage, or extra-low voltage AC, is distributed via the conductive bus bar system to the one or more LED-containing devices, for example a luminaire which comprises an LED fixture, an LED registration chip and means for local rectification of AC to DC prior to supplying 3-phase DC power to the LED fixture. The initial stepped-down 3-phase AC power signal is rectified by local rectification means to provide a rectified, output DC voltage which can be used to provide consistent power levels throughout the lighting system. The Applicant has found that to generate desirable communications functionality and efficiencies the positioning of the local rectification means is very close to the LEDs within the lighting fixture or luminaire.

The advantages in efficiency obtained from use of a system in accordance with the present disclosure, and in particular of Example 2 are as illustrated in and discussed in relation to FIG. 2. Comparison of the efficiency curve obtained from use of a 3-phase AC power supply as detailed herein, to that for the traditional power supply demonstrates a higher overall efficiency and also a higher efficiency across the loading. The 3-phase approach gives approx. 97% efficiency above 15% load. The traditional single-phase approach is generally 85% efficient above 40% load.

What is claimed is:

1. A controllable power and lighting system (system) comprising:
    one or more power consuming devices, wherein at least one of the power consuming devices is an LED-containing lighting device, wherein the LED-containing lighting device is adapted to be powered by a 3-phase AC power supply and wherein 3-phase AC power supplied to the system is converted to DC power via 3-phase AC/DC rectification, and wherein the 3-phase AC power supplied to the system is less than or equal to 50V AC RMS, wherein the system additionally comprises power line technology in combination with communications, and registration means within the LED-containing lighting device to allow the control and powering of the LED-containing lighting device.
2. The system according to claim 1, wherein the 3-phase AC power supplied to each LED-containing lighting device is reduced by a step-down device or a main AC step-down transformer.

3. The system according to claim 1, wherein the 3-phase AC power supplied to the system is distributed by conductive hollow bus bars.

4. The system according to claim 1, wherein the 3-phase AC power supplied to the system is distributed by conductive bus bars wherein the bus bars are tubular or substantially tubular.

5. The system according to claim 1, wherein the 3-phase AC/DC rectification is local rectification.

6. The system according to claim 1, wherein the system includes means for automatic control of each device.

7. The system according to claim 1, wherein the LED-containing lighting comprises one or more LED-containing lighting devices, or group of one or more LED-containing lighting devices, or an LED array comprising LED lights, wherein the devices or lights are adapted to be powered by the 3-phase AC power supply, and wherein:
 (i) the 3-phase AC power distributed to the LED-containing lighting is linked to an AC main transformer that may be positioned externally or internally;
 (ii) the 3-phase AC power is distributed by conductive bus bars;
 (iii) the 3-phase AC power supplied to each lighting device, or group of lighting devices is converted to low voltage or extra-low voltage DC via 3-phase AC/DC rectification of the power supplied to each connected load, and particularly via an AC/DC rectifier associated with each lighting LED-containing lighting device, or group of LED-containing lighting devices; and
 (iv) the system includes means for automatic control of an output of the lighting as a whole, or individual LED-containing lighting devices, or groups of LED-containing lighting devices within the system.

8. The system according to claim 1, further comprising one or more non-lighting power consuming devices wherein each non-lighting power consuming device is adapted to be powered by the 3-phase AC power supply.

9. The system according to claim 1, wherein the 3-phase AC power supplied to the system is converted to DC power via 3-phase AC/DC rectification of the power supplied to each connected load within the system, and wherein each connected load is at least one of the LED-containing lighting device, a group of LED-containing lighting devices, or an array of LEDs.

10. The system according to claim 1, wherein the 3-phase AC power supplied to the system is extra low voltage power of between 12v and 50v AC RMS.

11. The system according to claim 1, wherein the power supplied to each lighting device is low voltage or extra low voltage 3-phase AC that is converted to low voltage DC power via a 3-phase AC/DC rectifier associated with each lighting device.

12. The system according to claim 1, wherein 3-phase AC power supplied to each LED-containing lighting device is reduced by a step-down device or a main AC transformer located externally or internally to a location of the system.

13. The system according to claim 1, wherein the 3-phase AC power to the system is distributed by conductive bus bars, and wherein the bus bars are present as an assembly having at least one of main, secondary or tertiary bus bars.

14. The system according to claim 1, wherein the 3-phase AC power to the system is distributed by conductive bus bars present as an assembly having main, secondary and optionally tertiary bus bars, and wherein the main, secondary, and tertiary bus bars, where present, independently comprise aluminum or copper bus bars.

15. The system according to claim 1, wherein the 3-phase AC power supplied to the system is distributed by conductive bus bars wherein the bus bars are one of tubular or substantially tubular aluminum bus bars.

16. The system according to claim 1, wherein the 3-phase AC power to the system is distributed via tubular or substantially tubular, conductive bus bars, and wherein the system includes three-line positive bus bars and optionally one neutral bus bar.

17. The system according to claim 1, wherein the system includes means for automatic control of each device, wherein a means for automatic control of an output of the devices within the system as a whole or individual devices or groups of devices within the system comprises means for providing automatic independent control of the devices, and wherein said means uses powerline technology or a wireless link to a local PC or via the internet remotely or uses a combination of powerline and wireless technologies according the needs of a particular system to be controlled.

18. The system according to claim 1, wherein at least one LED-containing lighting device is an LED light, an LED array comprising one or more LED lights, or groups of LED lights including: one or more LED spotlights; one or more LED floodlights; one or more light fittings including at least one LED; one or more luminaires containing at least one LED; one or more LED strip lights; or one or strips containing LED lights; or any combination of LED spotlights, LED floodlights, light fittings, luminaires, LED strip lights, or arrays or strips containing LEDs.

19. The system according to claim 1, wherein the system is used for at least one of:
 (i) applications relating to growth including horticulture, agriculture, and aquaculture;
 (ii) applications relating to settings where animals are held including in animal husbandry;
 (ii) applications relating to a deployment of power and lighting systems in large-scale settings having a demand for dynamic, responsive LED lighting; or
 (iv) applications where LED-lighting and power are in close proximity to humans.

20. A method for the provision of controllable power and lighting, or use of the system according to claim 1, in applications independently selected from:
 (i) applications relating to growth including horticulture, agriculture, and aquaculture;
 (ii) applications relating to the provision of power and lighting in settings where animals are held including in animal husbandry;
 (ii) applications relating to a deployment of power and lighting systems in large-scale settings having a demand for dynamic, responsive LED lighting; and
 (iv) applications where LED-lighting and power are in close proximity to humans
 wherein the method, or use, comprises a power and lighting system comprising one or more power consuming devices, wherein at least one of the power consuming devices is an LED-containing lighting device, wherein the LED-containing lighting device is adapted to be powered by the 3-phase AC power supply and wherein the 3-phase AC power supplied to the system is converted to DC power via 3-phase AC/DC rectification, and wherein the 3-phase AC power supplied to the system is less than or equal to 50V AC RMS.

* * * * *